FIG. 11

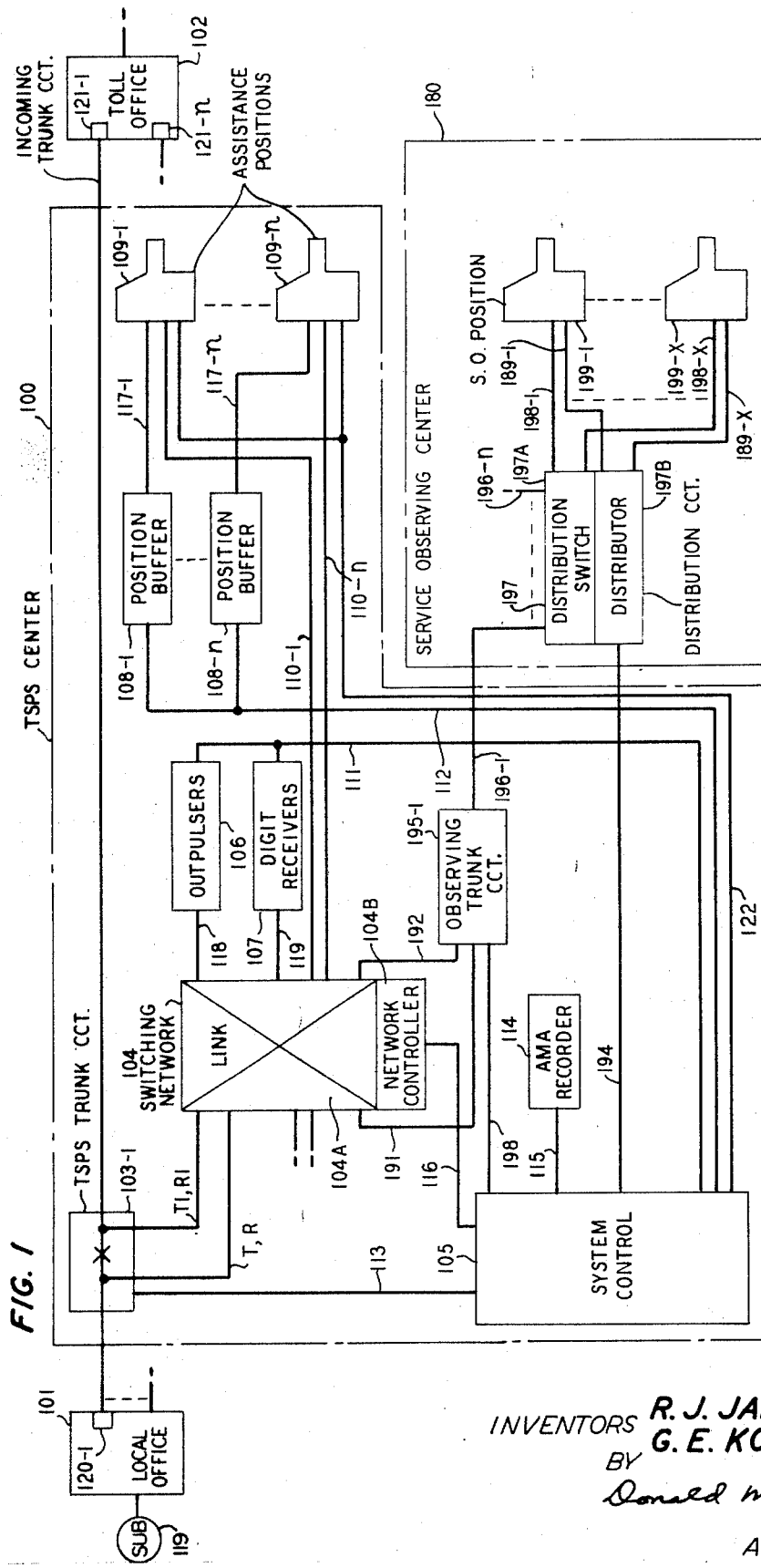

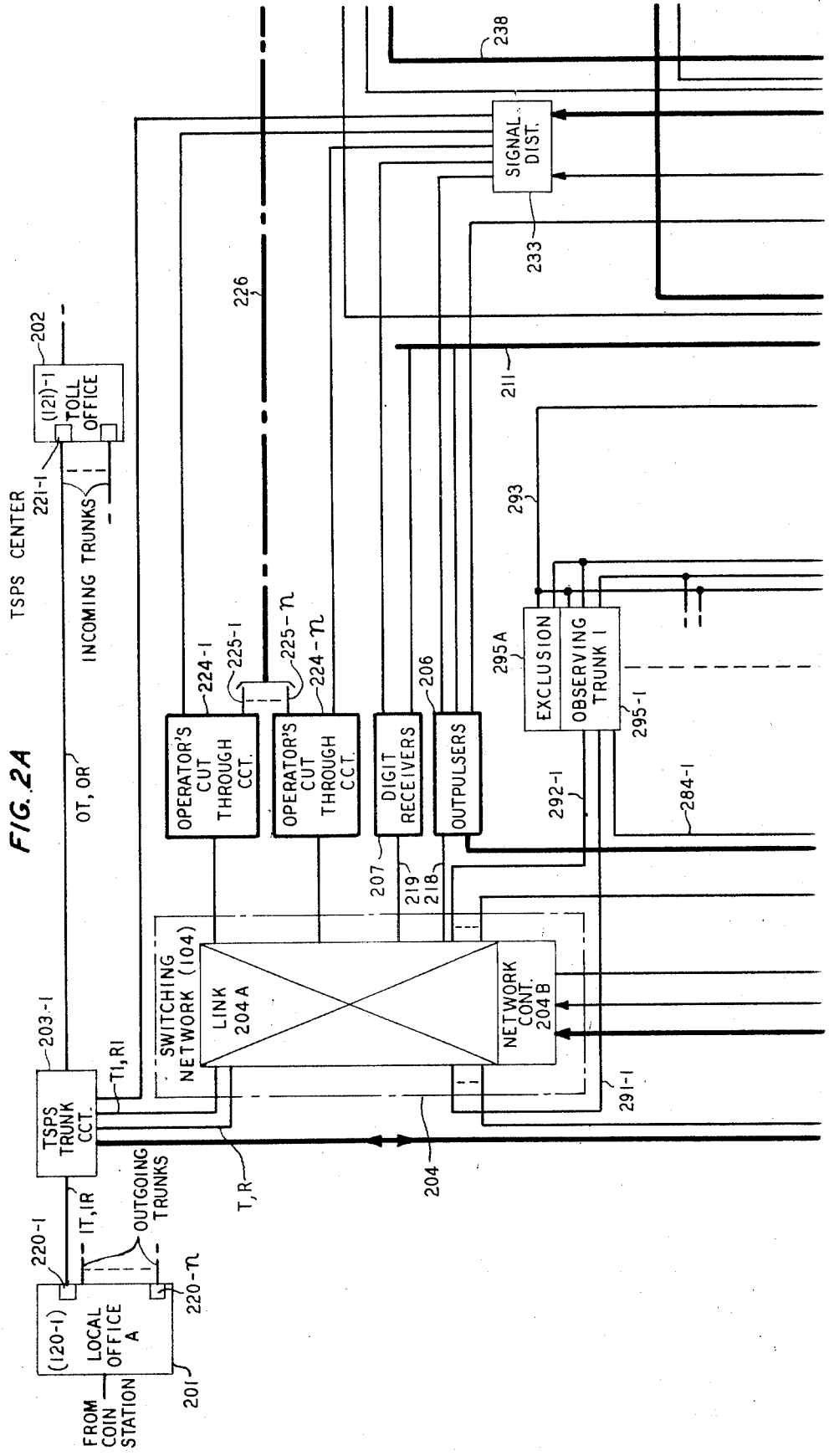

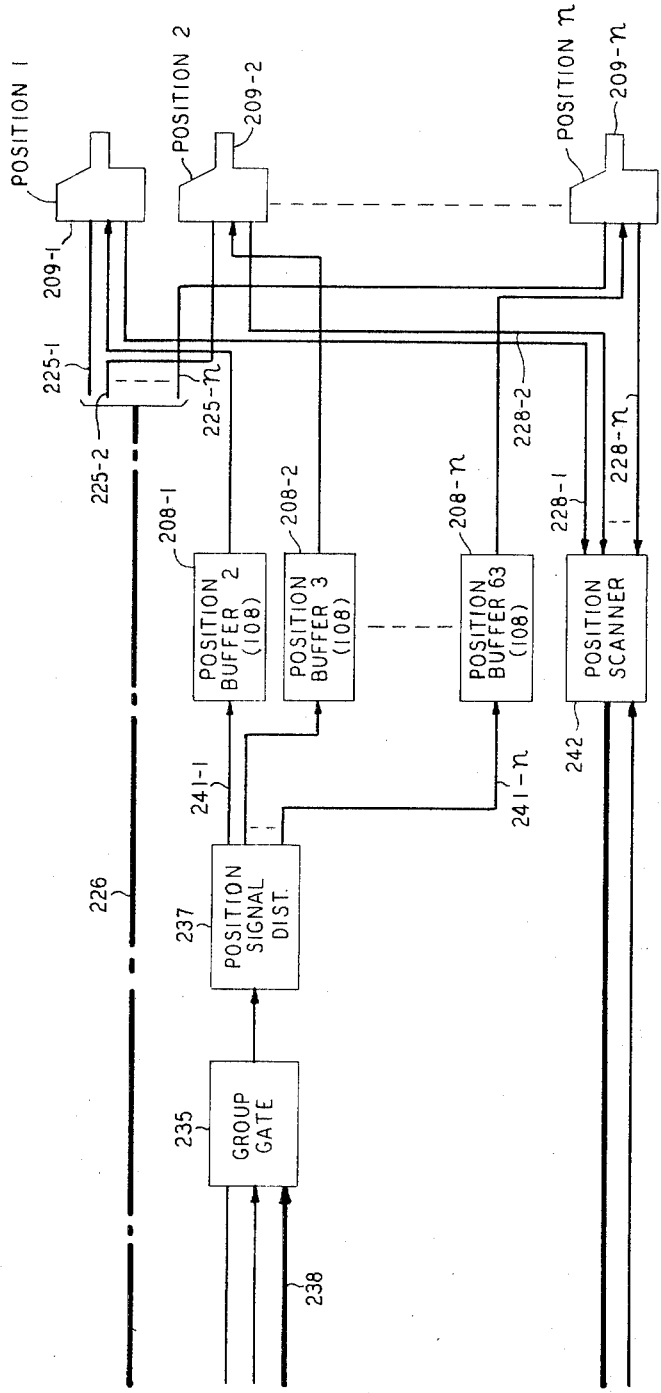

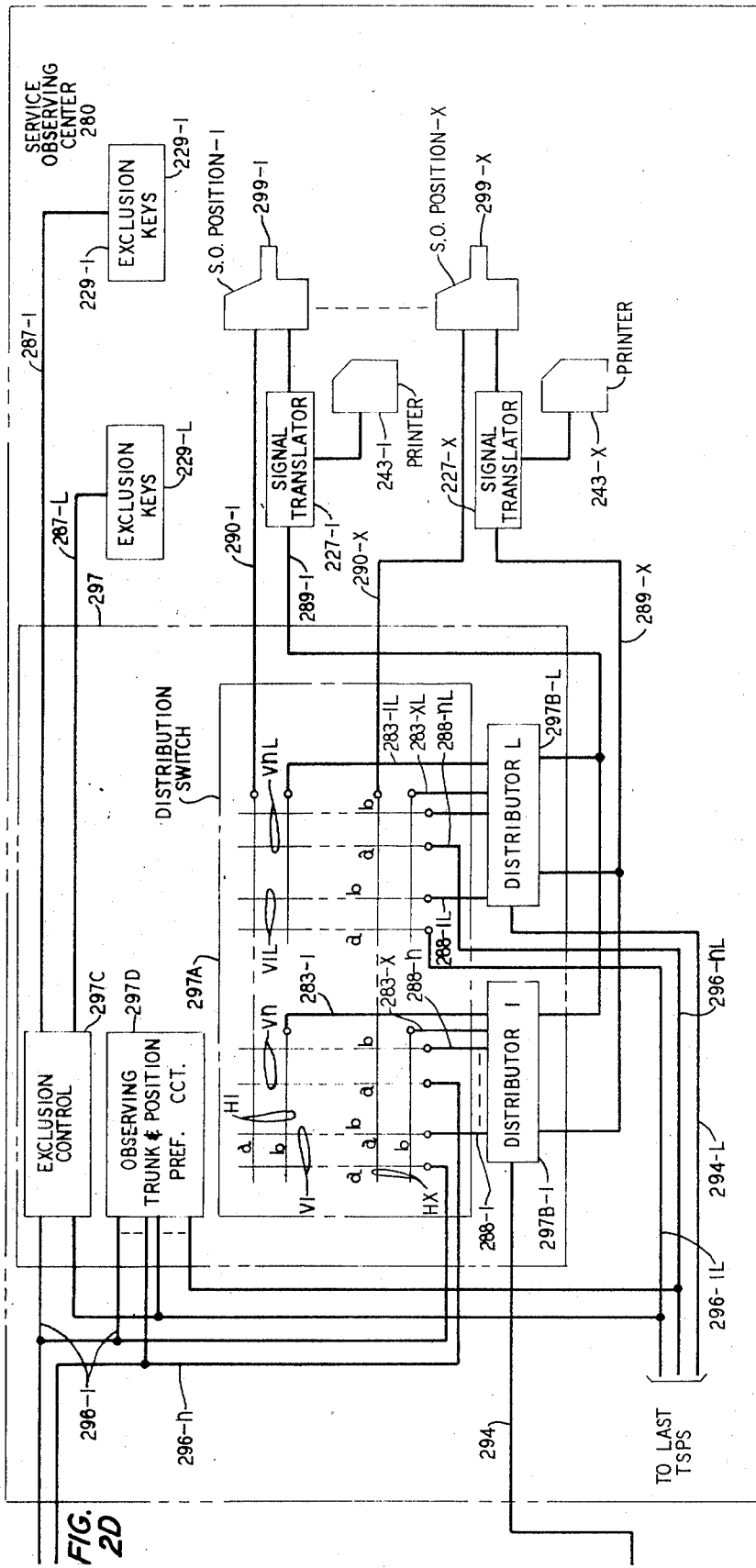

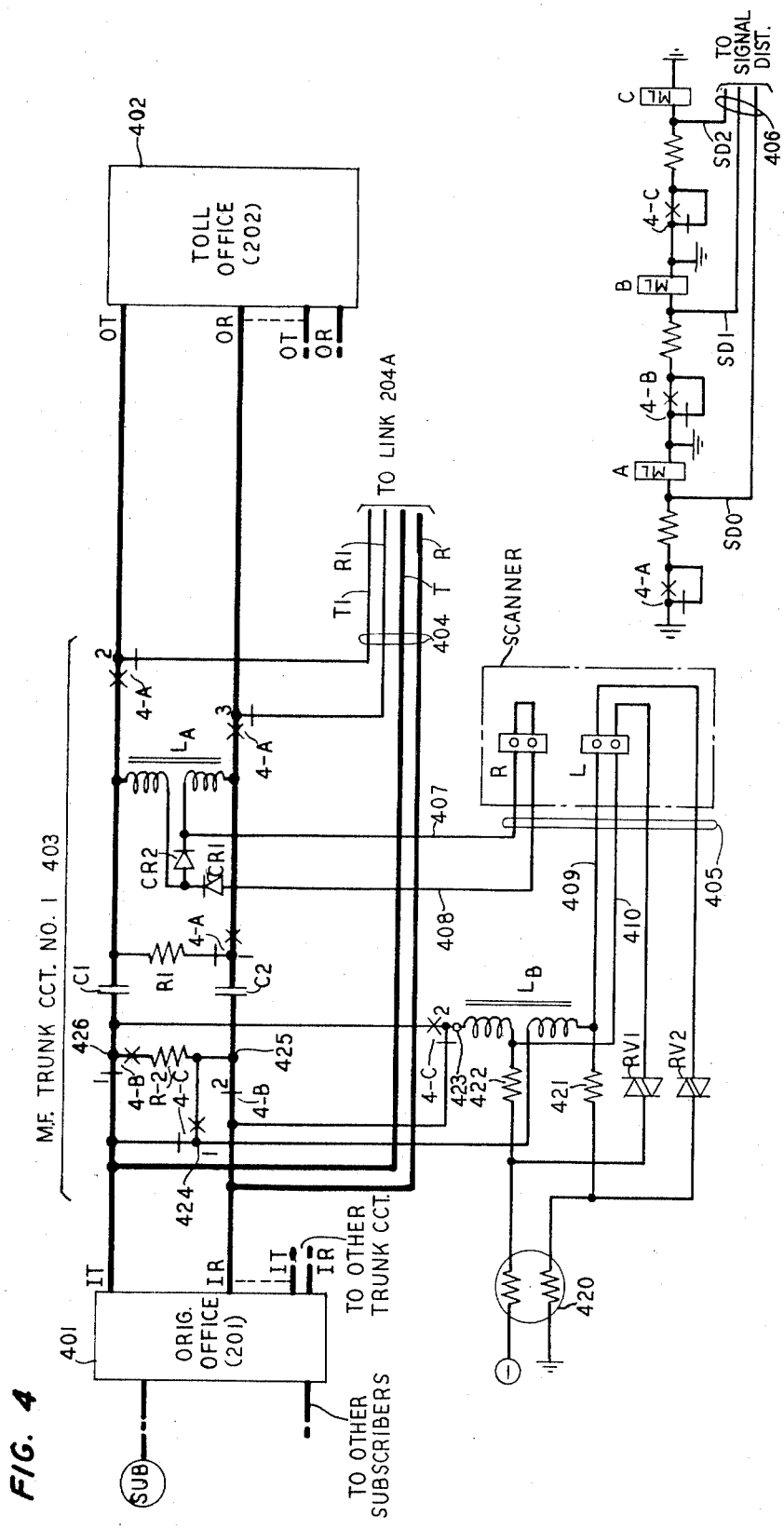

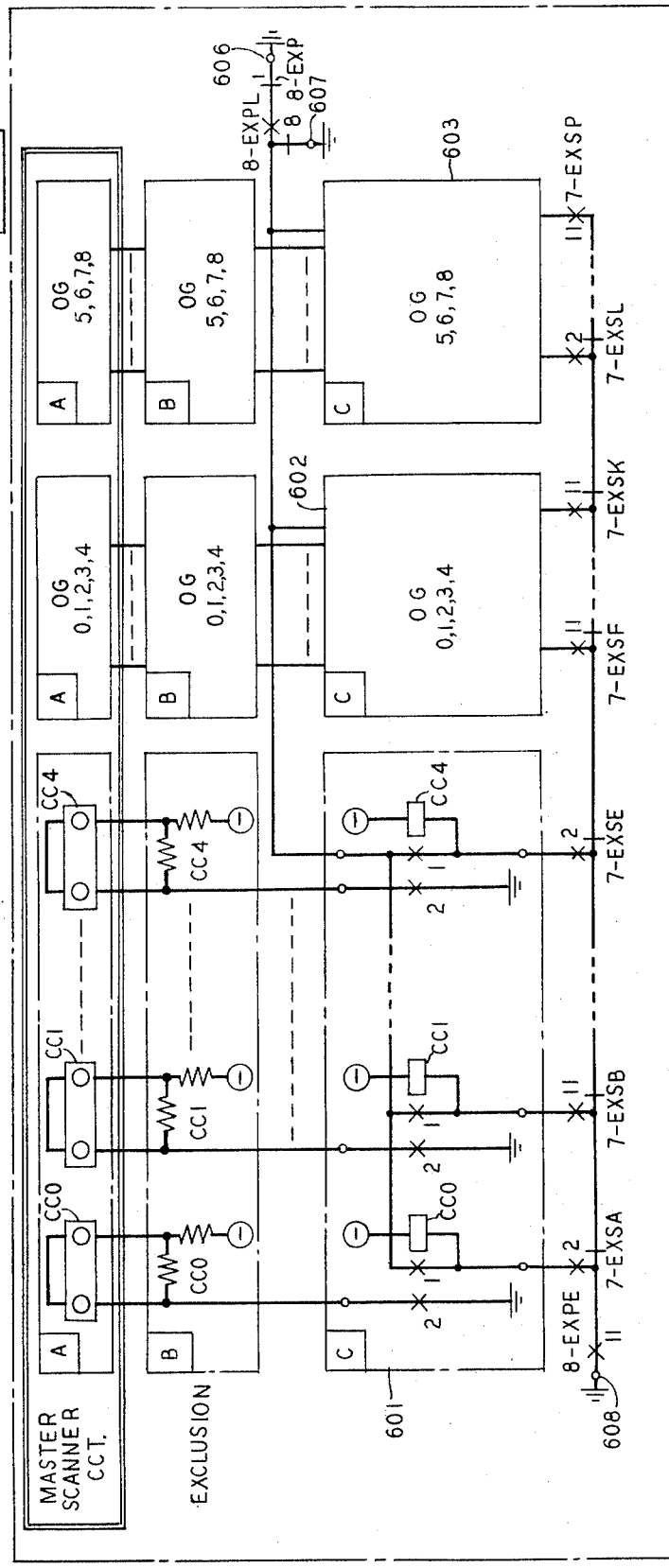

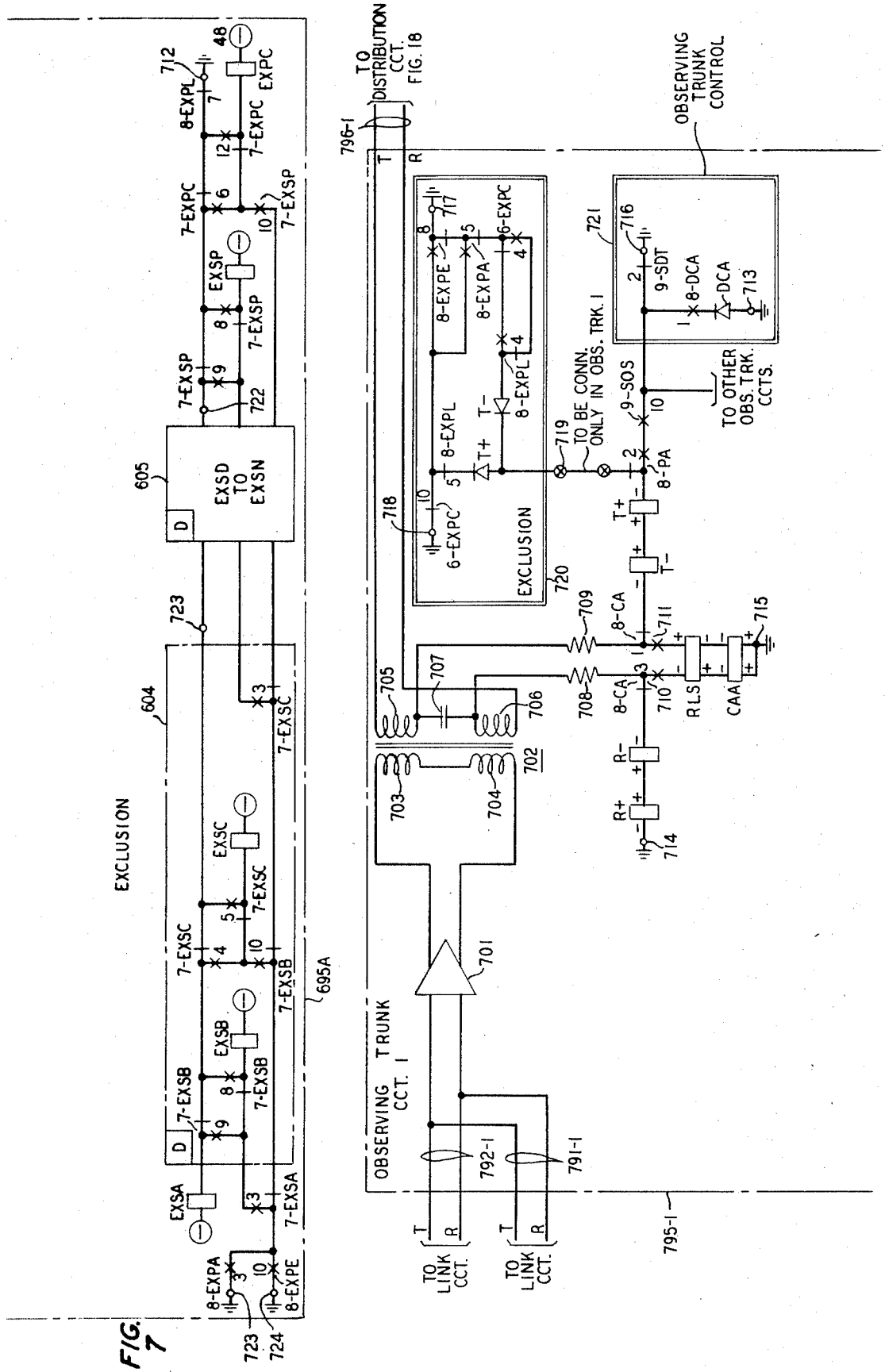

DISTRIBUTOR SIGNAL CODING

| SIGNAL REG. RELAY OPERATED | SIGNAL BEING RECEIVED | | |
|---|---|---|---|
| | FIRST SIGNAL PULSE | | SECOND SIGNAL PULSE |
| | SIGNAL GROUP | OBS. TRK. CCT. NO. | |
| 20-A1 | 0 | | 00-03, 16-19 |
| 20-A2 | 1 | | 04-07, 20-23 |
| 20-A3 | 2 | | 08-11, 24-27 |
| 20-A4 | 3 | | 12-15, 28-31 |
| 21-B1 | | 1, 5 | 00, 04, 08, 12, 16, 20, 24, 28 |
| 21-B2 | | 2, 6 | 01, 05, 09, 13, 17, 21, 25, 29 |
| 21-B3 | | 3, 7 | 02, 06, 10, 14, 18, 22, 26, 30 |
| 21-B4 | | 4, 8 | 03, 07, 11, 15, 19, 23, 27, 31 |
| 21-C1 | | 1-4 | |
| 21-C2 | | 5-8 | |
| 21-C3 | | | 00-15 |
| 21-C4 | | | 16-31 |

FIG. 14

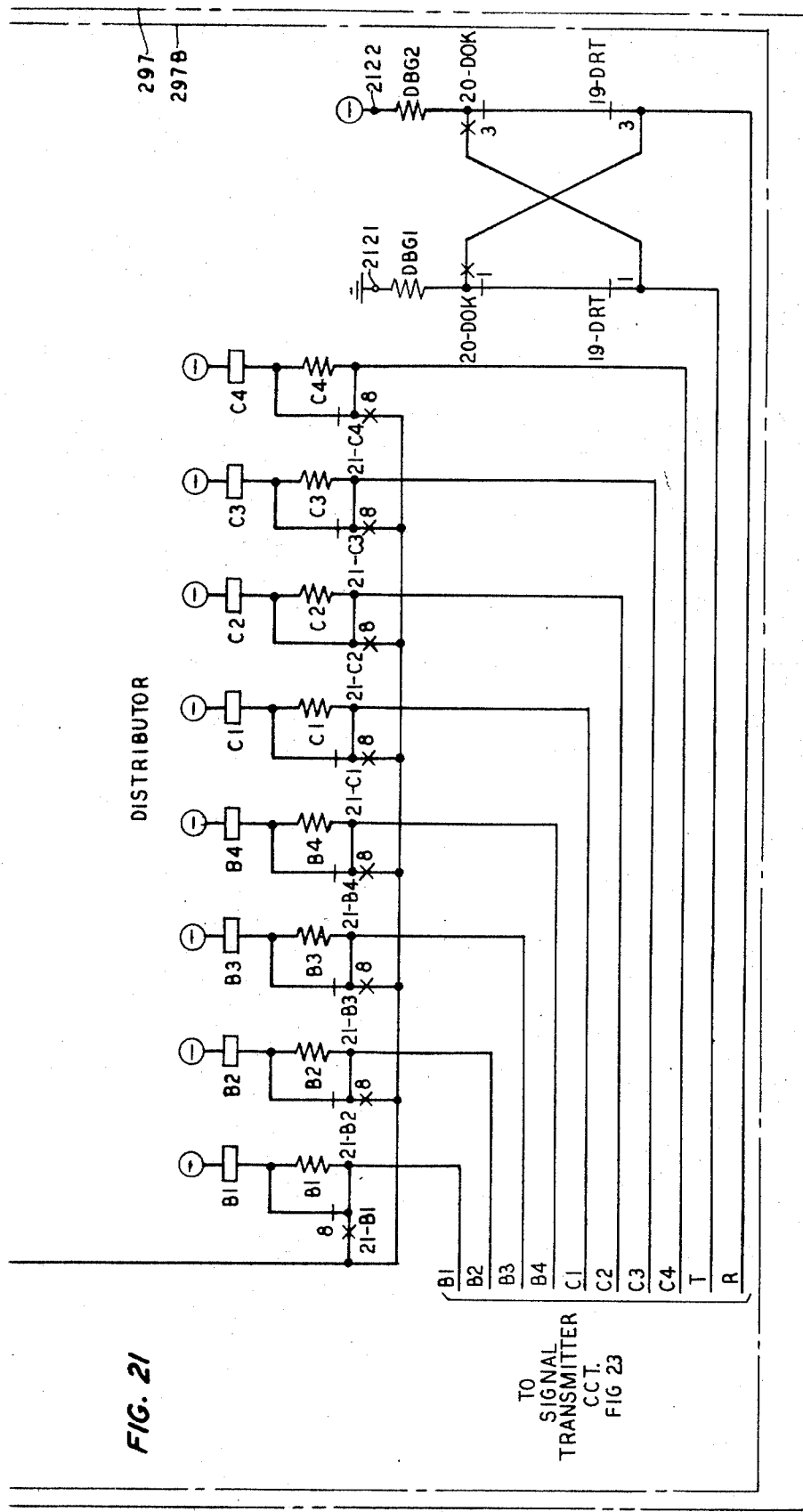

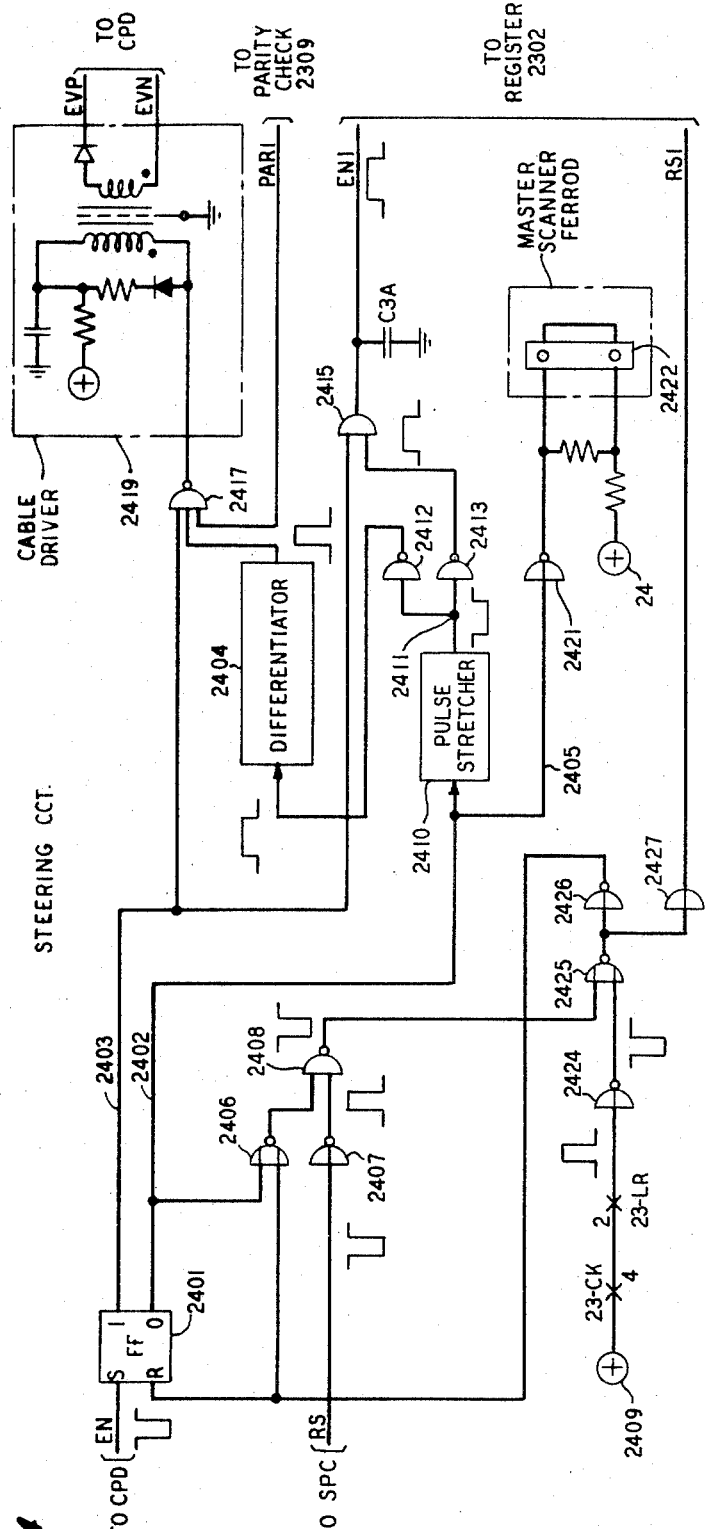

Aug. 25, 1970  R. J. JAEGER, JR., ET AL  3,525,818
SERVICE OBSERVING SYSTEM
Filed July 11, 1967  38 Sheets-Sheet 25

*FIG. 26*

| FIG.26 |
| FIG.27 |
| FIG.28 |
| FIG.29 |
| FIG.30 |
| FIG.31 |
| FIG.32 |

| SIGNAL ASSIGNMENTS | | | | | | | |
|---|---|---|---|---|---|---|---|
| SIG. NO. | TRANSLATION RELAY | | | SIGNAL GROUP | | | |
| | 27-A- | 27-B- | 27-C- | 27-SG0 | 27-SG1 | 27-SG2 | 27-SG3 |
| 00 | 1 | 1 | 3 | 28-0 | | 32-PSCG | 30-CR |
| 01 | 1 | 2 | 3 | 28-1 | | 32-SSCG | 31-CTM |
| 02 | 1 | 3 | 3 | 28-2 | | 32-PPD | 30-HLD(RLS) |
| 03 | 1 | 4 | 3 | 28-3 | | 32-PCOL | 31-REC |
| 04 | 2 | 1 | 3 | 28-4 | | 32-PSCD | 30-RF |
| 05 | 2 | 2 | 3 | 28-5 | | 32-SPD | 30-RB |
| 06 | 2 | 3 | 3 | 28-6 | | 32-SCOL | |
| 07 | 2 | 4 | 3 | 28-7 | | 32-SSCD | 30-CC |
| 08 | 3 | 1 | 3 | 28-8 | | 32-SACL | 31-CCL |
| 09 | 3 | 2 | 3 | 28-9 | | | 30-PRR |
| 10 | 3 | 3 | 3 | 28-I | | | 30-HLD |
| 11 | 3 | 4 | 3 | 28-D | | | 30-HLD & 30-PRR(RLS) |
| 12 | 4 | 1 | 3 | 28-A | | | 31-STMF |
| 13 | 4 | 2 | 3 | 31-ST | | 32-NOA | 31-STM |
| 14 | 4 | 3 | 3 | | | 32-NOAF | 31-CLN |
| 15 | 4 | 4 | 3 | 29-PC | 30-SA | 30-CLD | 30-CLG |
| 16 | 1 | 1 | 4 | 31-KPF | | | 30-TCB |
| 17 | 1 | 2 | 4 | 31-KPB | | | 31-RLF |
| 18 | 1 | 3 | 4 | 31-KPN | | | 29-PA |
| 19 | 1 | 4 | 4 | 31-KPS | | | 29-PR |
| 20 | 2 | 1 | 4 | 31-KPT | | 29-CST | 30-NOB |
| 21 | 2 | 2 | 4 | 31-KPR | | 29-CO+ | 30-EMG |
| 22 | 2 | 3 | 4 | 31-FKP | | | 30-OVS |
| 23 | 2 | 4 | 4 | 28-O | | 29-NDO | 29-T¢C |
| 24 | 3 | 1 | 4 | 28-M | | 29-HDO | 29-NFY |
| 25 | 3 | 2 | 4 | 28-H | | 29-HST | 29-CHG |
| 26 | 3 | 3 | 4 | 28-P | | 29-HO+ | |
| 27 | 3 | 4 | 4 | 28-# | | 30-HG | |
| 28 | 4 | 1 | 4 | | | 29-NO+ | |
| 29 | 4 | 2 | 4 | | | 29-NST | |
| 30 | 4 | 3 | 4 | | | | |
| 31 | 4 | 4 | 4 | 30-TKD | 30-SA(RLS) | 30-CLD | 30-CLG |

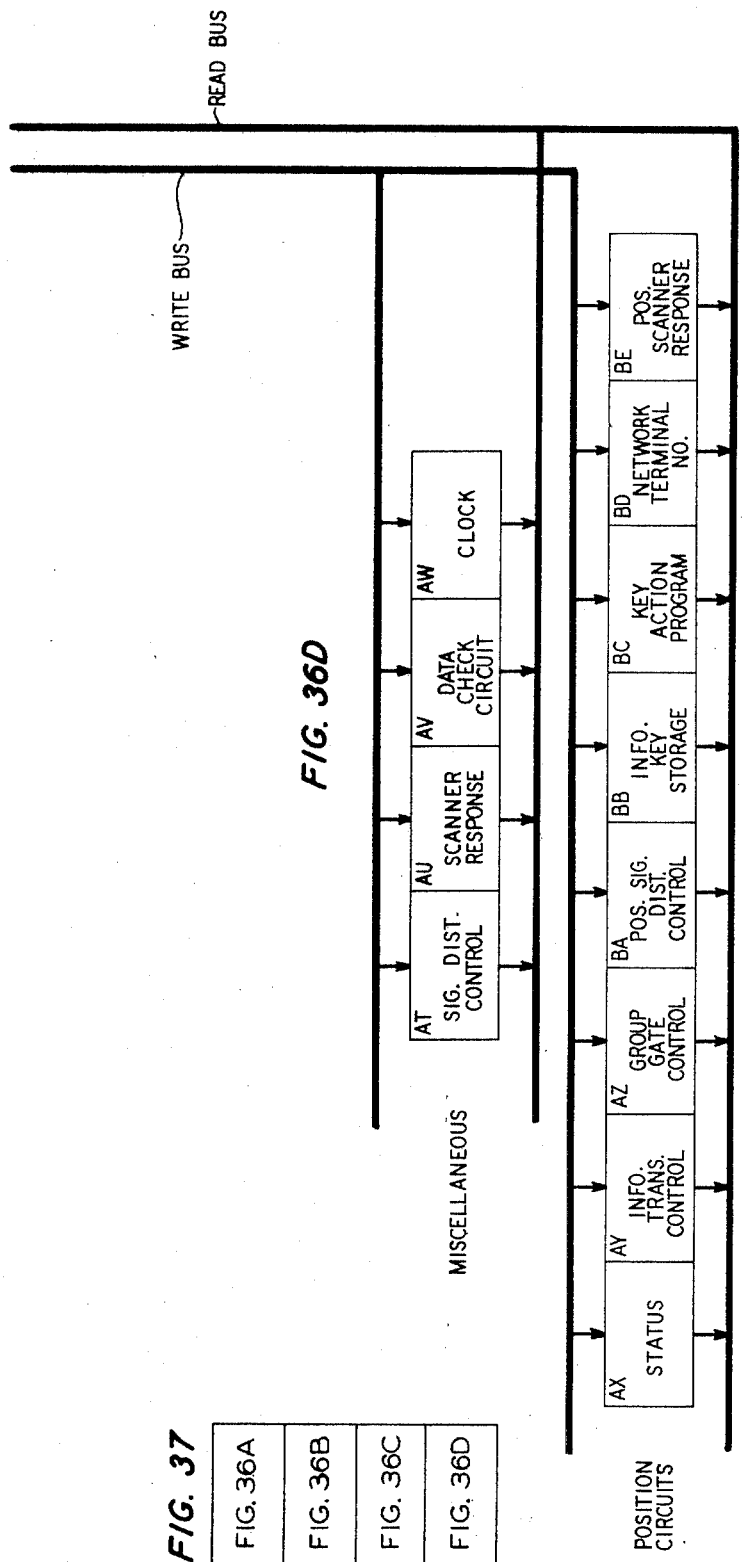

3,525,818
SERVICE OBSERVING SYSTEM
Richard J. Jaeger, Jr., Colts Neck, and George E. Koch, New Monmouth, Middletown Township, Monmouth County, N.J., assignors to Bell Telephone Laboratories, Incorporated, Murray Hill, N.J., a corporation of New York
Filed July 11, 1967, Ser. No. 652,476
Int. Cl. H04m 3/24
U.S. Cl. 179—27                                                       31 Claims

ABSTRACT OF THE DISCLOSURE

A service observing system is disclosed in which the switching network of an office is used to interconnect a calling trunk circuit:

Figure 2B:
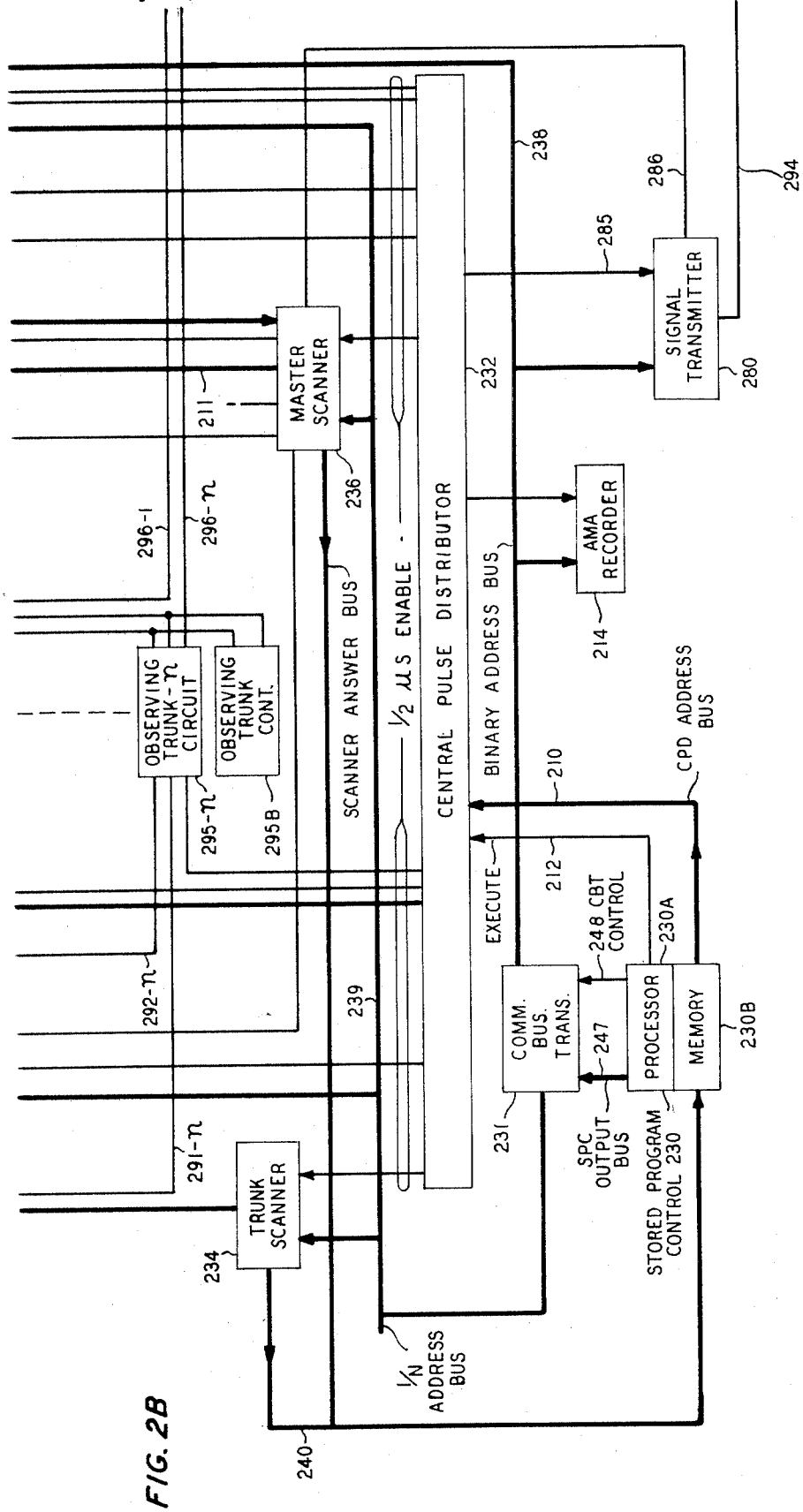

(1) with other circuits within the office so that the call may be forwarded to the next office;
(2) with an assistance operator position so that person-to-person and other types of call assistance may be furnished to the calling party; and
(3) with a service observing position so that the quality of service provided by the assistance operator may be observed.

Facilities independent of the switching network and common to all observing positions are provided for transmitting call data from a system controller to the observing positions. The system controller may be selectively conditioned, by means of manually settable switches, to exclude any type of call from service observing.

---

This invention relates to service observing equipment and, in particular, to observing equipment for telephone systems that serve customer-dialed calls requiring operator assistance for their completion.

It is well known that telephone companies spend considerable time, money and effort on the maintenance of their facilities and the training of their personnel so that the service received by their subscriber-customers may be of the highest practicable quality. However, even in spite of this effort, calls are occasionally served in a manner that is less than satisfactory to both the customer and the telephone company. This may be due to the malfunctioning of switching apparatus, the failure of components, mistakes by operators, et cetera. In order that such occurrences may be held to a minimum, it is common practice for many telephone companies to service observe a small percentage of the calls placed through their facilities. Each call selected for observing is connected to an operator who monitors its progress and determines whether the switching equipment functions properly to complete the connection requested by the calling customer. On calls which require operator assistance, i.e., person-to-person, collect, coin, et cetera, the observing operator also monitors the conversation between the customer and the assistance operator to determine whether this assistance is provided efficiently and courteously.

The observing operator normally remains on the connection only long enough to enable her to determine whether the connection desired by the calling party is satisfactorily established. Once she makes this determination, her position is disconnected and made available for observing other calls. In certain systems and on a small percentage of all calls observed, the observing operator may remain on the connection either until the end of the call or until the end of a predetermined interval, such as for example, five or ten minutes. This is done in order that she may observe the quality of any additional service that may be subsequently provided, such as for example, the assistance provided by an operator when the customer flashes his switch hook, the notification by an operator that a coin call is extending into overtime, the notification and collection of charges for coin calls, etc. Another reason for observing a limited number of calls for their duration is to permit the observing operator to time the duration of each call and provide a cross-check on the chargeable time that is derived for the same call by the automatic charging facilities. It should be emphasized that in those instances in which a service observing operator remains on a call beyond the establishment of the connection to the called station, facilities are provided to disconnect her position from the speech path of the connection to ensure the privacy of the customer's conversation.

In prior art service observing systems, manually settable patchboard arrangements are often used to connect the observing equipment, including the observing opertor positions, to the calling circuits selected for observation. A first side of a patchboard, having a typical capacity of 500 circuits, is connected to 500 selected ones of the thousands of lines or trunks in the office. The other side of the patchboard which may have a capacity of only 50 circuits, is connected to the input of the service observing equipment. The 50 circuits on the second side are then manually cross-connected with 50 selected ones of the 500 circuits on the first side. This permits calls on only the selected 50 of the 500 trunks or lines connected to the first side of the patchboard to be extended to the observing equipment. The observing equipment, in turn, controls the extension of calls received by the 50 selected circuits to idle ones of the observing positions.

The prior art patchboard arrangements are effective to provide a connection from an observing position to only the tip-and-ring conductors of a calling circuit. This connection permits: (1) the observing operator to monitor the conversation between the calling party and an assistance operator to which the call may be connected by other equipment; (2) equipment at the observing position to record and display dial pulses or any other form of signaling that may be transmitted forward over the tip-and-ring conductors.

It is desirable or necessary in many systems to provide the service observing operators with additional information beyond that which can be obtained from the tip-and-ring connections established via the patchboards. This additional information may indicate the call type, the keying action taken by a call assistance operator, the digits outpulsed by the switching equipment to the next office, etc. In these cases, in addition to the connections established to the tip-and-ring conductors, connections are also established for each observed call in the prior art systems between the observing positions and the circuits of the office from which this additional information can be obtained. Thus, it is known to establish connections to the assistance operator positions in order that signals may be received regarding the keys depressed by the assistance operators. It is also known to establish connections to control circuits, such as senders, in order that information representing the digits outpulsed to the next office may be made available at observing positions.

Although the foregoing prior art service observing arrangements are reasonably effective to achieve their intended purposes, they are subject to limitations which render them somewhat less than ideal. For example, the patchboard arrangements permit only a limited number of the circuits at a time to be made available for observation. Thus, if an office serves 5,000 incoming lines or trunks and the patchboard has a capacity of only 500 input circuits, only 500 out of the 5,000 circuits of the office may be connected to the first side of the patchboard. Of these 500 circuits, only 50 may be extended via the patchboard cross-connections and made available to the service observing equipment. It is therefore necessary to change either the wiring of the patchboard, or its cross-connections, or both, when it is desired to monitor other circuits. This requirement is burdensome since it limits the flexibility of the observing system by precluding frequent and rapid changes in the circuits under observation.

The prior art systems are also less than ideal since they require the use of relatively expensive facilities for establishing connections from the observing positions to other circuits of the office in order that the observing operators may be provided the additional information they require on many calls above and beyond that which can be obtained from patchboard connections to the tip-and-ring call conductors of the calling circuits.

It may be seen from the foregoing that the prior art service observing arrangements have been of limited capacity since they have not permitted all lines or trunk circuits in an office to be made available concurrently for service observing. They have also been limited in their flexibility since they have not provided facilities whereby the choice of circuits to be observed may be rapidly and easily changed as often as may be desired. They have also required complicated and expensive arrangements for establishing the connections to the various central office circuits from the observing positions.

It is therefore an object of the invention to provide service observing equipment that will afford greater flexibility in the selection of the call circuits that can be connected to the observing positions.

It is a further object to provide service observing equipment which does not require complicated and expensive facilities for transmitting to the observing operators the data and other information they require on the calls extended to their positions.

In accordance with the disclosed illustrative embodiment of our invention, we provide service observing equipment which overcomes the limitations of the prior art arrangements (1) by permitting any call served by the office to be selected for observation; (2) by automatically interconnecting any call selected for observation with an idle observing position; and (3) by presenting the operator at the connected observing position with all the call data she may require without the necessity of establishing any further connections, on a per call basis, from the position to other circuits within the office.

The equipment provided in accordance with our invention includes a plurality of service observing positions, an observing distribution circuit for connecting idle observing positions to the switching network of an office, and apparatus for controlling the network to connect the connected observing positions to the calls selected for observation. The equipment we provide further includes a system controller which stores data for each call served by the office and which, over facilities common to all observing positions, transmits to the observing positions the call information required by the operators thereat.

Our invention is shown as embodied in a common control type of switching system in which the system controller either directly or indirectly controls most of the circuit operations required to serve each incoming call and extend it to the next office. The system controller: (1) monitors the status of many circuits, (2) registers the information received in connection with an incoming call, (3) determines the call type and the service to be provided for each call, and (4) initiates and controls all circuit operations for the serving and forward extension of each call. While performing these functions, the controller also determines which calls are to be observed and effects the circuit operations required to connect calls selected for observation with idle observing positions.

The switching network functions in the usual manner during the serving of each call to interconnect the calling line or trunk circuit with various circuits within the office. For example, the network may connect a calling trunk circuit with a digit receiver for the reception of calling and called station information from a preceding office. It may connect a calling trunk circuit with an outpulser for the transmission of call information to the next office. The network may also connect a calling trunk circuit with an assistance operator so that the service required on person-to-person, collect, coin, and other such calls may be furnished. In accordance with our invention, the network also functions to connect the observing positions with calls that have been selected for observation.

A seizure signal is received by a calling incoming trunk circuit upon the arrival of a call at an office or switching center embodying our invention. This signal is transmitted by the calling trunk circuit to the system controller which, in turn, causes the switching network to establish a connection between the trunk circuit and a digit receiver. The call information outpulsed by the preceding office is detected and translated by the receiver and transmitted to the controller. The network connection to the receiver is released following the termination of outpulsing and a network connection is established between the calling trunk circuit and an outpulser. The call information required by the next office is then outpulsed forward, under control of the system controller. The outpulser is disconnected from the call when it has completed its function.

Prior to the outpulsing operation, the system controller analyzes the call information available to it and determines whether or not the call requires operator assistance. If the call is not to be observed and if operator assistance is required, the controller causes an idle assistance operator position to be connected via the network to the calling trunk circuit. The operator at the assistance position converses with the calling party, determines the assistance he requires, furnishes this assistance, and then releases her position from the call.

In order to describe the operation of our invention, let it be assumed that a call requiring operator assistance is also to be service observed. The decision to observe the call is made by the controller prior to the time it determines that a connection to an assistance operator position is required. The equipment provided in accordance with our invention includes a plurality of observing trunk circuits, each of which has two separate appearances on the switching network. When the system controller determines that a call requiring operator assistance is to be observed, it (1) selects an idle observing trunk circuit, (2) causes the observing trunk circuit to be connected by the observing distribution circuit to an idle observing position, (3) selects an idle assistance position, (4) controls the switching network to establish a connection between the calling trunk circuit and a first network appearance of the selected observing trunk circuit, and (5) causes the network to interconnect the selected assistance operator position with the second network appearance of the observing trunk circuit. The observing trunk circuit provides a low impedance connection between the tip-and-ring conductors of its two network appearances and a high impedance connection extending to the observing position. This permits the calling party and the assistance operator to converse in the same manner as on a call that is not observed. The high impedance connection permits the observing operator to monitor the conversation between the calling party and the assistance operator.

The assistance operator at this time converses with the calling party and provides the service he requires on the call above and beyond the establishment of a connection to the called station. The quantity and type of assistance that she may provide differs greatly in accordance with the call type. Among the services she may provide are a determination of the availability of the called party on a person-to-person call, a determination of whether the called station will accept the charges on a collect call, the furnishing of the services required on charge-to-third party, credit card, and other miscellaneous types of calls. She may also be required to dial the calling and/or called station number on certain calls. On coin calls, she determines the call charges and supervises their deposit at the calling station. The observing operator monitors the efficiency with which this service is performed in order to determine the quality of the service provided on the call.

The equipment at each assistance position includes lamps which are operated by the controller to display call information, and keys which may be depressed by the operator to transmit call information to the controller. When an assistance position is connected to a call, the controller causes its lamps to display the initial call information required by the operator. In addition to this initial information, the controller may cause lamps to be illuminated or extinguished as required to indicate to the operator the progress of the call. The operator may also depress keys at her position to request the controller to display call information beyond that which is routinely presented to her.

The duties of an observing operator amount to considerably more than merely monitoring the conversation between the calling party and the assistance operator. In present-day observing systems, the observing operator also prepares a record for each call containing many items of information, such as for example, the call type, the specific circuits of the office that served the call, the speed and efficiency with which the call is served by the assistance operator, etc. In accordance with our invention, each observing position is provided with a set of display lamps which are operated by the controller during the observation of a call to present to the observing operator much of the call data that is displayed at the assistance position. Each observing position is also equipped with lamps corresponding to the various keys at the assistance position. Each such lamp is illuminated by the controller whenever the key it represents at the assistance position is depressed. The information presented to the observing operator by the display lamps at her position is used in preparing her call records.

The equipment provided at each observing position in accordance with our invention further includes a printing recorder which operates in response to signals from the controller to print items of numerical call data that are required by the observing operator for the preparation of her records. This data may include, for example, calling and called numbers, etc. The records prepared by the observing operator from the information provided by the printer and her position lamps, are used in subsequent studies to determine the quality of service provided on each call.

Each assistance position is equipped with a release key which is depressed by the operator when she has furnished the services required of her on a call. The controller detects the depression of the key and causes the network to release the assistance position from the call. Each observing position contains a release key which, on most calls, is depressed subsequent to the release of the assistance position to release the observing position from a calling circuit. However, as already mentioned, it is desirable that a limited number of calls be observed for their duration. On these, the release key at the observing position is not depressed following the release of the assistance position; the observing position remains connected via the network to the calling trunk circuit; and the observing operator records additional items of information pertaining to the quality and quantity of any subsequent assistance provided on the call.

The observing distribution circuit comprises a distribution switch which functions during the serving of each observed call to interconnect an idle observing position with the observing trunk circuit selected by the system controller. The distribution circuit and its distribution switch are required since each observing trunk circuit is not permanently connected on a one-for-one basis with an observing operator position. There are more observing positions than there are observing trunk circuits in an office. In accordance with customary service observing practices, the observing positions are remotely situated with respect to an office serving calls that are to be observed. Further, the observing positions are normally arranged to observe calls served by a plurality of switching centers. The distribution circuit functions to connect the observing positions with observing trunk circuits in a plurality of switching centers. Contrariwise, the observing trunk circuits are situated at, and individual to, a particular switching center. By way of example, a typical switching center may be equipped with eight observing trunk circuits, each of which is connected to the distribution circuit which, in turn, may be situated at the service observing center and connected to 20 serving observing positions.

The distribution circuit does not operate under direct control of the system controller. Instead, it is an autonomous circuit and functions independently to interconnect an observing trunk circuit with an idle observing position. The distribution circuit performs this function solely in response to the seizure of an observing trunk circuit by the controller on a call that is to be observed.

The distribution circuit supplies the controller with information indicating whether idle observing positions are currently available. The controller uses this information in determining whether each call should be served on an observed or on an unobserved basis. If a signal is received indicating that observing positions are available, the controller then determines whether any observing trunk circuits are currently available. If a trunk circuit is available, the system controller seizes it for use on a call. The trunk circuit, in turn, transmits a request signal to the distribution circuit, which then functions autonomously of the system controller to interconnect the requesting trunk circuit with an idle observing position. The system controller is notified by the distribution circuit when the connection of the observing circuit to an observing position is completed. At that time, the system controller controls the switching network to establish a connection from the calling trunk circuit to a first network appearance of the observing trunk circuit, and to establish a second connection from the second network appearance of the observing trunk circuit to the assistance position selected for use on the call.

The call information that is transmitted from the system controller to the observing position is transmitted via the distribution switch. Under normal operations, a plurality of calls within a switching center will be concurrently under observation. It may thus be expected that the system controller will transmit information for a plurality of calls sequentially to the distribution circuit, which in turn must distribute each item of information to the proper observing position.

The system controller knows the identity of the observing trunk circuit for each call currently being observed. However, it does not know the identity of the observing position serving each call since these circuits are selected autonomously by the distribution circuit. Since the system controller does not know the identity of the observing position, it cannot directly specify which observing position should receive each item of call information transmitted to the distribution circuit. Instead, the system controller prefixes the transmission of each item of call information with signals specifying the identity of the observing trunk circuit that is connected to the call to which the information pertains. The distribution circuit uses this trunk information to distribute received call information to the proper observing position. It performs this function by first identifying the observing position to which the specified observing trunk circuit is connected and by then controlling the distribution switch to establish a path over which the received call information may be transmitted to the identified observing position.

It is desirable, in connection with subsequent studies to which observing call records are subjected, that provisions be made for controlling the types of circuits that are service observed. For certain studies, it is desirable that an approximately equal number of circuits of all types be service observed. For other studies, it is often desirable that only a limited number of circuit types be observed. With the prior art patchboard arrangements, it is necessary to manually change the cross-connections when it is desired to change the circuits being observed. This time-consuming procedure limits the flexibility of the prior art systems and effectively prevents frequent changes of the circuits being observed.

Another limitation of the patchboard arrangements is that they permit only a selection of the physical circuits, rather than the types of calls, that are to be observed. In the prior art switching systems in which each trunk circuit typically served only a single type of call, the selection of a group of trunk circuits for observing, in essence, also specifies the call type. However, in many of the more recently developed switching systems, this relationship no longer exists, i.e., a trunk circuit extending from an originating office to a toll or tandem office, may serve many different types of calls. In these cases, the toll or tandem office is typically advised as to the call type of means of MF outpulsing from the local office. The patchboard arrangements are inadequate in such situations since they cannot provide service observing by call type whenever a trunk group is used to serve more than one type of call.

The service observing equipment provided in accordance with our invention overcomes the limitations of the prior art and provides new and novel facilities which are flexible in their operation and which permit the types of calls that are to be observed to be specified and to be changed as often as may be desired without the necessity of any manual rearrangement of cross-connections. The call type selection facilities provide a true selection by call type, not by calling circuit, and thus are suitable for use in systems wherein a trunk group may serve more than one type of call.

In accordance with our invention, we provide a plurality of control keys at a location common to a group of observing positions. Each key represents and is individual to one of the different types of calls that may be served by an office with which the observing equipment is associated. The observing facilities are made available to all types of calls when all keys are unoperated. When it is desired to exclude certain types of calls from service observing, the key associated with each type that is to be excluded is depressed. The depression of each key transmits a signal to the system controller of the office advising it of the newly established exclusion. From then on, until the setting of the keys is again changed, the system controller automatically precludes a service observing position from being attached to calls of the type represented by depressed exclusion keys. With this arrangement, the types of calls that may be observed can be changed frequently from time to time, as often as may be desired, in response to changing traffic patterns or in response to changing statistical requirements.

Features of the invention are:

(1) The provision of equipment including a switching network which, upon the receipt of a call, effects routine call establishment interconnections as well as interconnections between observing equipment and the call receiving credit.

(2) The provision in a switching system of a network which, in response to the receipt of an incoming call, performs call establishing interconnections, and, concurrently, when it is determined that the call is to be service observed, interconnects the calling circuit with observing facilities, including an observing operator position.

(3) The provision of a system controller which receives information pertaining to each incoming call, determines the call establishing interconnections required within the switching center, controls the establishment of the interconnections via a switching network, determines whether the call is to be service observed, determines whether facilities are available for observing the call, and controls the switching network to interconnect the calling circuit with observing facilities including an idle service observing position.

(4) The provision of autonomously operating service observing equipment which, in response to the receipt of an indication that a call is to be observed, interconnects an idle observing position with the call establishing network of the office so that the system controller may cause the network to connnect the calling circuit to the service observing facilities, including the observing position.

(5) The provision of a switching network and a system controller which together operate in response to the receipt of a call to establish a first network path from a calling circuit to service observing facilities and to establish a second network path from the service observing facilities to an idle assistance operator position.

(6) The provision of service observing equipment in which call data is transmitted to an observing position over facilities common to all positions.

(7) The provision in a service observing system of a system controller which transmits to each observing position the data it requires on a call including information specifying the call service provided at a connected assistance operator position.

(8) The provision in a switching system of service observing facilities which permit any specified type of call to be automatically excluded for some service observing.

(9) The provision of a service observing system in which call data transmitted from the system controller to the observing position is initially applied to a distribution circuit which operates independently of the system controller to determine the observing position to which each item of data is to be directed.

Figure 23:
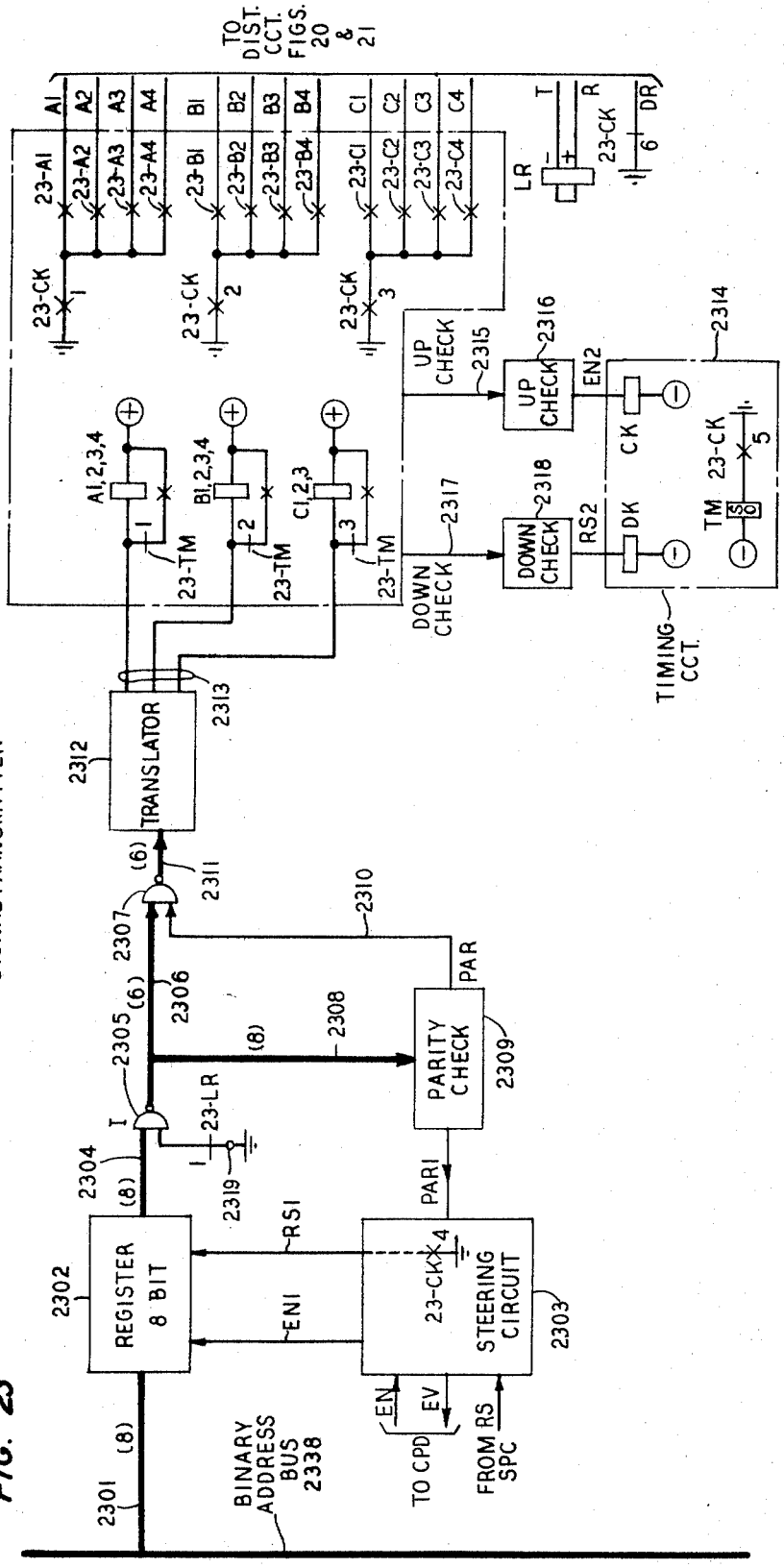
Figure 34:
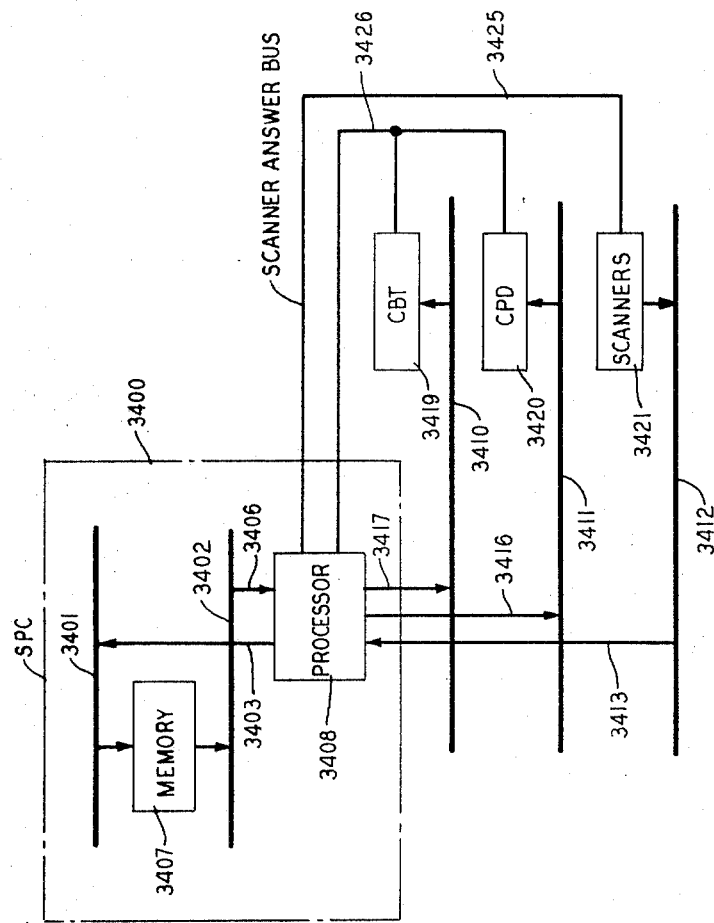
Figure 35:
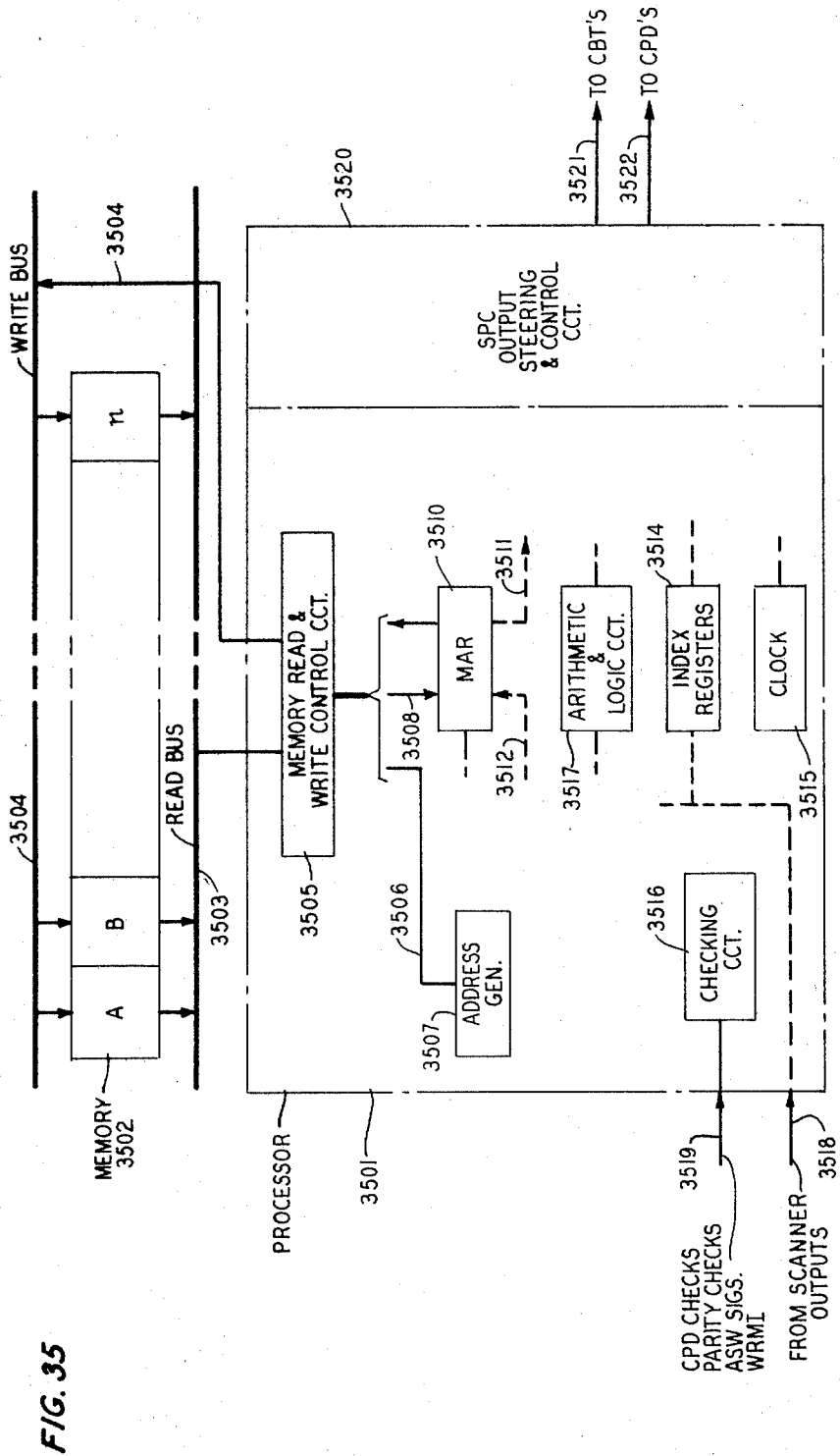

These, and other objects and features of the invention will be more readily understood upon a reading of the following description thereof taken in conjunction with the drawing, in which:

FIG. 1 discloses our invention in block diagram form;

FIGS. 2A through 2D, when arranged as shown in FIG. 3, diagrammatically disclose additional details of our invention;

FIG. 4 discloses a trunk circuit arranged for MF signaling;

FIGS. 6 through 10, when arranged as shown in FIG. 5, disclose the observing trunk circuits;

FIG. 11 comprises a table illustrating the manner in which call data transmitted to the distribution circuit is encoded;

FIGS. 12 through 21, when arranged as shown in FIG. 22, disclose the details of the distribution circuit;

FIGS. 23 and 24 together disclose the details of a signal transmitter;

FIGS. 26 through 32, when arranged as shown on FIG. 25, disclose a signal translator, a printer, and an observing position;

FIG. 33 comprises a table illustrating the manner in which received coded data is utilized by the signal translator;

FIGS. 34 and 35 disclose a stored program system controller; and

FIGS. 36A through 36D, when arranged as shown in FIG. 37, illustrate the manner in which the memory facilities of the stored program controller may be subdivided.

INDEX

Figure 8:
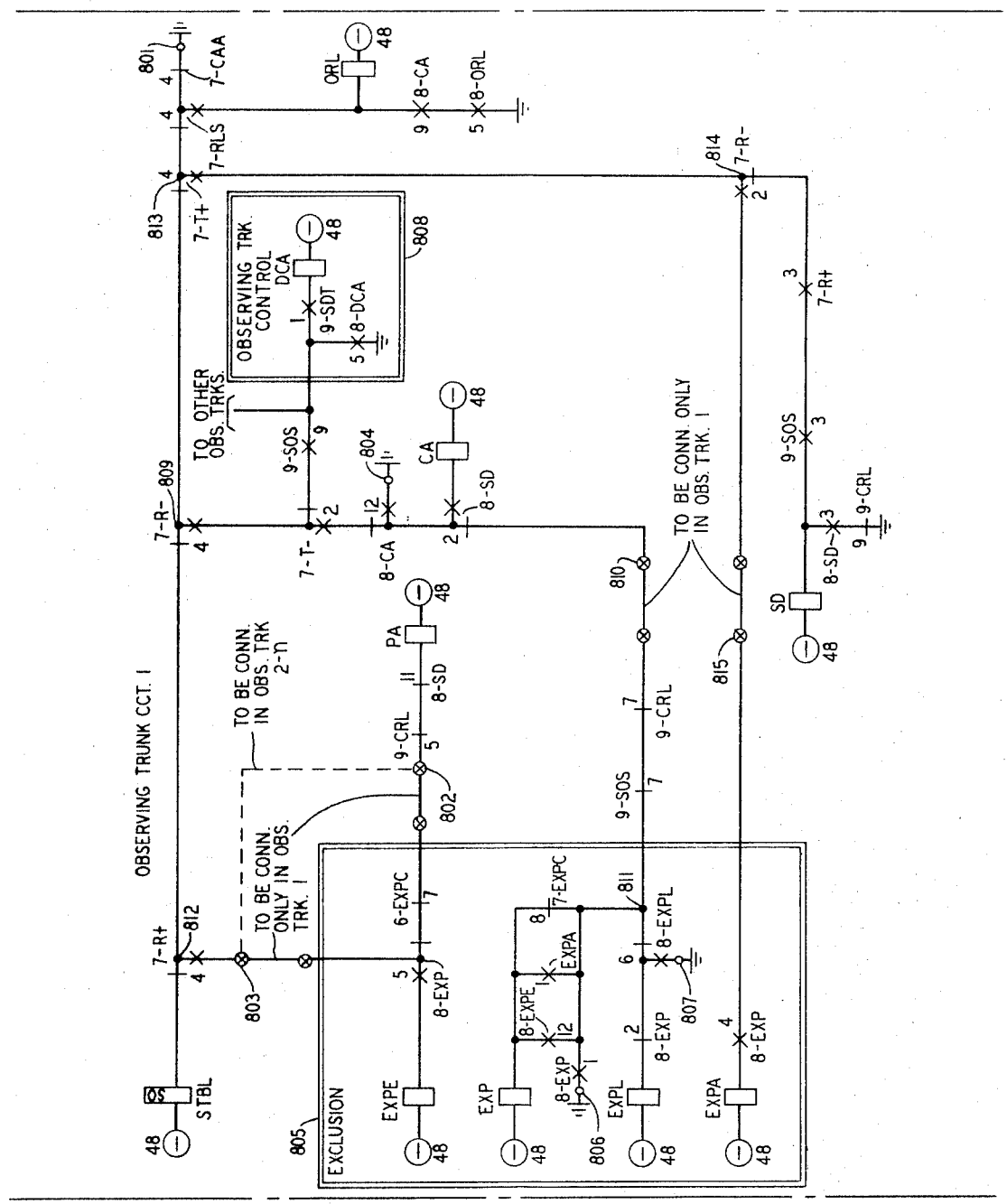
Figure 9:
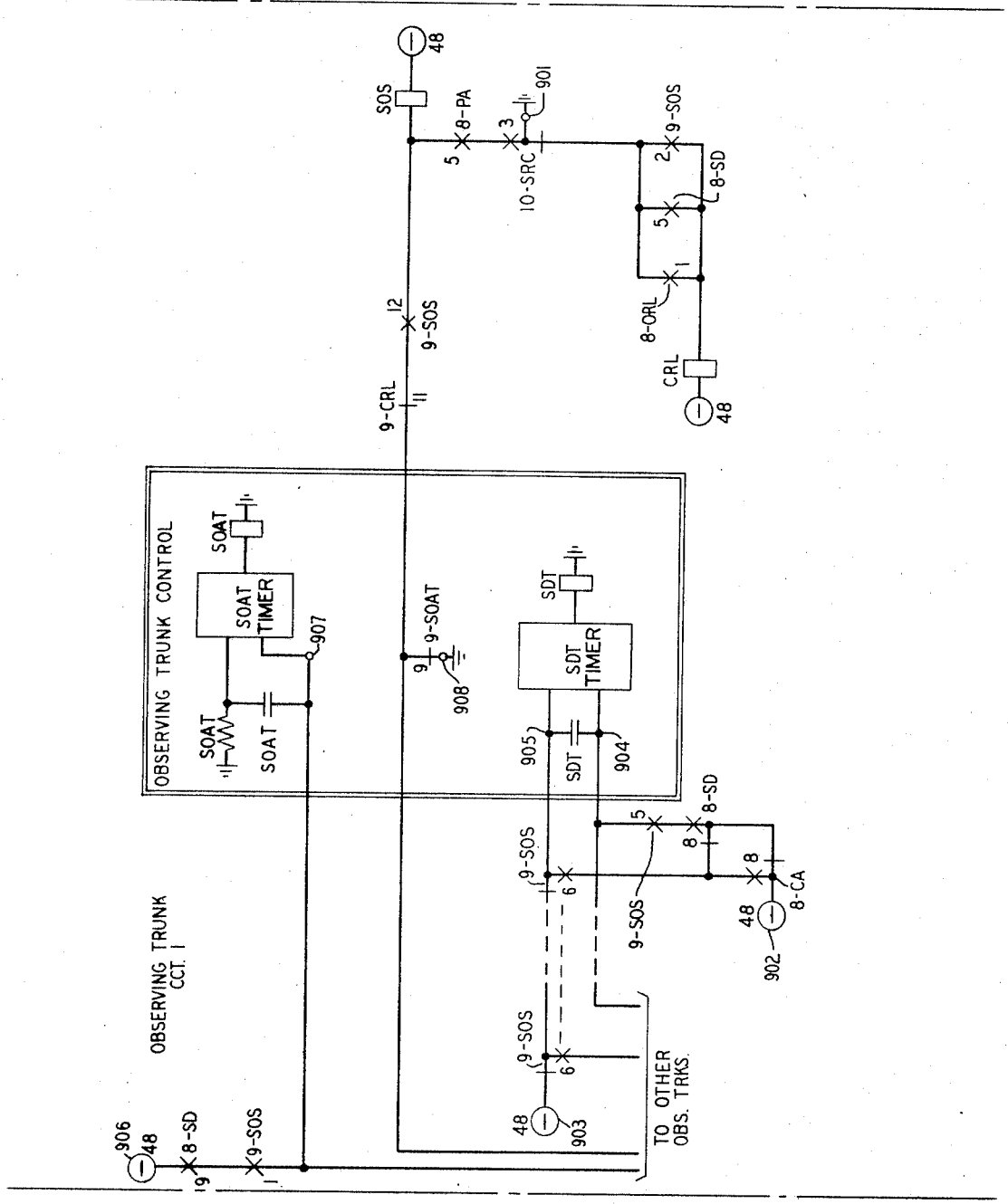

| | Column |
|---|---|
| General Description—FIG. 1 | 9 |
| Detailed Description | 13 |
| Apparatus Designations | 13 |
| System Operation—FIGS. 2A through 2D | 13 |
| Signal Transmitter—FIGS. 23 and 24 | 24 |
| Observing Trunk Circuits—FIGS. 6 through 10 | 27 |
| Selection by SPC of an Idle Observing Trunk Circuit | 28 |
| No Position Available | 29 |
| Service Observing Allowed | 31 |
| Service Observing Facilities Available | 31 |
| Seizure of an Idle Observing Trunk Circuit | 32 |
| Distribution Circuit—FIGS. 12 through 21 | 33 |
| Position Preference Circuit Operation | 33 |
| Observing Trunk Circuit Preference | 34 |
| Distribution Switch Crosspoint Closures | 35 |
| Release of Preference Circuits | 36 |
| Call Accepted Signal Timing | 37 |
| Call Accepted in Less than 150 Milliseconds | 37 |
| Call Accepted in 150 to 300 Milliseconds | 38 |
| Call Connection Established to Observing Position | 38 |
| Call Not Accepted | 39 |
| SOAT timer—FIG. 9 | 39 |
| Data Transmittion to Observing Position | 39 |
| Call Data Signal Coding | 41 |
| Signal Registration in Distribution Circuit | 42 |
| Signal Distribution | 43 |
| Reset Signal Failure | 44 |
| Signal Translator—FIGS. 25 through 32 | 45 |
| Signal Translation | 47 |
| Signal Registration | 48 |
| Printed Signals | 48 |
| Grouped Signals | 49 |
| Momentary Signals | 50 |
| Supervisory Signals | 51 |
| Keying Signals | 51 |
| Locked In Signals | 53 |
| Release of Observing Position | 53 |
| Call Exclusion | 54 |
| MF Trunk Circuit—FIG. 4 | 64 |
| Stored Program Controller (SPC)—FIGS. 34, 35, 36A through 36C | 66 |

GENERAL DESCRIPTION—FIG. 1

FIG. 1 diagrammatically discloses our invention in a manner which facilitates an understanding of its broader system concepts. Our invention is shown thereon as being embodied in equipment which provides various types of service on calls incoming to a toll office from the local offices it serves on an originating basis. This equipment, which is positioned intermediate the toll office and its local offices, is typically referred to as a traffic service position system (TSPS). It is designated in this manner, rather than as a conventional switching system, since it performs no switching operations whatsoever in connection with the route or trunk that is to be utilized in extending a call from a local to a toll office. The sole function of the TSPS equipment is to provide various types of service on the calls incoming to the toll office.

Each call extended from a local to the toll office is monitored and timed by the TSPS equipment and, if desired, charge data therefor is recorded upon the call termination. If the call requires operator assistance for its completion, a connection within the TSPS center to an assistance operator position is established concurrently with the extension of the call to the toll office. The assistance operator converses with the calling party, performs the services required of her, depresses keys to indicate the type of service provided and to disconnect her position from the call. The calling and called stations remain connected speechwise via the TSPS equipment for the call duration.

A TSPS center of the type shown generally in FIG. 1, but without any service observing facilities, is disclosed in the R. J. Jaeger et al. application, Ser. No. 519,787, filed Jan. 10, 1966. The Jaeger et al. application together with the patents and applications cited therein, are hereby incorporated as a part of the present specification to the same extent as if fully disclosed herein. Consequently, the present specification, for the most part, discloses only the details of circuits which have not already been disclosed by Jaeger et al.

Shown in FIG. 1 is a TSPS center 100, which is inter connected between local office 101 and toll office 102. The TSPS center contains a plurality of trunk circuits of which only circuit 103-1 is shown. Each trunk circuit 103- is connected on its incoming side to a local office outgoing trunk circuit, such as 120-1, and on its outgoing side to a toll office incoming trunk circuit, such as 121-1. With this arrangement, each local office outgoing trunk circuit is individual to a particular TSPS trunk circuit 103- and, in turn, to a particular toll office incoming trunk circuit 121-. Each call originating at local office 101 and requiring a routing through toll office 102 is extended via an outgoing trunk circuit 120- to its associated TSPS trunk circuit, and, in turn, to its associated toll office incoming trunk circuit.

The TSPS center includes switching network 104, which is connected on its left side (trunk side) to trunk circuits 103- and on its right side (position side) to various circuits, such as for example, outpulsers 106, digit receivers 107, and assistance operator positions 109-1 through 109-n, via conductors 110-1 through 110-n. The switching network 104 comprises linke 104A, which contains the circuit paths and equipment required to interconnect the trunk side and position side circuits. The network 104 further comprises the network controller 104B, which controls the operation of the link 104A in its path-establishing functions. The link functions during the serving of each call to interconnect the calling trunk circuit 103- with various position side circuits in order that the service required on the call may be provided by the TSPS center.

Each TSPS trunk circuit 103- is connected by means of two separate conductor pairs to separate link appearances on the trunk side of link 104A. Conductor pair T and R connects the incoming side of the trunk circuit to a first link appearance. This permits circuits, such as for example, digit receivers 107 and assistance positions 109-, on the position side of the link to communicate with the calling party. The T1 and R1 conductor pair connects the outgoing end of the trunk circuit to a second link appearance. This permits the circuits on the position side of the link, such as for example, outpulsers 106, to communicate with the toll office. Digit receivers 107 receive call information outpulsed from a local office on each call served by the TSPS center. These receivers may be of different types, such as for example, DP or MF, depending upon the mode of outpulsing utilized. Outpulsers 106, which advantageously may be of the MF type, transmit to the toll office information it needs on each call.

The TSPS center 100 further includes a system controller (system control 105), which is connected by cable 113 to trunk circuits 103-, by cable 116 to network controller 104B, by cable 111 to outpulsers 106 and digit receivers 107, by cable 112 to position buffers 108-, and by cable 115 to AMA recorder 114. These connections permit the system control to regulate, control, and coordinate the operation of each circuit in the TSPS center so that each call may receive the service it requires.

The equipment provided in accordance with our invention includes a plurality of observing trunk circuits 195- at the TSPS center (only circuit 195-1 is shown) and, at a remotely situated service observing center 180, includes a plurality of service observing positions 199-1 through 199-X, and a distribution circuit 197 which comprises a distribution switch 197A and a distribution switch 197A and a distributor 197B.

Each observing trunk circuit is connected to individual appearances on each side of the switching network. Thus, trunk circuit 195-1 is connected by conductor path 191 to the trunk side of the link and by conductor path 192 to the postion side. Each observing position 199- is connected over one of conductors 198-1 through 198-X to distribution switch 197A. The distribution switch, in turn, is connected via conductors 196-1 through 196-n to observing trunk circuits 195-. The distributor 197B is connected over a conductor path 194 to the system controller and by conductor paths 189- to the observing positions 199-. Each call that is service observed is connected by means of the link 104A to one of the observing trunk circuits 195-, which, in turn, extends the call via the distribution switch 197A to an idle service observing position. The call data required at the observing position selected to serve a call is transmitted from the system controller via conductor path 194, distributor 197B, and conductor path 189–, to the selected position.

In order to illustrate the operation of our invention with reference to FIG. 1, let it be assumed that a customer-dialed person-to-person type call originates at station 119 of local office 101 and that this call requires a routing to toll office 102 via the TSPS center; let it further be assumed, in serving this call, that local office 101 selects outging trunk circuit 120–1; finally, let it be assumed that the call is to be service observed.

Following the selection of outgoing trunk circuit 120–1, the local office transmits a seizure signal forward in the conventional manner. This signal is received by the TSPS trunk circuit 103–1 and transmitted by it over cable 113 to system control 105. System control responds to the signal and commands controller 104B to establish a network connection between the T and R conductors of trunk circuit 103–1 and digit receiver 107. When connected, the digit receiver receives the call information outpulsed from the local office and transmits its to system control over path 111. System control commands controller 104B to break down the connection to the receiver when the local office outpulsing has been completed.

System control at this time analyzes the information available to it concerning the call. This information includes the permanent and semipermanent information built into the controller, as well as information of a less permanent type, such as for example, that received from the digit receiver 107. Upon analyzing this information, the controller determines that the call is of the person-to-person type and that it therefore requires a connection to an assistance operator position. The controller also determines that the call is to be service observed and that a connection to an idle observing position is required.

System control now selects an idle observing trunk circuit, such as 195–1 over path 198. The observing trunk circuit, when seized, transmits a signal to the distribution circuit 197 requesting a connection with an idle observing position. The distribution circuit responds to this request and autonomously establishes a connection from observing trunk circuit 195–1 over path 196–1 to an idle observing position such as 199–1 over path 198–1.

The observing trunk circuit signals system control when its interconnection, via the distribution switch 197A, with the observing position has been established. System controller then commands the switching network 104 to establish a first path between the T and R conductors of calling trunk circuit 103–1 and the position side appearance of observing trunk circuit 195–1, and to establish a second path between the left side network appearance of observing trunk circuit 195–1 and the position side appearance of an idle assistance operator position, such as for example, 109–1. Upon the establishment of these connections, the incoming end of trunk circuit 103–1, service observing position 199–1, and assistance position 109–1, are all effectively interconnected by the switching network. Observing trunk circuit 195–1, which is now effectively in series between the TSPS trunk circuit 103–1 and the assistance position 109–1, provides a low impedance connection so that the calling party and assistance operator may converse in the same manner as for a call that is not being observed. The assistance operator now converses with the calling party to determine the nature of the assistance he requires. The observing position is connected to the call by means of a high impedance path within the observing trunk circuit so as to provide no distinction in the speech level between calls that are observed and those that are not observed.

Concurrently with the attachment of the assistance and observing positions to the call, system control commands the network to establish a path between outpulser 106 and the T1 and R1 conductors of trunk circuit 103–1. When this connection is established, the outpulser forwards to the toll office the call information it requires to serve the call. The outpulser is disconnected by the link from the call connection on the termination of outpulsing. The relative time at which an outpulser and an assistance position are attached on a call depends upon the type of call being served, as well as the degree and type of operator assistance required. It is generally desirable that an operator have sufficient time to converse briefly with the calling party to determine the assistance he requires before the called station answers.

System control transmits to the assistance position 109–1 via path 112, position buffer 108–1, and path 117–1, the information required by the operator to serve the call. This information is displayed on lamps at the position. The position is also equipped with keys which permit the operator to request additional call information to be displayed. Included among such items of additional information that may be requested are the calling and called numbers, et cetera.

Each service observing position is equipped with lamps which display much of the same call information that is displayed at the assistance operator position. The lamp display at the observing position is controlled by signals transmitted from the system control over path 194, distributor 197B, distribution switch 197A, path 189–1, to observing position 199–1. Each observing position is also equipped with lamps corresponding to many of the keys at the assistance position. These lamps, in response to signals from the system controller, permit the observing operator to monitor the release and operation of the keys at the assistance position to which the call is connected. Each position 199– also includes a printer (not shown on FIG. 1) which is operated by system control to provide the observing operator with call data that is not displayed on her position lamps.

The observing operator uses the lamp information displayed at her position, the information produced by the printer, together with her ability to monitor the conversation between the calling party and the assistance operator, to prepare records indicating the quality and efficiency of the service provided to the customer on the call.

After the assistance operator furnishes the service required by the calling party, she depresses keys to request the release of her position from the call and to transmit to system control the information it requires for a subsequent charge data recording operation by recorder 114. The observing operator may also depress her release key at this time. System control responds to the position release requests and commands the network to break down the threeway connection between trunk circuit 103–1, assistance operator position 109–1, and observing trunk circuit 195–1. The distribution switch 197A releases at this time and disconnects the observing trunk circuit and the service observing position 199–1 in order to make both circuits available for the serving of other calls.

The calling and called stations remain interconnected by the TSPS trunk circuit after the assistance operator position and the observing position have been released from the connection. System control monitors and times the call for its duration by means of its interconnection with the trunk circuit. When the termination of the call is detected, the signals are transmitted over cable 113 to restore the trunk circuit 103–1 to its idle state. At the same time, information is transmitted to recorder 114 so that it can record the required charge data for the call.

If the observing operator does not depress her release key, she remains connected to the call and system control sends call status information, via distributor 197B to her position. However, a circuit is automatically operated within her position to disconnect her headset from the speech conductors of the calling circuit.

DETAILED DESCRIPTION

Apparatus designations

Each relay shown on the drawings is given a designation comprising one or more lessers, or one or more digits, or a combination of letters and digits. In some instances these designations are purely arbitrary, while in others they are related to the circuit function of the relay. Since the detailed circuit of the present invention is shown on many separate figures, each reference to a relay in the description is prefixed with the digits of the drawing figure on which the controlling winding of the relay appears. Thus, for example, relay PA on FIG. 8 is referred to as relay 8–PA in any circuit discussion involving the relay, and similarly, relay CRL on FIG. 9 is referred to as relay 9–CRL. However, in order to avoid undue repetition, this identification scheme is used selectively; and if repeated reference is made to a particular relay or a particular group of relays, the figure identifying prefix is utilized only once or twice at the beginning of the discussion and is not repeated each and every time a relay is mentioned.

Relay contacts are shown separated from their controlling windings on the drawing. Contacts which are closed when a relay is operated (make contacts) are represented by an "X" superimposed on the interconnecting conductors. The two portions of a conductor on opposite sides of the superimposed "X" are not connected with each other until such time as the contacts represented by the "X" are closed by the controlling relay winding. Contacts which are opened upon the operation of a relay (break contacts) are represented by a short line perpendicular to and intersecting the connecting conductors. The two portions of a conductor on opposite sides of the superimposed break contact symbol are normally connected to each other via the break contacts. The same two conductor portions are disconnected from each other as the break contacts are opened upon the energization of the controlling relay winding.

Each relay contact bears the same designation as that of its controlling winding together with a numerical prefix indicating the drawing figure on which its winding is shown. Thus, all contacts of relay PA are designated 8–PA since the controlling winding is on FIG. 8. Each contact also bears a separate and unique numerical designation to enable the plurality of contacts of a relay to be uniquely identified.

There are a number of instances on the present drawings where groups of relays are disclosed in which each relay in the group has a designation which differs from that of other relays in the group only by a final digit or combination of digits. For example, on FIG. 23 there is a group of relays designated A1, A2, A3 and A4. In the following description, groups of relays such as these are sometimes discussed by identifying the entire group as the 23-A- relays where the final dash may be understood to represent the numerical designation of each relay in the series. This abbreviated form of designation permits the circuit function of the entire relay group to be discussed conveniently without the necessity of enumerating each and every relay therein each time reference is made to the group.

System Operation—FIGS. 2A through 2D

FIGS. 2A through 2D, when arranged as shown in FIG. 3, disclose additional details of the embodiment of our invention shown on FIG. 1. Each element on FIGS. 2 corresponding to an element on FIG. 1 is designated in a manner to indicate the correspondence, i.e., local office 201 on FIGS. 2A corresponds to local office 101 on FIG. 1. However, a one-for-one correspondence between each element on FIGS. 2 and FIG. 1 is not always possible since FIGS. 2 are considerably more detailed and contain many elements which are not separately shown on FIG. 1.

The embodiment of FIGS. 2 is similar to that of FIG. 1 in that it discloses a local office 201 having an outgoing trunk circuit 220–1 extending via TSPS trunk circuit 203–1 to an incoming trunk circuit 221–1 at toll office 202. Only one such interconnection between a local office outgoing trunk circuit and a toll office incoming trunk circuit is shown in order to minimize the complexity of the drawing and to facilitate an understanding of our invention.

Also shown on FIGS. 2 is a switching network 204 which comprises link 204A and network controller 204B, and which functions as described in connection with FIG. 1 to interconnect the TSPS trunk circuits 203– and other circuits having trunk side appearances on the network with the circuits having appearances on the position side of the network. The position side circuits are shown in greater detail than on FIG. 1 and include outpulsers 206, digit receivers 207, operator cut-through circuits 224–1 through 224–n, and the observing trunk circuits 295–1 through 295–n. The digit receivers, the outpulsers, and the observing trunk circuits perform the same functions already described in connection with FIG. 1. The operator cut-through circuits are rudimentary trunk circuits whose function is to interconnect the talking circuit of each assistance operator position with a position side appearance on the network. The assistance operator positions are shown on the right side of FIG. 2C and are designated 209–1 through 209–n. Each such position is individually associated with one of the position buffer circuits 208–1 through 208–n. Each position is also individually connected via one of the operator cut-through circuits 224–1 through 224–n to a position side appearance on the network. The details of the equipment provided in each operator position, together with the manner in which each position functions during the serving of the various types of calls that may be extended thereto comprises no part of our invention and is not disclosed in further detail herein. Reference is made to the aforementioned Jaeger-Joel specification which discloses this equipment in detail.

System control 105 on FIG. 1 is not shown as such on the embodiment of FIGS. 2 since it represents many circuits which are separately shown on FIGS. 2 and which together cooperate to control the operation of the system. These circuits on FIGS. 2 include the stored program control (SPC) 230, communications bus translator (CBT) 231, central pulse distributor (CPD) 232, signal distributor 233, trunk scanner 234, master scanner 236, group gate 235, and position signal distributor 237.

The embodiment of our invention shown on FIGS. 2 and in further detail on the other drawing figures, comprises an electronic stored program system which embodies many circuits of the type shown in the Bell System Technical Journal of September 1964, which issue is devoted in its entirety to a stored program controlled electronic switching system. The SPC may be considered to be the "brain" or basic controlling mechanism for the entire TSPS center. It comprises a stored program real time machine having a processor 230A and a memory 230B. The processor performs arithmetical and logical operations on the data it receives from the memory, as well as on the data it receives from circuits external to the SPC, such as for example, from the scanners. The memory comprises bulk memory, which is supplied in sufficient quantity to store all the temporary and semipermanent information and data required for the operation of the TSPS center. As described in Jaeger-Joel, the SPC, in performing its functions, receives signals from memory and from the scanners, performs the necessary arithmetical and logical operations in response to the received signals, and generates output commands which are transmitted to other circuits to control them in the performance of their required call functions. The circuits which respond to the SPC output commands are referred to as "peripheral circuits" since they are peripheral, or external, to the SPC.

The SPC communicates with the peripheral circuits by means of communication paths referred to in this specification as "buses." On FIGS. 2, the buses which transmit the SPC commands to the various peripheral circuits art the 1-out-of-N address bus 239 and the binary address bus 238. The SPC transmits its output commands in binary form directly to the CBT over paths 247 and 248. The CBT applies the SPC binary information it receives to the binary address bus 238. The CBT also translates the SPC binary output into a plurality of 1-out-of-N information bits and applies these to the 1-out-of-N address bus 239. Thus, for each binary command received, the CBT applies a corresponding binary command to the binary address bus and, in turn, to the peripheral circuits served by this bus. Simultaneously, a 1-out-of-N type command is applied to the 1-out-of-N address bus and to the peripheral circuits it serves.

Each command transmitted from the SPC via the CBT to the address bus system functionally represents or indicates a task that is to be performed by a peripheral circuit. Each address bus system comprises a plurality of wires, most of which are connected to a plurality of peripheral circuits in common. Thus, a command applied by the CBT to a combination of address bus conductors is transmitted to all peripheral circuits to which this combination of conductors is connected. In the normal course of events, only one peripheral circuit responds to a command, even though many peripheral circuits receive it.

The input portion of each peripheral circuit is arranged so that it does not respond to an address bus command unless it has first been primed or unlocked by the reception of a special signal hereinafter termed an "enable pulse." The central pulse distributor operating under control of the SPC is the circuit which transmits enable pulses to the peripheral circuits. These pulses are transmitted over dedicated conductor pairs unique to each peripheral circuit. The SPC effects the operation of a selected peripheral circuit by causing the CBT to apply to the address bus system the command specifying the desired operation of the selected peripheral circuit and by concurrently causing the CPD to transmit an enable pulse over a dedicated conductor pair to the selected peripheral circuit. The peripheral circuits that operate in this manner include the switching network 204, signal distributors 233, trunk scanner 234, master scanner 236, group gate 235, the AMA recorder 214, and the signal transmitter 296. The CPD and the CBT also operate in this manner. However, both their input commands and enable pulses are transmitted to them directly from the SPC.

The function of the trunk scanner is to monitor the current state of each trunk circuit and, upon command, report its findings to the SPC. The trunk scanner is connected to a plurality of circuit points within each trunk circuit, and each such circuit point is, in turn, individually connected to a different sensing device, termed a "ferrod" in the scanner. Each ferrod has a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing state of the circuits it monitors. The master scanners are similar to the trunk circuit scanners except that they monitor the operational states of circuits other than trunk circuits. These include the digit receivers, the group gate, the position scanner 242, the observing trunk circuits, and the signal transmitter 296.

Ferrods are further described, inter alia, in Baldwin-May Pat. 3,175,042 of Mar. 23, 1965 and in an article entitled "No. 1 ESS Scanner, Signal Distributor, and Central Pulse Distributor," by Freimanis, Guercio, and May in the aforementioned issue of the Bell System Technical Journal, p. 2255. Ferrods are further described in the Jaeger-Joel specification.

The scanner ferrods are arranged into rows of 16 ferrods each. Each command received by a scanner specifies a ferrod row that is to be interrogated. The information resulting from the interrogation is transmitted to the SPC over bus system 240, designated "scanner answer bus." With this arrangement, the transmission of a command to a scanner instructing it to interrogate a particular row of ferrods causes information to be transmitted back to the SPC signifying the current state of all circuit points within the system to which the plurality of ferrods in the interrogated row are connected.

The signal distributor 233 basically comprises a matrix or relay tree type translator, whose function is to receive the microsecond type signals from the CPD and the 1/N address bus and, in turn, transform them into signals having the persistence required to operate and release magnetic latching relays in the circuits of our system which utilize relays. Signal distributors are further described in the aforementioned issue of the Bell System Technical Journal, as well as in the Jaeger-Joel specification.

The switching network 204 operates in response to the reception of the coincidently received signals from the CPD and the 1/N address bus system. These commands cause it to establish connections between its left side and right side appearances. The paths by which these connections are to be established are not determined by the network but, instead, by the SPC in response to the information it receives from its memory. Switching networks of the type suitable for use with the present invention are disclosed in detail in the aforementioned issue of the Bell System Technical Journal as well as in the patents and applications enumerated in the Jaeger-Joel specification.

The AMA recorder 214 is connected to the binary address bus and it includes tape recorders together with buffer registers and recorder control circuits. Its function is to record call charge data in response to SPC binary address bus commands.

The function of group gate 235 is to control the operation of the position signal distributor 237, in response to the commands it receives from the binary address bus. These commands represent lamp information that is to be transmitted to a particular assistance operator position to aid the operator thereat in serving of calls extended to her position. The position signal distributor is similar to the signal distributor 233 in that it comprises a relay tree translator which receives the group gate output signals and translates them into signals having the persistence required to operate or release magnetic latching relays in the position buffer circuits 208–. Each position buffer circuit contains the relays required to control the lamp displays at its associated operator position.

Position scanner 242 transmits key information from the positions via the master scanner to the SPC regarding the state of each call currently connected to an operator position. Each position circuit contains a plurality of keys which may be depressed by an operator to generate call information. This information may comprise numerical data, such as calling and called numbers; it may comprise call charge data signifying the type of service requested by the calling party; and it may also comprise call status information, such as for example, signals requesting the disconnection of the operator position from the call. Position scanner 242 is connected to each key in each position and, by virtue of these interconnections, it continually monitors the state of each key; in response to the depression of any key at any position, it transmits signals back to the SPC, via the master scanner, signifying the key that is depressed as well as the position in which the key is located. The position scanner is shown in detail in the Jaeger-Joel specification, as well as in the G. Riddell application, Ser. No. 537,224, filed Mar. 24, 1966.

The service observing equipment provided at the TSPS center in accordance with our invention as shown on FIGS. 2 includes a plurality of observing the trunk circuits 295–1 through 295–n, exclusive circuit 295A, and an observing trunk control circuit 295B. The equipment provided at the remote service observing center 280 includes a distribution circuit 297, and a plurality of service observing positions 229–1 through 299–n. The embodiment of FIGS. 2 also includes signal transmitter 280 which is positioned in the TSPS center intermediate the binary address bus 238 and the distribution circuit 297. The function of the signal transmitter is to receive the SPC commands appearing on the binary address bus and to convert them into signals of the persistence required for operating relays in the distributor portion 297B of the distribution circuit 297. The signals applied by the signal transmitter to the distributor are used to control the lamp displays at the observing positions. In performing its functions, the signal transmitter operates in the same manner already described for the other peripheral circuits, namely, it responds to a command on the binary address bus only when its input circuit receives an enable pulse from the CPD concurrently with the appearance of the command to be registered on the address bus. The received commands are translated from binary to a plurality of 1-out-of-N type information bits, and are then transmitted over conductor path 294 to the distributor 397B. The signal transmitter is connected over path 286 to the master scanner so that its operational state may be monitored by the SPC.

The observing trunk control circuit 295B is common to all observing trunk circuits 295– and contains the circuitry and apparatus required to assist the SPC in coordinating the operation of all observing trunk circuits. The exclusive circuit 295A is shown associated with only observing trunk circuit 295–1. The function of the exclusion circuit is to facilitate a selection and control of the types of calls that are to be service observed. Although the exclusion circuit is shown associated only with the first observing trunk circuit, the SPC operates in such a manner that the exclusion circuit governs the types of calls that may be connected to any of the observing trunk circuits. In other words, the exclusion circuit may be functionally considered to be common to all observing trunk circuits since it specifies the types of calls that may be extended to all observing trunk circuits.

The service observing center 280 on FIG. 2 is shown connected to a plurality of TSPS centers in order to illustrate how calls from more than one TSPS center may be observed by operators at positions 299–1 through 299–X. Accordingly, distribution circuit 297 is functionally divided into a distribution switch 297A having verticals individual to each TSPS center, and distributors 297B through 297BL. Distributor 297B is individual to the first TSPS center while distributor 297BL is individual to the last (L) TSPS center. The distribution circuit further includes an exclusion control circuit 297C and an observing trunk and position preference circuit 297D. The connections from the distribution circuit 297 to the TSPS center of FIGS. 2A through 2C are shown in detail; the connections to the last (L) TSPS center are shown only diagrammatically. Each conductor extending to the last TSPS center and each circuit path and equipment individual to the last TSPS center is designated with the suffix L in order to distinguish from the circuits and equipments individual to the first TSPS center.

Each observing trunk circuit in the first TSPS center is connected over separate conductor paths, 296–1 through 296–n, to individual verticals on the left half of distribution switch 297A. The corresponding paths for the last TSPS center are designated 296–1L through 296–nL. Switch 297A is of the crossbar type and functions to connect the observing trunk circuits with the observing positions under control of preference circuit 297D. The preference circuit provides for orderly circuit operations in the event that two or more observing trunk circuits concurrently bid for a connection to an idle observing position. The preference circuit further functions to allocate calls on an equitable basic to the observing positions.

Each observing position 299– on FIG. 2D is individual to a signal translator 227– and a printer 243–. Each position is connected to an individual level of switch 297A. Each switch level has a set of a and a set of b conductors. For example, observing position 299–1 is individual to the upper level, H1, of the switch. The a conductors comprise the speech circuit which, for position 299–1, extends over path 290–1 to the observing position and the speech circuit therewithin. The b conductors for each level are also individual to a position, but are connected over paths 283– to the distributors 297B and 297BL to control their operations in transmitting call data to an observing position as subsequently described. Thus, the b conductors for position 299–1 are connected over path 283–1 to distributor 1 and over path 283–1L to distributor L.

The function of each signal translator is to receive and register via conductors 289–, 289–1 for translator 227–1, the output signals directed to it by the distributors. Each signal transmitted by a distributor to the signal translator specifies either a change in the lamp display or the operation of the printer at a position.

Each distribution switch vertical contains a set of a and a set of b conductors. The switch verticals are arranged into groups with each group being individual to a TSPS center and one of distributor 297B through 297BL. Thus, verticals V1 through Vn are individual to the first TSPS center and distributor 297B. Verticals V1L through VnL are individual to the last TSPS center and to distributor 297BL.

Each vertical of the distribution switch is individual to an observing trunk circuit. Thus, vertical V1 is individual to observing trunk circuit 295–1. The a conductors of this vertical are connected over conductors 296–1 to the trunk circuit. The b conductors of this vertical, although individual to the same trunk circuit, are connected over conductors 288–1 to distributor 297B.

The connection of an observing trunk circuit to an observing position necessitates the closure of the crosspoints defined by the vertical individual to the trunk circuit and the horizontal individual to the position. Two such crosspoints as shown on FIG. 2D are thus defined. The closure of the first crosspoint interconnects the trunk circuit, via conductors 296–, with the speech circuit of the position, via conductor 290–. The closure of the other crosspoint interconnects the control outputs of the distributor. This latter connection permits the lamp display and printer information received by the distributor from the signal transmitter to be directed to the signal translator 227– individual to the observing position currently connected to the observing trunk circuit.

The exclusion control circuit 297C is connected over conductors 287–1 through 287–L to a plurality of sets of exclusion keys 229–1 through 229–L. Each set of keys is individual to one of the TSPS center 1 through L. Each key of a set is individual to a different type of call which may be received by its associated TSPS center. The released condition of all keys of a set permits any type of call received by its TSPS center to be selected by the SPC for service observing. Contrariwise, the depression of any exclusion key precludes the type of call represented thereby from being service observed for the duration of time the key remains depressed. The depression of an exclusion key operates the exclusion control circuit 297C, which, in turn, enters information into exclusion circuit 295A of the appropriate TSPS center, specifying the types of calls that can and cannot currently be observed. The information registered in the exclusion circuit is presented to the SPC via the master scanner over conductors 293.

The following describes, with reference to FIGS. 2, the manner in which the system of our invention serves a typical customer-dialed call which requires operator assistance for its completion, such as for example, a call of the person-to-person type. Under present practices, a call of this type is initiated by the dialing of the prefix "O" to signify person-to-person type service, followed by the 3-digit area code, if any, followed by the directory number of the called station. Let it also be assumed that the call is to be service observed.

The originating office 201 responds to the subscriber's dialing and completes a path to one of its outgoing trunk circuits, such as for example, 220–1. Trunk circuit 220–1, in turn, transmits a seizure signal forward to TSPS trunk circuit 203–1. The receipt of this signal changes the state of the trunk scanner ferrod to which the incoming side of trunk circuit 203–1 is connected. The SPC is programmed so that both the trunk scanner and the master scanner scan all circuits to which they are connected at a sufficiently high rate so that no newly received information is lost in the interval between scans. Thus, a short time after the scanner ferrod for trunk 203–1 changes state, the ferrod row in which it is located is scanned and the resulting information transmitted back over the scanner answer bus 240 to the SPC. The SPC, by means of its memory, identifies the trunk circuit associated with the ferrod that has just changed state, analyzes the previous condition of this ferrod on the preceding scan to determine whether this is a new change of state, and determines whether the change of state signifies a newly arrived seizure signal or a momentary hit on the line.

Once the SPC determines that this is a new seizure signal, it utilizes its memory to derive certain call parameters, such as for example, the calling and toll offices to which trunk circuit 203–1 is connected, the nature of the outpulsing that may be received from the local office, the type of signaling that must be transmitted forward to the toll office, etc. Information of this type is commonly known as "trunk class information." It is stored on a semipermanent basis within the SPC memory for each trunk so that SPC may determine the connections within the TSPS center it must provide on each call.

Since the call currently being described is assumed to be of the person-to-person type, and thus requires operator assistance for its completion, this information must be made available to the SPC so that the services peculiar to person-to-person type calls may be provided at the TSPS center. Two methods are currently available for providing the SPC with this information. The method utilized depends primarily on the volume of traffic of each type originated at the local office. Dedicated trunks and trunk groups may be utilized for station-to-station and person-to-person type traffic if the volume of traffic warrants it. In this case, all person-to-person traffic originating at local office 201 and requiring a routing through toll office 221 would be served by TSPS trunk circuits reserved exclusively for this type of call. Separate equipment and trunks would similarly be provided for station-to-station traffic.

On the other hand, originating office 201 may not generate enough originating person-to-person type traffic to justify the use of separate trunk groups for this purpose. In this case, the person-to-person type traffic is served over the same trunks as is the station-to-station traffic. These trunks are called "combined trunks" and information indicating the type of call is transmitted to the TSPS center in connection with the MF outpulsing of the calling and called station information. Each MF outpulsing operation is initiated with the transmission of a KP pulse and is terminated with a START pulse. Either the KP or the START pulse may comprise different combinations of frequencies, with each combination representing the KP or the START pulse itself, together with a unique bit of class information. It is assumed in connection with the present call that the TSPS trunk circuit 203–1 is of the combined type and that information signifying the type of call, insofar as its person-to-person status is concerned, is supplied in connection with the MF outpulsing operation.

The SPC utilizes the class information stored within its memory to determine the type of service required on the call. It next transmits the necessary commands, via the CBT and the CPD, to the switching network, instructing it to interconnect the T and R conductor appearances of the calling trunk circuit on network 204 with those of a suitable digit receiver. Let it be assumed that the information from the local office is to be received in MF form. In this case, the SPC causes an MF digit receiver 207 to be connected by the network to the trunk circuit. When the receiver is attached, the SPC transmits coincident signals via the CBT and the CPD to the signal distributor, instructing it to operate relays within the trunk circuit 203 and digit receiver 207, so that an acknowledgment signal is sent back to the local office in the form of a polarity reversal on the T and R conductors. By means of subsequent polarity reversals, the SPC causes the MF receiver to transmit signals which cause the local office to outpulse the called and calling office information.

The call information outpulsed from the originating office is received by the TSPS trunk circuit 203 and extended over its T and R leads via the switching network to the MF receiver. This circuit receives the call information, one digit at a time, and in response thereto, changes the magnetic state of a unique combination of master scanner ferrods to identify each digit. The master scanner scans all of its ferrod rows, under SPC control, and in so doing transmits serially back to the SPC over the scanner answer bus information signifying each digit outpulsed from the local office. The SPC operates in response to the receipt of this information and, once outpulsing is terminated, transmits commands to the switching network, instructing it to disconnect the digit receiver.

The SPC next examines the call information available to it and determines what further connections are required within TSPS center for serving the call. It has been assumed that the currently described call is of the person-to-person type and that it is to be service observed. The SPC at this time thus determines whether at least one observing position is currently idle and available to receive a call. As subsequently described, this information is derived by the SPC from a master scanner ferrod associated with the observing trunk controller 295B. If it is determined that no observing position is available, the call will not be observed and will be served in the same manner as described in the Jaeger-Joel specification. On the other hand, if at least one observing position is idle, the SPC initiates the circuit actions required to connect the calling trunk circuit to an assistance operator position and to an observing trunk circuit. Let it be assumed that the SPC determines at this time that at least one observing position is currently idle.

Next, the SPC analyzes the information presented to it by the exclusion circuit 295A via the master scanner to determine the type of calls that are currently excluded from service observing. From the exclusion information, the SPC determines whether observing is permitted for the particular type of call now being served. If observing is not permitted, the call is served on an unobserved basis in the same manner as described in the Jaeger-Joel specification. In order to describe the operation of our invention, let it be assumed that the current call is of the type for which observing is permitted. Once the SPC makes this determination, it analyzes the status of the assistance operator positions 209– and selects an idle one such as, for example, position 209–1 to serve this call. The assistance position is merely reserved, but not connected at this time.

The SPC next interrogates the master scanner to ascertain the state of the observing trunk circuits. If one is found to be idle, the SPC selects it to serve the call. Let it be assumed that observing trunk circuit 295–1 is idle and is selected by the SPC. The SPC commands the center pulse distributor to send a seizure signal to observing trunk circuit 295–1 to select it for serving the call. The observing trunk circuit responds to the receipt of the seizure signal from the SPC and sends a signal over conductor path 296–1 to the observing trunk and position preference circuit 297D requesting an interconnection with an idle service observing position. The preference circuit 297D responds to this request, arranges all idle service observing positions in an ordered preference, and causes the distribution switch 297A to interconnect the most preferred idle observing position with conductor path 296-1 extending from observing trunk circuit 295-1. Let it be assumed at this time that observing position 299-1 is the most preferred of all idle positions. This being the case, the preference circuit controls the distribution switch so that it closes its crosspoints in the upper left-hand corner on FIG. 2D to interconnect trunk circuit 295-1 with observing position 299-1.

As already mentioned, each observing position is connected to an individual level of the switch, and each observing trunk circuit is associated with a switch vertical. Thus, on FIG. 2D, observing position 299-1 is associated with the top switch level, i.e., H1, while observing trunk circuit 295-1 is associated with the leftmost switch vertical, i.e., V1. The interconnection of an observing trunk circuit to an observing position requires the closure of the crosspoints defined by the verticals associated with the observing trunk and the horizontals associated with the observing position. Thus, at this time, conductor 296-1 extending from trunk circuit 295-1 is connected, via the switch, to conductor path 290-1 extending to the service observing position 299-1. Also, conductor path 288-1 extending from the signal distributor but associated with observing trunk circuit 295-1, is connected via the switch to conductor path 283-1 which is associated with the observing position 299-1.

The distribution circuit 297 signals the observing trunk circuit 295-1, via path 296-1, when its connection with an idle service observing position has been established. The trunk circuit, in turn, signals the SPC via the master scanner, advising it of the connection of the observing position. The information transmitted to the observing trunk circuit, and in turn to the SPC, merely indicates that the trunk circuit has been connected to an idle observing position. Neither the observing trunk circuit nor the SPC knows the identity of the observing position that has been connected to serve the call. This information is known only to the distribution circuit which obtains it by noting the identity of the crosspoints that were closed to establish the connection.

Immediately subsequent to the time it transmits the seizure signal to the selecting observing trunk circuit, the SPC reserves the network paths that will be required to interconnect the calling trunk circuit 203-1, the selected trunk circuit 295-1 and the selected assistance position 209-1. Subsequently, when the SPC is advised that the observing trunk circuit 295-1 has been connected to an observing position, it knows that the facilities required for observing the call are available. It then commands the switching network to interconnect the T and R conductors of trunk circuit 203-1 with the position side appearance of observing trunk circuit 295-1, i.e., conductors 292-1. It further commands the switching network to connect the trunk side appearance of this observing trunk circuit, i.e., conductor 291-1 with the operator cut-through circuit 224-1 which serves assistance position 209-1. With the completion of this connection, TSPS trunk circuit 203-1, the observing position 299-1, and the assistance position 209-1 are effectively interconnected. As is subsequently shown in the detailed drawing, the observing trunk circuit 295-1 provides a low impedance connection between trunk circuit 203-1 and the assistance position. This enables the calling party and the assistance operator to converse in the same manner as for a call that is not observed. The observing position is connected on a one way basis within the observing trunk circuit to the call by means of a high impedance bridge which does not alter the speech level between the calling party and the assistance operator.

Immediately prior to the extension of the connection to the assistance position 209-1, the SPC controls the operation of the central pulse distributor and the communications bus translator so that pertinent call information is displaced by lamps at the assistance position. This information is transmitted via the group gate 235, the position signal distributer 237, and position buffer 208-1 to the lamp circuits of position 209-1.

In accordance with our invention, immediately prior to the establishment of the network connections, call information is transmitted under SPC control to the observing position via the signal transmitter 280, path 294, distributor 297B, the closed crosspoints of distribution switch 297A, and path 289-1 to signal translator 227-1. The signal translator registers this information and uses it (1) to establish a required lamp display at the position and (2) to control the operation of printer 243-1, which prints data that is required by the observing operator.

The lamp information transmitted to the observing position first of all provides a lamp display corresponding to that provided at the assistance position. This information is necessary so that the observing operator may determine the type of call being served, etc. Secondly, the lamp information transmitted to the observing position also provides the observing operator with information regarding the keying action taken by the assistance operator while serving the call. All of this lamp information is needed by the observing operator in order that she may judge the quality and efficiency of the service provided at the assistance position.

The signals received by the distributor 279B from the SPC, via the signal transmitter 280, are effective to control the lamp displays and the printers at all service observing positions. Each signal received represents a lamp at a particular position that is to be illuminated or extinguished, or alternatively, represents information that is to be printed by the printer at the position. It is necessary, in connection with the receipt of each such signal, that the distributor receive sufficient information to identify the particular position to which the signal is to be directed. It has already been mentioned that the SPC knows the identity of the observing trunk circuit that is connected to a particular call being observed, but that it does not know the identity of the observing position to which the call is connected. Therefore, since the SPC does not know the identity of the observing position, it includes the identity of the observing trunk in each signal that is transmitted to the distributor. This disributor uses the observing trunk circuit identity to steer the remainder of the received signal to the output conductor 288- associated with the specified observing trunk circuit. Thus, for the call currently being described, the identity of observing trunk 295-1 is included in each signal received by distributor 297B-1. The distributor uses the identity information to apply the remainder of the received signal to the leftmost output conductor 288-1, which is functionally associated with observing trunk 295-1 and which at this time, by means of the upper leftmost crosspoints, is interconnected with the control conductor 283-1 for position 299-1. From conductor 283-1, the signal information is steered through the distributor to conductor path 289-1 and over it to the signal translator 227-1. Signal translator 227-1, upon receipt of the signal, controls the lamp display and the printer at position 299-1.

Finally, after the network connections to the assistance and observing position have been established and the required call set up information transmitted thereto, the SPC transmits commands to the switching network instructing it to establish a connection between an idle outpulser 206 and the T1 and R1 conductor appearance of the calling trunk circuit 203-1 on the left side of the network. These conductors are connected internally within the trunk circuit to its outgoing end extending via the OT and OR conductors to the toll office. The SPC determines from its memory the nature and quantity of the information that is to be outpulsed to the toll office, and it transmits commands, via the CPD and the signal distributor, to control the outpulser so that the data is transmitted forward, digit by digit, via the switching network, the T1 and R1 conductors of the trunk circuit, the outgoing end of the trunk circuit, and the OT and OR conductors, to the incoming trunk circuit 221-1 at the toll office. The toll office responds to the receipt of this information in the conventional manner and establishes the forward connection to the terminating office and the called station. The switching network 104 breaks down the connection between the outpulser and trunk circuit 203-1 following the termination of the outpulsing operation.

Since the present call is assumed to be of the person-to-person type, the operator at position 209-1 converses with the calling party, remains on the connection, and when the called station answers, determines whether the individual specified by the calling party is available. In the event that this individual is available, the assistance operator depresses keys at her position to indicate to the SPC: (1) the type of call service provided and (2) that her position should be disconnected from the call. The SPC responds to the receipt of this information and commands the switching network to break down the connection between the operator cut-through circuit 224-1 for position 209-1 and the left side network appearance of observing trunk circuit 295-1.

The observing operator normally depresses a key to effect the release of her position from most calls immediately after she observes the release of the assistance position. In this case, the SPC also commands the network to break down the connection between the right side appearance of observing trunk circuit 295-1 and the T and R conductors of trunk circuit 203-1. The SPC then releases the observing trunk circuit, and the distribution switch, in turn, disconnects the observing trunk circuit from the observing position. The SPC at this time also controls the operation of relays within trunk circuit 203-1 to interconnect its incoming and outcoming ends so that the calling and called parties may converse. The remainder of the call is monitored and timed by the SPC and, upon the call termination, the charge data therefor recorded by the AMA recorder 214.

It has already been mentioned that a small percentage of observed calls are observed either for their duration or for a period of time extending beyond the completion of the connection to the called station. This is done in order that the observing operator may perform various functions, including observing the quality of service that may be subsequently provided on the call. In this case, the network connection between the right side appearance of observing trunk 295-1 and the T and R conductors of TSPS trunk 203-1 are not released. However, the operation of the relays within observing position disables the observing operator's speech circuit so that the privacy of the customer's conversation is assured. The call is monitored and timed by the SPC and, in so doing, it transmits lamp signals to the observing operator advising her as to the status of the call and, in particular, the status of the calling and called stations. If the call subsequently requires a reconnection to an assistance operator position, this connection is eshtablished under SPC control by interconnecting the left side network appearance of the observing trunk 295-1 with the operator cut-through circuit individual to the assistance position that is subsequently selected by the SPC to provide this call service. The observing operator is kept advised as to the progress of the call, and upon its subsequent connection to an assistance operator position, the observing operator's speech circuit is enabled and lamp signals are transmitted to her position to enable her to determine the quality of the service provided by the assistance operator.

Signal Transmitter—FIGS. 23 and 24

The signal transmitter 280 on FIG. 2B is part of the path over which call data is transmitted from the SPC, via the binary address bus 238, to the observing positions. The signals received from the SPC by the signal transmitter are applied by it to the distributor 297B and the distribution switch 297A, in order to illuminate or extinguish lamps as well as to control the operation of the printer at the observing positions currently serving calls. The specific function of the signal transmitter is to receive and register the signals applied by the SPC to the binary address bus, translate these signals from a binary to a plurality of 1-out-of-$n$ type coded information bits, transform these microsecond type signals into signals having the persistence required to operate relays in the distributor 297B and, finally, apply these signals over conductor path 294 to the distributor 297B.

The basic elements of the signal transmitter are shown in detail on FIG. 23. The input of the signal transmitter may be said to comprise the 8-bit binary register 2302 which is connected over path 2301 to the binary address bus 2338. This bus is shown as element 238 on FIGS. 2A through 2D. The number 8 in parentheses adjacent coinductor path 2301 indicates that this path transmits 8 binary bits of information from the binary address bus to the register. The same convention is used with respect to other conductor paths on this drawing figure in each instance where the number of binary bits carried thereby is material to an understanding of the invention.

Register 2302 operates in the same manner as already described for the other peripheral circuits, namely, it receives and registers commands applied by the SPC to the binary address bus only whenever it has been priorly unlocked by an enable signal from the CPD. The steering circuit 2303 is connected by the dedicated conductor pair EN and EV to the CPD. When the SPC determines that the signal transmitter should be sent a command regarding the lamp display or printer at a particular observing position, it first transmits an unlocking enable pulse over conductors EN to the steering circuit 2303. The steering circuit, as subsequently described in detail, receives and registers the enable pulse, stretches it, and applies it over conductor EN1 to register 2302. Then, during the persistence of the stretched enable pulse on conductor EN1, the SPC applies a command to the binary address bus 2338. This command is received over conductor path 2301 and registered in the register. Subsequently, the enable pulse on conductor EN1 terminates to disable the input of the register and isolate it from the subsequent address bus commands intended for other peripheral circuits.

The 8 bits stored in register 2302 are applied over conductor path 2304 to the upper input of the eight AND gates 2305, which, on this drawing figure, are represented in the manner shown, with the darkened 8-bit conductor path 2304 extending into the upper input of the AND gate being used as an indication that the symbol 2305 represents eight, rather than a single AND gate. The lower input to each AND gate is enabled at this time from ground on terminal 2319 and through break contacts 1 of relay 23-LR. The ground on the lower input of each gate may be considered as unlocking signal, and therefore the 8 bits of binary information appearing on the upper input of the gates passes therethrough, with six of the bits being applied over conductor path 2306 to the input of the 6-bit AND gate 2307. The outputs of gate 2305 are also applied over the 8-bit conductor path 2308 to the parity check circuit 2309. This circuit performs the usual parity checking function; and, if the parity of the 8 bits checks good, a parity check signal is applied over conductor 2310 to the lower input of gate 2307 to unlock it and permit the 6 binary bits applied to its input to be transmitted therethrough and over path 2311 to the input of translator 2312. In the event the parity checks good, the parity check circuit also applies an output signal over conductor PAR1 to the steering circuit 2302. As subsequently described, this signal resets certain registers and gates in the steering circuit.

The translator 2312 functions to translate the 6 binary bits it receives into three 1-out-of-4 type coded information bits. The output of the first of these bits is applied over the upper one of conductor path 2313 to operate one of the four relays A1, A2, A3, or A4. Similarly, the remaining two 1-out-of-4 type information bits are applied by the translator over its other two output conductor paths 2313 to operate one of the four B– and one of the four C– relays. Each A–, B–, and C– relay that operates closes a holding path for itself over an obvious circuit, including its own make contacts and one of break contacts 1, 2, or 3 of the relay 23–TM.

Conductor path 2315 applies signals indicating the operated or unoperated status of each of the A–, B–, and C– relays to the upcheck circuit 2316. In the manner well known in the art, this circuit checks the status of each of these relays to determine whether one, and only one, relay in each group is operated. In the event that this condition is met, the upcheck circuit applies a ground potential to operate the relay CK within the timing circuit 2314.

Figure 20:
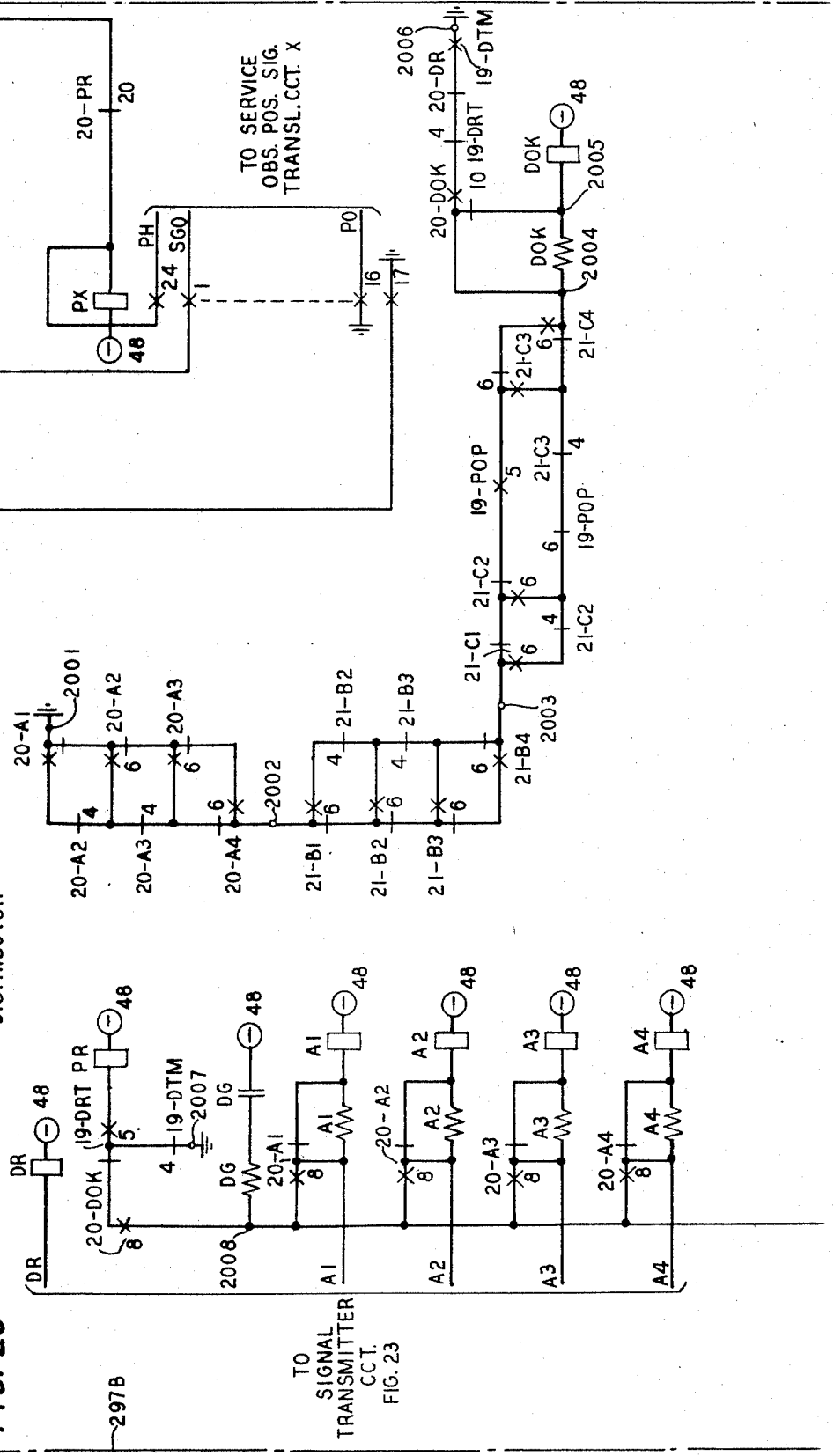

The output of the signal transmitter comprises the A–, B–, and C– conductors on the right side of FIG. 23, each of which is individual to one of the correspondingly designated relays on FIG. 23 and each of which extends to one of the correspondingly designated relays within the distribution circuit on FIGS. 20 and 21. The operation of relay CK closes its make contacts 1, 2, and 3 to extend ground to the make contacts of the A–, B–, and C– relays. These grounds are exended over the make contacts of the operated relay in each group and out over the correspondingly designated output conductor to operate one relay in each of the A–, B–, and C– groups on FIGS. 20 and 21 of the distribution circuit.

The operation of relay CK closes its make contacts 4 in the steering circuit 2303 to apply a signal over conductor RS1 to reset the 8-bit register 2302. The operation of relay CK also closes its contacts 5 to close the operate circuit for the slow-operate relay TM. This relay operates a predetermined time subsequent to the closure of the circuit of its winding and, when operated, opens its break contacts 1, 2, and 3 to open the holding circuit for the operated ones of relays A–, B–, and C– to effect their release.

Conductor 2317 extends to the downcheck circuit 2318, whose output is connected over conductor RS2 to relay DK. The downcheck circuit is energized upon the release of all the A–, B–, and C– relays and, at this time, it applies a signal over conductor RS2 to operate relay DK. Contacts of this relay (not shown) are used in the control circuitry to ensure that all of the A–, B–, and C– relays are normal prior to the time an attempt is made by the translator to operate them from the information stored in the register 2302 by subsequent commands.

The LR relay is connected over the T and R conductors to the correspondingly designated conductors on FIG. 21 of the distribution circuit. The potentials normally applied by that circuit to these conductors maintain the polarized relay in an unoperated state. However, as is subsequently described, when the A–, B–, and C– relays of that circuit are operated in response to the three coded information bits transmitted to it by this circuit, it reverses the polarity applied to the T and R conductors and causes relay LR to operate as an indication that the distribution circuit has successfully received and registered the information transmitted to it. The operation of this relay opens its break contacts 1 to disable the AND gates 2305 for the duration of time that the acknowledgment signal is sent by the distribution circuit. Subsequently, the polarities of the T and R conductors are reversed, relay LR releases, recloses its break contacts 1, and thereby enables the AND gates 2305 and prepares them and the rest of the circuit for the reception of subsequent commands from the SPC.

The steering circuit 2303 performs a plurality of functions. Its primary function is to receive a .5-microsecond enable pulse on lead EN, stretch the pulse into a 2.5-microsecond pulse, and apply the stretched pulse as an unlocking signal to register 2302 over conductor EN1. The steering circuit also receives a parity OK check signal over conductor PAR1 from the parity check circuit 2309. It uses this signal to generate an enable verify signal, which is sent over conductor EV on FIG. 23 back to the central pulse distributor as an indication that the data applied to the binary address bus has been registered with good parity. The steering circuit also utilizes the enable signal from the CPD to generate a make-busy signal, which is transmitted to the master scanner to inform the SPC that this circuit is now busy and should not be addressed for the reception of further commands, for the time being.

The normal operation of the signal transmitter is such that the registers 2302 are reset in response to a reset signal received from the upcheck circuit. However, in the event that the registered information in relay A–, B–, and C– does not check, the steering circuit and the registers can be reset under control of a reset signal on conductor RS from the SPC.

The details of the steering circuit 2303 are shown on FIG. 24. The .5-microsecond enable pulses are received on conductor EN on FIG. 24 and applied to the S lead of the flip-flop 2401. The waveforms adjacent to certain conductors on FIG. 24 diagrammatically illustrate the nature of the signals that are applied thereto during the operation of the circuit. The negative pulse applied to the S-lead sets flip-flop 2401 and drives its "1" output high in a positive direction and its "0" output low towards ground. The negative-going pulse on its "0" output is applied over conductor 2402 to the input of pulse stretcher 2810, which stretches it to a 2.5-microsecont type negative pulse ant applies it to its output terminal 2411. This negative 2.5-microsecond pulse is inverted by inverter 2413 and applied to the lower input of noninverting AND gate 2415.

As already mentioned, the "1" output of flip-flop 2401 is high at this time since it is assumed that the flip-flop has been placed in a set condition. This high potential is applied over conductor 2403 to the upper input of AND gate 2415. This high on the upper input of the AND gate permits it to turn on for the 2.5-microsecond period of time that the positive pulse from the output of inverter 2413 is applied to its lower input. The gate thus turns on for 2.5 microseconds and generates a 2.5-microsecond pulse that is applied to its output conductor EN1. As shown on FIG. 23, this pulse is utilized to unlock the registers 2302 so that they may respond to the command applied by the SPC at this time to the binary address bus.

The negative 2.5-microsecond pulse at the output of pulse stretcher 2410 is also applied through inverter 2412 as a positive 2.5-microsecond pulse to the input of differentiator 2404. This circuit differentiates the trailing edge of the pulse and produces a .5-microsecond pulse at its output, which is connected to the middle input of AND gate 2417. The upper input of the AND gate is high at this time since it is connected to the "1" output of flip-flop 2401. The lower input of the AND gate is connected to the PAR1 lead from the parity check circuit. The parity of the registered information that is stored in the register is checked and, provided it has good parity, a positive-going potential is supplied by the parity check circuit 2309 to conductor PAR1 extending to the lower input of AND gate 2417. The AND gate turns on for .5-microsecond since all of its inputs are held high only for the duration of time the .5-microsecond output pulse from the differentiator 2404 persists. The turn-on of this AND gate generates a negative-going output signal that is applied to the cable driver 2419. This circuit, in turn, generates signals which are applied to conductors EVP and EVN, by means of which they are transmitted back to the CPD as a verify pulse over the same circuit which transmitted the enable pulse to this steering circuit. The conductors EVP and EVN on this figure correspond to conductor path EV on FIG. 23. The details of the manner in which a verify pulse is transmitted back over the same path as the enable pulse is disclosed in detail in the aforementioned issue of the Bell System Technical Journal. The return of the verify pulse, as described therein, indicates to the CPD, and in turn to the SPC, that the enable pulse has been received, stretched, reshaped, and returned to the CPD. The return to the CPD and the SPC of the verify pulse additionally signifies that data having good parity has been successfully registered by this circuit.

The negative-going signal on the "0" output of flip-flop 2401 when it was set by the enable pulse is applied by conductor 2402 and, in turn, by conductor 2405, to the input of the inverting OR gate 2421. This signal turns the gate off, drives its output high, and reduces the current through its associated master scanner ferrod 2422. This change in the magnetic state of the ferrod informs the master scanner and, in turn, the SPC that this circuit is currently busy and should not be addressed for the reception of further commands, for the time being.

The steering circuit of FIG. 24 is normally reset by a signal received from the upcheck circuit after it has been determined that the required number of A–, B–, and C– relays have been operated. This signal is received when relay CK operates and closes its make contacts 4 in the steering circuit. The closure of the contacts applies the positive potential 2409 to the input of OR gate 2424. This produces a negative pulse at the output of the gate, which is applied through inverting OR gate 2425 and then through OR gate 2426, as a negative pulse to the R (reset) terminal of flip-flop 2401. The reception of this pulse resets the flip-flop and restores the steering circuit and the signal transmitter to its normal condition. The positive pulse on the output of gate 2425 is also applied through noninverting OR gate 2427 as a positive pulse on conductor RS1 extending to the registers 2302. This resets all registers to their normal condition, as already described.

In the event of trouble conditions, or for maintenance purposes, the signal transmitter and the steering circuit may be reset by a signal from the SPC. This signal is received on conductor RS as a negative pulse; it is applied to the input of OR gate 2407, inverted by it, and applied as a positive pulse to the lower input of AND gate 2408. The low on the "0" output of flip-flop 2401 is inverted by OR gate 2406 and applied as a high to the upper input of AND gate 2408. Both inputs of this gate are now high and it therefore turns on at this time and drives its output low, extending to the upper input of OR gate 2425. This low is propagated through gates 2425 and 2426, and applied back to the reset lead of flip-flop 2401 to reset it in the manner already described. The low on the input of gate 2425 is also propagated therethrough and through gate 2427 to reset the registers via conductor RS1.

Observing Trunk Circuits—FIGS. 6 through 10

The observing trunk circuits 295–1 through 295–n, the observing trunk controller 295B, and the exclusion circuit 295A are shown on FIGS. 6 through 10. The first observing trunk circuit, 295–1, is shown on FIGS. 7, 8, 9, and on the upper half of FIG. 10. The remainder of the observing trunk circuits are shown diagrammatically on the lower half of FIG. 10. The exclusion circuit is shown, for the most part, on FIG. 6 and the upper portion of FIG. 7. Certain elements of the exclusion circuit and the entirety of the observing trunk control circuit are shown encased within double-lined rectangles on FIGS. 7 through 10 in connection with the first observing trunk circuit.

The conductors that connect the observing trunk 1 with its two appearances on the network are shown on the upper left-hand corner of FIG. 7 and are designated 792–1 and 791–1. The T and R conductor pair 792–1 extend to the position side of the link while the T and R conductor pair 791–1 extend to the trunk side. The conductor path interconnecting the observing trunk circuit with the distribution circuit is shown on the upper right-hand corner of FIG. 7 and is designated 796–1. The connections from the observing trunk circuit 0 to the master scanner, to the exclusion circuit, and to the observing trunk control circuit, are all shown on FIGS. 7 through 10, with the elements within each of these latter circuits to which the elements of observing trunk circuit 1 connects being represented or disclosed within the double-lined rectangles. The use of this expedient simplifies the complexity of the drawing compared to that which would be required if each of these circuits were shown separately on separate figures and then conductors were run between the various figures to interconnect the required elements of each circuit. For example, the observing trunk controller is shown as a separate rectangle on FIG. 2A. However, on FIGS. 7 through 10, this circuit, rather than being shown on a separate figure and as a single entity, is shown segmented on different ones of these figures, with each portion thereof being encased within a double-lined rectangle. This permits the various portions of the observing trunk controller to be connected to the circuit points of the observing trunk circuit in a far simpler manner than would be required if it were shown as a single entity on a separate sheet. This would have required a large number of interconnections running between sheets in order to connect the controller to the observing trunk circuits.

The distribution circuit, element 297 on FIG. 2D, is shown in detail on FIGS. 12 through 21 when arranged with respect to each other as shown on FIG. 22. On FIG. 2D, the distribution circuit is connected by separate conductor paths to the observing trunk circuits, to the signal transmitter 296, to the speech circuit of each service observing position, to the signal translator associated with each observing position, and to the exclusion keys. With reference to FIGS. 12 through 21, the connections from the distribution circuit to each observing trunk circuit are shown on FIG. 18, the connections to the signal transmitter are shown on FIGS. 20 and 21, the connections to the speech circuit of each observing position are shown on FIG. 17, the connections to the signal translator for each position are shown on FIGS. 19 and 20, while the connections to the exclusion keys are shown on FIG. 14. On this figure, the exclusion keys are shown in their entirety within a double-line rectangle, even though they are a separate circuit, in order to avoid the lengthy interconnections that would be required if they were shown separately on another drawing figure.

FIG. 2D shows the distribution circuit to be subdivided into an exclusion control circuit, an observing trunk and position preference circuit, a distribution switch, and a distributor. With reference to FIGS. 12 through 21, the exclusion control circuit is shown on FIGS. 12, 13, and 14, the observing trunk position and preference circuit is shown on FIGS. 15 and 16, the distribution switch is shown on FIGS. 17 and 18, and the distributor is shown on FIGS. 19, 20, and 21.

Selection by SPC of an idle observing trunk circuit

Let it be assumed that during the serving of a call that is to be observed and which requires operator assistance, the call has progressed within the TSPS center to the point where the SPC effects a three-way network connection between the calling incoming trunk circuit, the assistance position selected to serve the call, and an idle observing trunk circuit which, in turn, will extend the connection via the remainder of the service observing facilities to an idle observing position. Before the SPC can establish this three-way connection, it must first analyze the current state of all observing trunk circuits and pick an idle one for use on this call. With reference to the observing trunk circuit shown in detail on FIGS. 7 through 10, each such circuit is connected to ferrods in the master scanner to keep the SPC advised of the current state of all observing trunk circuits. On FIG. 10, the first observing trunk circuit is connected to master scanner ferrods SOA, AWT, and RLS. The circuitry on FIG. 10 to which these ferrods are connected operates in such a manner so as to keep the ferrod either in a saturated or unsaturated state. The saturated state is hereinafter referred to as a state "0," while the unsaturated state is referred to as a "1" state. The states of ferrods AWT and RLS indicate information unique to the first observing trunk circuit, while the state of ferrod SOA supplies the scanner and, in turn, the SPC, with information common to the current condition of all the observing trunk circuits. Specifically, ferrod SOA indicates whether all observing trunk circuits are currently busy or, alternatively, whether one or more is currently available for serving a call. The state of ferrods AWT and RLS for each individual observing trunk circuit indicates to the SPC the current busy or idle state of its associated observing trunk circuit, as well as the state of the trunk circuit during the serving of a call. Since ferrod SOA presents information common to all observing trunk circuits, there is only one such ferrod in the master scanner, and it is connected to all of the observing trunk circuits by means of the circuitry shown on FIG. 10.

Figure 18:
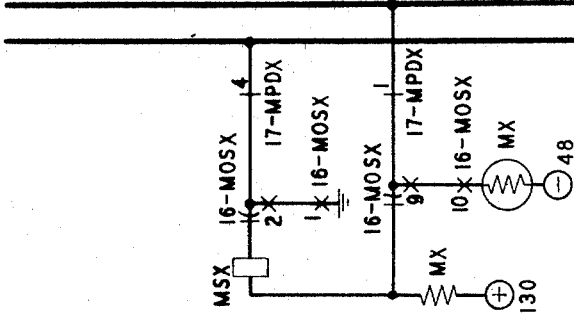

The circuitry on FIG. 7 connected to the T and R conductors 796–1 and extending to FIG. 18 of the distribution circuit controls the operation of the observing trunk circuit in response to signals received from the distribution circuit. These signals, among other things, control the state of the ferrods on FIG. 10 to supply the SPC with observing trunk circuit status information. These signals also, by operating the relays on FIG. 7 in various combinations, control the operation of the observing trunk circuit during the serving of each call extended to it.

No position available

When an observing trunk circuit is idle and no service observing position is idle and available, a negative 48-volt battery on the ring (R) lead and a ground on the tip (T) lead is transmitted from the distribution circuit and applied to the T and R conductors on FIG. 7. These potentials are transmitted via windings 705 and 706 of transformer 702, and via resistors 708 and 709 to terminals 710 and 711. The negative 48-volt battery appearing on terminal 710 at this time via conductor R is extended through break contacts 8–CA–3, and through the windings of relays R— and R+ in series to ground on terminal 714. Relays R— and R+ are polarized type, and thus only relay R— operates at this time. The ground on terminal 711 may be extended to the right through break contacts 8–CA–1 to the windings of polarized relays T— and T+ in series. However, this ground potential has no effect on these relays at this time.

With only relay R— on FIG. 7 operated, the state of the circuit is such that ferrods AWT and RLS will be saturated to prevent the seizure of this circuit by the SPC. The path over which ferrod AWT is saturated comprises the negative 48-volt battery, resistor 1001, ferrod AWT, break contacts 8–PA–6, 8–STBL–9 to ground on terminal 1005. The path over which ferrod RLS is saturated comprises negative battery, resistor 1003, the winding of the ferrod, break contacts 9–CRL–3, 8–STBL–10, 8–SD–1, 9–SOS–8, to ground on terminal 1006.

Figure 15:
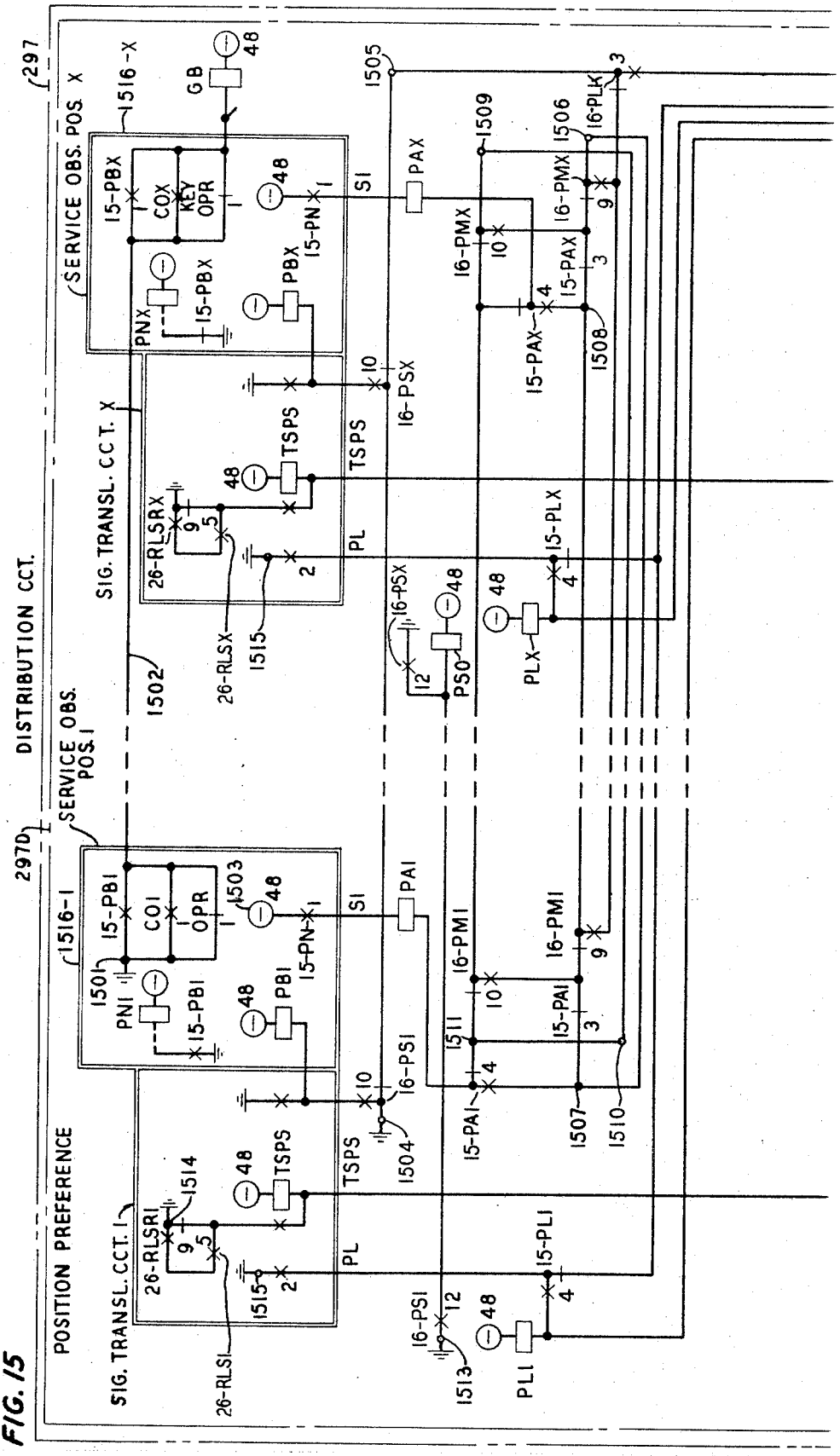
Figure 16:
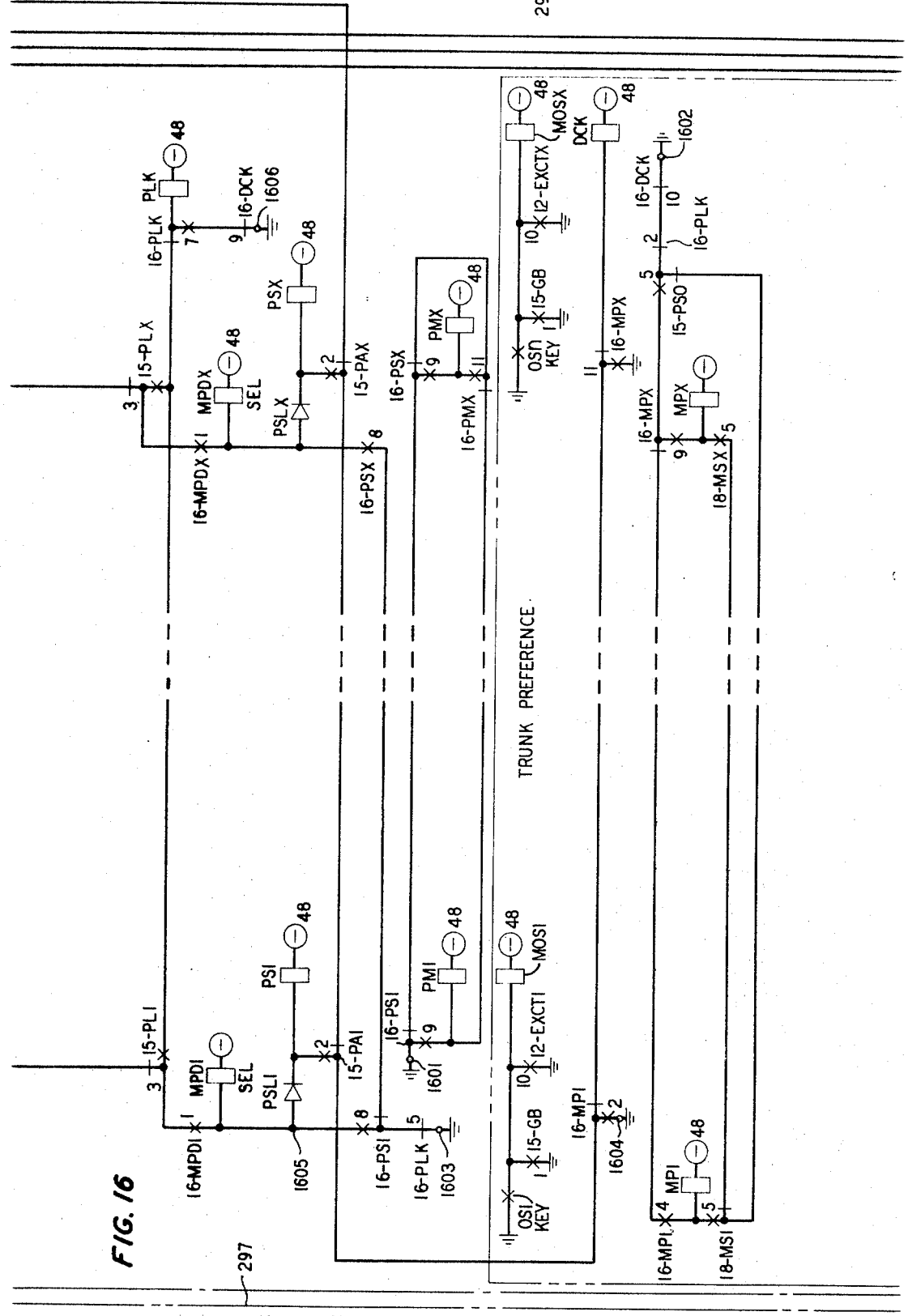

The following describes the manner in which the distribution circuit of FIGS. 12 through 21 applies the negative battery to the ring lead and ground to the tip lead when no observing positions are able to accept calls. This condition may occur when all positions are busy and/or unoccupied. FIGS. 15 and 16 disclose the observing trunk and position preference circuit, which comprises a part of the distribution circuit as shown on FIG. 2D. FIG. 15 additionally discloses within double-lined rectangles those portions of other circuits which intimately cooperate with the preference circuit. The circuits which are shown in part in this manner on FIG. 15 are the signal translator and the service observing positions.

Each service observing position, as subsequently described in detail, operates its PB– relay when it is busy on a call, leaves its OPR contacts in an unoperated state when the position is not occupied, and has its CO key closed when the operator desires not to accept calls from the TSPS equipment. When one or more of these conditions exists in all positions, a ground may be extended from terminal 1501 within the first service observing position, through its PB– or CO make contacts or through its OPR break contacts, to conductor 1502, through the intermediate service observing positions, through the nth position, to the winding of relay 15–GB to operate it. The operation of this relay closes obvious circuits on FIG. 16 to operate each of relays MOS1 through MOSn, each of which is individual to one of the observing positions.

Figure 17:
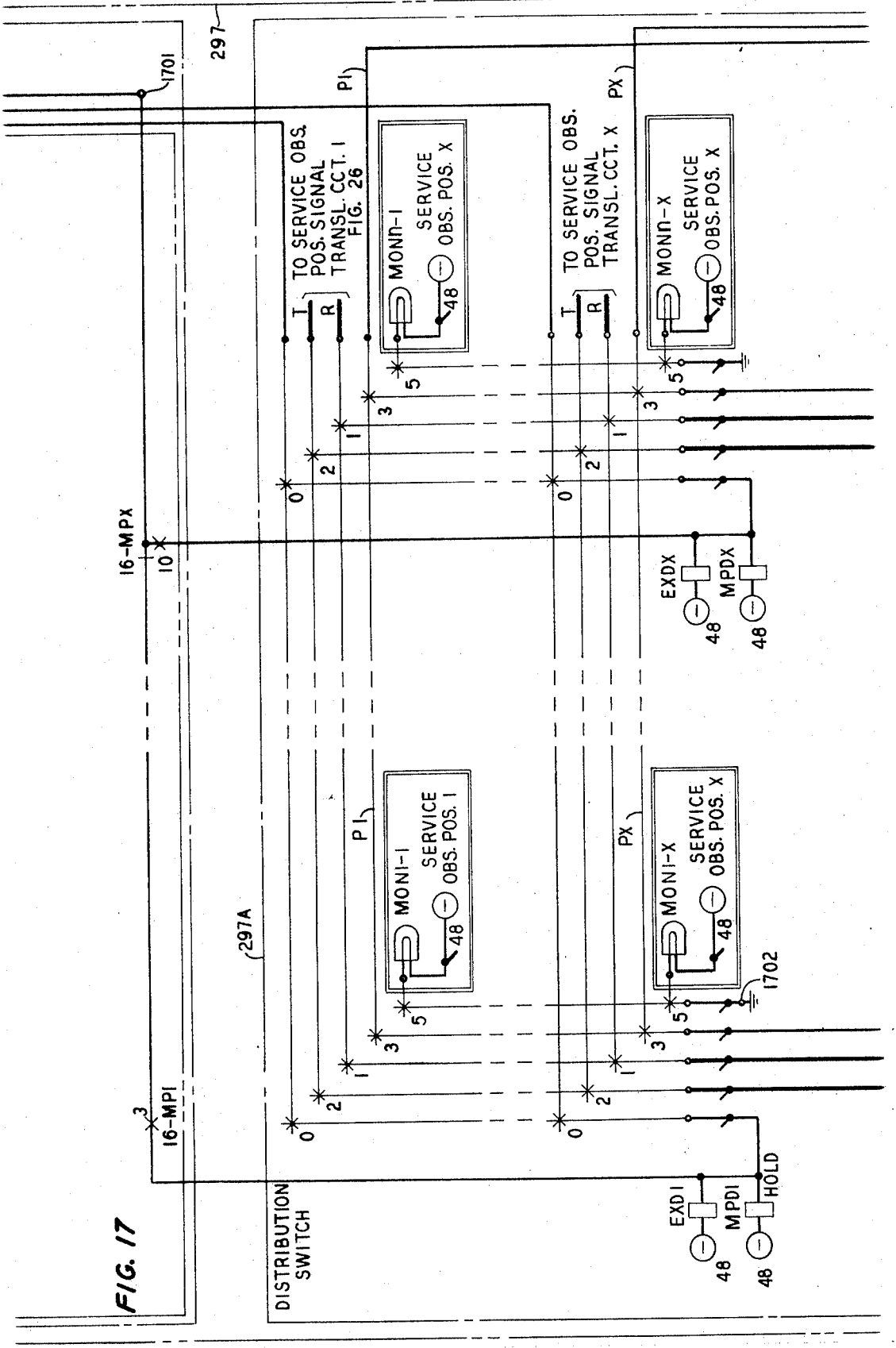

The distribution switch is shown on FIGS. 17 and 18. Each horizontal level and each vertical of the switch comprise five conductors, with the two darkened conductors of the five representing the T and R speech and control conductors and with the other three conductors representing other circuit paths which are closed when a selected observing trunk circuit with a selected observing position are interconnected. Accordingly, each crosspoint of the switch comprises five crosspoint make contacts which are arranged diagonally on FIG. 17 and which, when closed, interconnect the five horizontals and the five vertical conductors common to the crosspoint. On FIG. 17, two horizontal switch levels, two switch verticals, and the contacts for four sets of crosspoints are shown. The upper level is associated with the first observing position, the lower level is associated with the last position, the leftmost vertical is associated with the first observing trunk circuit, and the rightmost vertical is associated with the last observing trunk circuit. The darkened conductors of each vertical extend downward from FIG. 17 to FIG. 18, where they are connected to the circuitry within the distribution switch, which controls, among other things, the potentials that are applied to the tip-and-ring conductors extending to the observing trunk circuit with which the switch vertical is associated. Thus, the two darkened conductors for the leftmost vertical on FIG. 17 extend downward to FIG. 18 and are connected to the control circuitry which comprise the potentials in various combinations to the T and R conductors extending to observing trunk circuit 1 on FIG. 7.

The circuitry on FIG. 18 which controls the application of various potentials to the T and R conductors for each observing trunk circuit includes the contacts of relays 16–MOS1 through 16–MOSn. Specifically, at the time the MOS– relays on FIG. 16 are all operated by the operation of relay 15–GB, the following circuit paths are closed on the left side of FIG. 18 to apply a negative 48-volt battery to the R lead and a ground to the T lead for the first observing trunk circuit; ground on terminal 1801, through make contacts 16–MOS1–1, 16–MOS1–2, break contacts 17–MPD1–4, 12–EXCT–4, to the T conductor extending to observing trunk circuit 1 on FIG. 7. The negative 48-volt battery on terminal 1802 is extended through the M1 resistor, make contacts 16–MOS1–4, 16–MOS1–3, break contacts 17–MPD1–1, 12–EXCT1–8, to the R conductor extending from FIG. 18 to FIG. 7 for the first observing trunk circuit. From there, the negative potential may be extended over the priorly described path to operate relay 18–R—.

Figure 10:
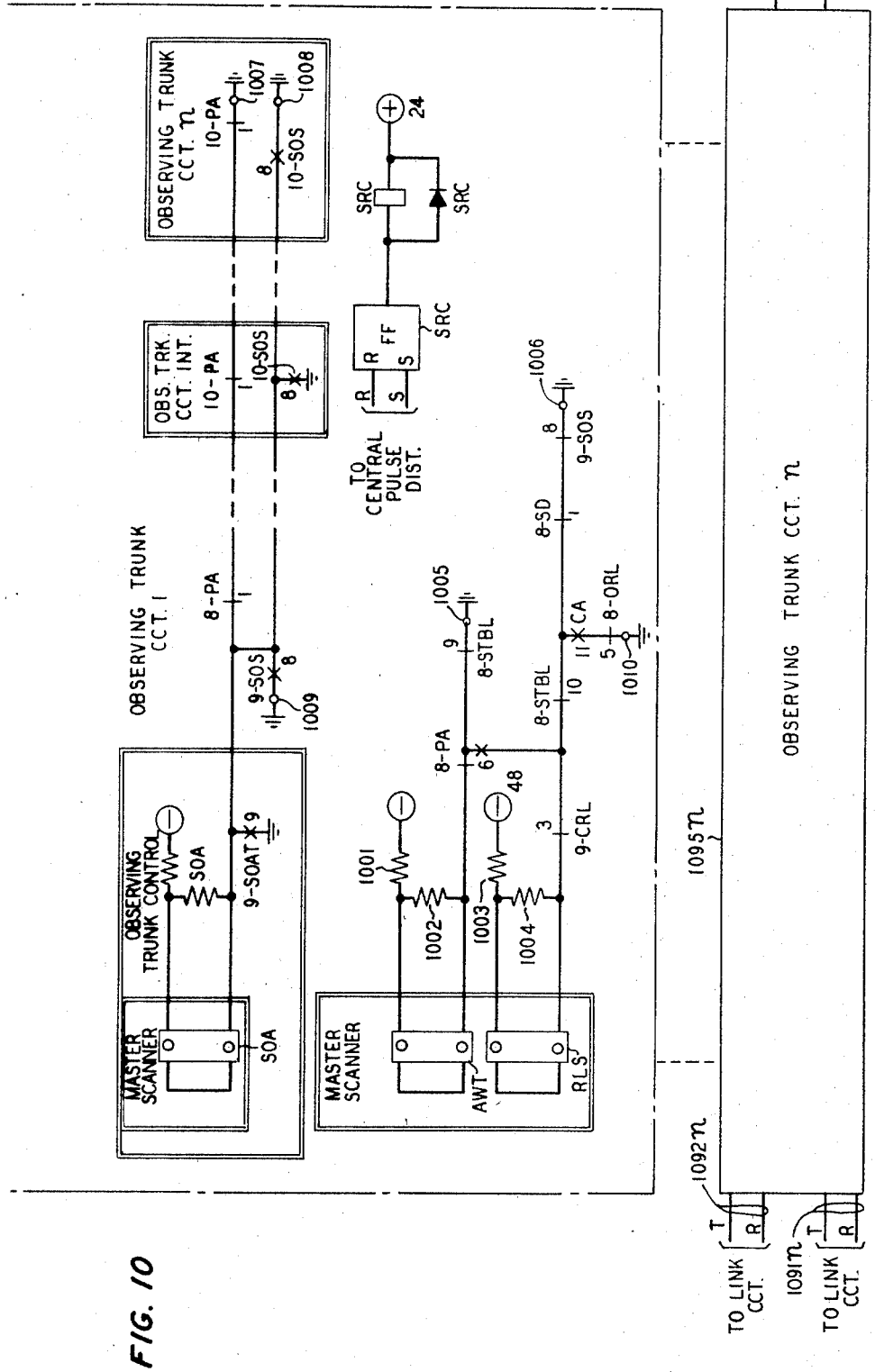

As already mentioned, the application of negative 48-volt battery to the ring conductor and a ground to the tip conductor at this time effects the operation of relay 7-R— and maintains the circuit on FIG. 10 in a condition so that both the AWT and the RLS ferrods are saturated. The saturated condition of both ferrods precludes the seizure of this observing trunk circuit by the SPC for use on a call.

Service observing allowed

In order to permit the SPC to look at only one scan point to determine whether or not service observing facilities are available for a call, one ferrod common to all observing trunk circuits is provided. This ferrod is designated SOA and is shown on FIG. 10. The unsaturated state of this ferrod indicates to the SPC that a call may be observed if the call class is not excluded by the exclusion circuit. Service observing is not allowed if any one of the following described conditions is present. First of all, service observing of a new call is not allowed if all observing positions are currently unavailable and/or unoccupied. This condition is signified by the unoperated state of the PA relay in each observing trunk circuit, such as for example, relay 8–PA for the first observing trunk circuit. As shown on FIG. 10, under this condition the lower winding terminal of ferrod SOA is extended to ground on terminal 1007 through the break contacts of the PA relay for each observing trunk circuit in series. It is subsequently described in detail how the distribution circuit transmits a signal to each idle observing trunk circuit whenever one or more observing positions are idle. Secondly, service observing is not allowed on a new call if a seizure of an observing trunk circuit for a prior call has occurred within the past four seconds. The reason for this feature is described subsequently in detail; however, all that need be said concerning it at this point is that, on FIG. 10, this condition is manifested by the operation of the SOS relay for any observing trunk circuit that has been seized within the past four seconds. In this case, the operation of its SOS relay, such as for example, 9–SOS for the first observing trunk circuit, extends a ground to the lower winding terminal of scanner ferrod SOA to saturate it. This signal operates the PA relay in the trunk circuit. The operation of the PA relay would open the path on FIG. 10 over which the SOA ferrod can be saturated from the ground on terminal 1007.

In its scanning operation, the SPC first scans the state of ferrod SOA, and if the ferrod is found to be saturated, the SPC knows that observing facilities are not currently available and therefore abandons any attempt to service observe calls incoming for the duration of time the SOA ferrod remains saturated. Subsequently, when the SOA ferrod becomes unsaturated, the SPC detects this condition, construes this as an indication that service observing facilities are available, and then scans the AWT and RLS ferrods of the various observing trunk circuits to determine which of these circuits are currently idle and available for use on a call.

Service observing facilities available

When one or more observing positions become available, the OPR– relay will operate and the CO– key and the PB– relay will release for each such position, as shown on FIG. 15. This opens the circuit for relay GB on the same figure to cause it to release. The release of relay GB in turn opens its make contacts on FIG. 16 to release each of relays MOS1 through MOSn. The release of these relays changes the configuration of the circuitry on FIG. 18 so that the combination of potentials that are applied to the T and R conductors of an idle observing trunk circuit are no longer ground on the tip and negative 48 volts on the ring. Instead, the release of the make contacts on FIG. 18 of relays 16–MOS1 through 16–MOSn causes a resistance +130-volt battery to be applied to both the T and R leads. The path for the T lead comprises +130 volts on terminal 1803, resistance M1, the winding of relay MS1, break connects 16–MOS1–2, 17–MPD1–4, 12–EXCT1–4 to the T lead. The path for the R lead comprises +130 volts on terminal 1803, resistance M1, break contacts 16–MOS1–3, 17–MPD1–1, 12–EXCT1–8, to the R lead. These potentials are extended to the T and R conductors of the first observing trunk circuit on FIG. 7, through the windings of transformer 702, to terminals 710 and 711. The +130-volt potential on terminal 711 effects no circuit actions at this time. However, the +130-volt potential on terminal 710 is extended through the windings of relays R— and R+ in series to ground on terminal 714. Since the polarity of the applied potential is positive, relay R+ operates and relay R— releases.

The operation of relay 7–R+ closes the following path on FIG. 8 to operate relay PA; ground on terminal 801, through break contacts 7–CAA–4, 7–RLS–4, 7–T+, break contacts 4 of relay 7–R—, make contacts 4 of relay 7–R+, terminal 803 break contacts 8–EXP–5, 6–EXPC–7, terminal 802, break contacts 9–CRL–5, 8–SD–11, to the winding of relay PA to operate it. The portion of the operate path for relay PA, which goes through the box entitled "Exclusion" on this figure is unique to the first observing trunk circuit, since as shown on FIG. 2A, the exclusion circuit is associated with only this observing trunk circuit. Although the remainder of the observing trunk circuits are governed by the setting of the exclusion circuit, they are nevertheless not physically connected to the exclusion circuit. Therefore, the detailed circuit drawings for these other trunk circuits would not contain the circuit elements shown for the exclusion circuit on FIGS. 7 through 10 in connection with the first observing trunk circuit. Thus, the path to operate the PA relay in the other observing trunk circuits would extend directly from terminal 803 on FIG. 8 to terminal 802 and would bypass the break contacts of the EXP and EXPC relays within the exclusion circuit.

Seizure of an idle observing trunk circuit

Upon the receipt of all the information for a call of the currently described type, the SPC determines that a connection is required from the calling trunk circuit to both an assistance position and an observing position. At this time, the SPC scans the SOA ferrod on FIG. 10 to determine that service observing facilities are available and, upon finding it unsaturated, checks the class of call and scans the ferrods for the exclusion circuit on FIG. 6 to determine that the class of call is not excluded. If the class of call is not excluded, the SPC scans the AWT and RLS ferrods individual to each observing trunk circuit, notes which trunk circuit has been idle for the longest time, and then selects this trunk circuit for use on the current call. Ferrod RLS remains saturated for an idle observing trunk circuit while its ferrod AWT becomes unsaturated as the break contacts 8–PA–6 open when relay 8–PA operates in response to the application of the positive 130-volt potential to the T and R conductors from the distribution circuit, as already described.

Let it be assumed that observing trunk circuit 1 shown on FIGS. 7 through 10 is idle and is selected by the SPC for serving the currently described call. This being the case, the SPC controls the operation of the central pulse distributor and causes it to apply a pulse to the S lead on FIG. 10 to set the SRC flip-flop. The setting of this flip-flop drives its output to a low or ground potential and operates the SRC relay, which remains held operated as long as the flip-flop remains in a set condition. The setting of this flip-flop and the operation of this relay comprises a seizure of this observing trunk circuit.

Relay 10–SRC in operating closes the following path on FIG. 9 to operate relay SOS: ground on terminal 901, make contacts 10–SRC–3, 8–PA–5. to the winding of relay SOS to operate it. Relay SOS in operating closes the following path on FIG. 10 to saturate the SOA ferrod: ground on terminal 1009, make contacts 9–SOS–8, to the lower winding terminal of the SOA ferrod. The saturation of this ferrod by the closure of the SOS contacts functionally indicates to the SPC that an observing trunk circuit has just been seized and that no other observing trunk circuit should be seized as long as the ferrod remains saturated. As already mentioned, this condition persists for approximately four seconds following the seizure of any observing trunk circuit. The operation of relay 9–SOS at this time also completes the following circuit on FIG. 7 to apply ground to the T conductor extending to the distribution circuit: ground on terminal 716 within the rectangle on FIG. 7 enclosing the circuit elements of the observing trunk control circuit, break contacts 9–SDT–2, make contacts 9–SOS–10, 8–PA–2, the windings of relay T+ and T— in series, break contacts 8–CA–1, resistor 709, winding 705, to the T conductor.

It has priorly been described how the distribution circuit at this time is applying a positive 130-volt potential from terminal 1803 to both the T and R conductors. The application of this potential operates polarized relay 7–T+ in observing tunk circuit 1 and relay 18–MS1 in the distribution circuit. The operation of relay 7–T+ opens its break contacts 4 on FIG. 8 to open the path by means of which relay 8–PA operated to cause the release of this relay. The operation of relay 7–T+ also closes the following path on FIG. 8 to operate relay 8–SD: ground on terminal 801, break contacts 7–CAA–4, 7–RLS–4, make contacts 4 of relay 7–T+, break contacts 2 of relay 7–R—, make contacts 3 of relay 7–R+, 9–SOS–3, to the winding of relay SD to operate it. The release of relay 8–PA closes the following circuit on FIG. 10 to saturate the AWT ferrod: ground on terminal 1005, break contacts 8–STBL–9, 8–PA–6, to the winding of the AWT ferrod. The release of make contacts 6 on FIG. 10 of relay 8–PA when the relay releases opens the path over which ferrod RLS was saturated. This returns the ferrod to a "1" or unsaturated state. The saturated condition of ferrod AWT and the unsaturated condition of ferrod RLS at this time indicates to the SPC that observing trunk circuit 1 has been seized, i.e., its relay 10–SRC has been operated. The operation of relay 18–MS1 comprises a signal to the distribution circuit that observing trunk circuit 1 is currently bidding for a connection to an idle service observing position.

Distribution Circuits—FIGS. 12 through 21
Position preference circuit operation

When an observing position becomes available, battery from the observing position circuitry is connected via its S1 lead to the winding of a PA– relay on FIG. 15 individual to the position. On FIG. 15, the relays PA1 through PAX are each individual to one of observing positions 1 through X. These relays and their contacts comprise the position preference circuit by means of which the incoming traffic is equitably distributed to idle observing positions. Each position, when idle and available for receiving calls, applies a negative 48-volt battery potential over its S1 lead to the upper winding terminal of its associated PA– relay. Let it be assumed, for example, that at this time position 1 is available. This being the case, the negative 48-volt battery on terminal 1503 within the observing position may be extended through make contacts 15–PN–1 to the winding of its relay PA1.

Since more than one observing position may be concurrently available, the ground for the operation of the PA– relays is supplied through a chain circuit which permits only the PA– relay for the preferred position to operate. The manner in which this occurs is described in the immediately following paragraphs.

The preference circuit also includes the position memory relays designated 16–PM1 through 16–PMX, each of which is individual to one of the observing positions, as well as to one of relays PA1 through PAX on FIG. 15. The position memory relay serves to remember which observing position last reecived a call for observation. Initially, relay PM1 is operated from ground on terminal 1601 and then through a series circuit comprising the break 9 of relays 16–PS1 through 16–PSX in series, as well as by the break contacts 11 of all of relays PM1 through PMX in series, to the winding of relay PM1. With relay PM1 operated, this constitutes an indication that position 1 served the last call, and in this case the next call would be offered to position 2, if idle. Let it be assumed, for the description of the present call, that position X served the last call and that relay 16–PMX is operated to provide this indication. The relay when operated completes a locking path for itself over its own make contacts 11, as well as by the break contacts of all of the PS– relays in series to ground on terminal 1601. The operation of this relay controls the preference circuit of FIG. 15 so that position 1 will be the most preferred for the serving of the next call. It has already been described how position 1 applies a negative battery potential to its conductor S1 in an attempt to operate relay 15–PA1 whenever it is available for serving a call. Every other position that is also available similarly applies a negative battery potential to its conductor S1. Under these conditions, and recalling that memory relay PMX on FIG. 16 is operated, the following circuit is now completed to operate relay 15–PA1: from ground on terminal 1504, break contacts 16–PS1–10, the break contacts 10 of all other PS– relays in series, terminal 1505, break contacts of relay 16–PLK–3, make contacts 16–PMX–9, terminal 1506, terminal 1507, break contacts 15–PA1–3, 16–PM1–9, through the corresponding break contacts of relays PA– and PM– for every position intermediate 1 and X, to terminal 1508, break contacts 15–PAX–3, make contacts 16–PMX–10, terminal 1509, terminal 1510, break contacts 15–PA1–4, to the winding of relay 15–PA1. This relay now operates since, as already described, position 1 is currently applying a negative 48-volt potential to its S1 conductor. Relay 15–PA1 in operating closes a holding circuit for itself over its own make contacts 15–PA1–4, terminal 1507, terminal 1506, make contacts 16–PMX–9, break contacts 16–PLK–3, to terminal 1505, which is grounded at this time, as already described. The ground on terminal 1511 may, prior to the operation of relay 15–PA1, to be extended rightwards through the break contacts of the PM– relays, in an attempt to operate the PA– relays for the nonpreferred positions, such as for example, relay PAX, for the last position. Even though this relay may initially attempt to operate in the event that its S1 conductor has a negative potential on it, the operation of relay 15–PA1 opens its break contacts 3, which would preclude any other PA– relay from completing a holding path for itself.

In summary of the circuit operations described in the preceding paragraphs, relay 16–PMX was assumed to be operated as an indication that the Xth position served the last call. This causes the preference circuit of FIG. 15 to arrange all positions so that position 1 is most preferred for serving the next offered call. This being the case, the extension of the battery from terminal 1503 to the winding of relay 15–PA1 causes the relay to operate by virtue of the ground supplied via the preference circuit and terminal 1504.

Observing trunk circuit preference

The series of relays MP1 through MPn on FIG. 16 comprise a preference circuit for the observing trunk circuits. This is provided in order to ensure an orderly sequence of operations in the event that two or more observing trunk circuits simultaneously attempt to obtain a connection through the distribution switch to an idle observing position. The preference circuit of FIG. 16 gives first preference to the first observing trunk circuit and last preference to the last observing trunk circuit. This being the case, the following circuit is now closed on FIG. 16 to operate relay 16–MP1: ground on terminal 1602, break contacts 16–DCK–10, 16–PLK–2, 15–PS0–5, make contacts 18–MS1–5, to the winding of relay MP1 to operate it. The operation of relay 16–MP1 functionally indicates that observing trunk circuit 1 is currently the most preferred and that it is currently bidding for a connection to an observing position. The operation of relay 16–MP1 completes the following path to operate relay 16–PS1: ground on terminal 1604, make contact 16–MP1–2, make contacts 15–PA1–2, through the winding of relay 16–PS1 to negative battery. The operation of relay 16–PS1 closes its make contacts 12 on FIG. 15 to extend the terminal 1513 ground to the winding of relay PS0 to operate it. Relay PS0 in operating completes a locking path for the priorly operated relay 16–MP1 as follows: the left-hand winding terminal of the relay, its own make contacts 16–MP1–4, the break contacts of all other MP– relays on FIG. 16, make contacts 15–PS0–5, break contacts 16–PLK–2, 16–DCK–10, to the 1602 terminal ground.

Relay 16–PS1 in operating completes the following locking path for itself: ground on terminal 1603, break contacts 16–PLK–5, make contacts 16–PS1–8, the PSL1 diode, to the left-hand winding terminal of relay PS1. This locking path maintains relay PS1 operated when relay 15–PA1 subsequently releases. Relay 16–PS1 in operating opens its break contacts 10 on FIG. 15 to isolate the terminal 1504 ground from terminal 1505, and thereby release relay 15–PA1. The operation of relay 16–PS1 also opens its break contacts 9 to release relay 16–PMX. The closure of make contacts 9 of relay PS1 operates relay 16–PM1 as an indication that the currently described call is served by the first position. The operation of relay 16–PS1 also closes its make contacts 10 on FIG. 15 to extend the terminal 1504 ground to the winding of relay PB1 in the first observing position to operate it. The operation of this relay makes the position busy to other calls.

Distribution switch crosspoint closures

It has already been described how relay 16–PS1 remains locked at this time through the PSL1 diode to ground on terminal 1603. The ground on this terminal is also extended to the left-hand winding terminal of the select magnet MPD1 on FIG. 16 to operate it at this time. The series of select magnets MPD1 through MPDX on FIG. 16 are each individual to one of the service observing positions 1 through X. Each select magnet, when operated, is effective to prepare the closure of the crosspoints on the level of the switch to which its associated observing position is connected. Thus, on FIG. 17, observing position 1 is connected to the top level of the switch. Therefore, the operation of select magnet 16–MPD1 prepares the switch so that a set of crosspoints on its upper level may be closed in extending an observed call to observing position 1.

The operation of the select magnet 16–MPD1 closes its make contacts 16–MPD1–1 on FIG. 16 to extend the opertating ground for the select magnet through break contacts 15–PL1–3 to the winding of the TSPS relay shown on FIG. 15 within the double-lined rectangle representing equipment within the signal translator for observing position No. 1. This relay in operating closes its make contacts to complete a locking path for itself to ground on terminal 1514. The operation of this TSPS relay also extends the terminal 1515 ground through its make contacts 2 over conductor PL through break contacts 15–PL1–4, to terminal 1701, through break contacts 16–MPn–10, through the corresponding break contacts of the MP– relays for the intermediate verticals of the switch, through make contacts 16–MP1–3, to the windings of relay 17–EXD1 and 17–MPD1 to operate them. Relay 17–MPD1 comprises the hold magnet for the leftmost vertical of the switch, and its operation at this time following the operation of select magnet 16–MPD1 for the upper level of the switch closes the crosspoints common to these two magnets, namely, the crosspoints on the upper left-hand corner of the switch shown on FIG. 17.

When the hold magnet 17–MPD1 operates, it opens its break contacts 1 and 4 on FIG. 18 to remove the resistance battery via the MS relay from the T lead and the resistance battery from the R lead extending to observing trunk circuit 1. The closure of the crosspoints upon the operation of this hold magnet extends the T and R conductors from observing trunk circuit 1 to the signal translation circuit associated with observing position 1.

It has already been mentioned that each level of the crossbar switch shown on FIG. 17 is individual to one of the service observing positions, with the top level being individual to position 1 and with the bottom level being individual to position X. Each observing position is equipped with a plurality of lamps, as shown within double-lined rectangles on FIG. 17. Thus, observing position 1 is equipped with lamps MON1–1 through MONn–1, each of which is individual to one of the switch verticals. These lamps are provided in order to indicate to the observing operator the identity of the observing trunk circuit that has been successful in extedning a call to her position. In accordance with the present call, the closure of the crosspoints in the upper left corner of the switch on FIG. 17 extends the terminal 1702 ground through contacts 5 of these crosspoints to energize lamp MON1–1 as an indication to the operator at observing position 1 that observing trunk circuit 1 has extended a call to her position.

The operation of these crosspoints also extends the operating ground for hold magnet 17–MPD1 through contacts 0 of the crosspoint to the winding of relay 15–PL1 to operate it. This relay in operating closes its make contacts 4 on FIG. 15 to lock to the PL conductor ground from the signal translator circuit for observing position 1. The opening of break contacts 4 on FIG. 15 of this relay opens the operating circuit for hold magnet 17–MPD1. However, the magnet remains locked operated via the crosspoint 0 contacts to the same ground currently holding relay 15–PL1 operated.

Release of preference circuits

When the 15–PL1 relay operates to lock the call to observing position 1, the ground from terminal 1603 is removed from the TSPS lead by break contacts 15–PL1–3 and is closed via these make contacts in series with break contacts 4 of relay 16–PLK to its winding to operate it. This relay in operating locks through its own make contacts 4 and break contacts 9 of relay 16–DCK to ground on terminal 1606. The PLK relay operates as a check of the operation of relay 15–PL1 and begins the release of the preference circuits to permit subsequent calls to be served. The relays 16–MP1, 16–PS1, and select magnet 16–MPD1, release at this time as relay 16–PLK opens its break contacts 2 and 5. Relay 16–PS1 in releasing opens its make contacts 12 on FIG. 15 to remove the terminal 1513 ground from the winding of relay 15–PS0 to release it. As a check that relays 16–MP1, 16–PS1, and 15–PA1 have released and that the 16–PLK is operated, the following path is now closed to operate relay 16–DCK: ground on terminal 1504, break contacts 16–PS1–10, through the corresponding break contacts of the other PS– relays on FIG. 16 to terminal 1505, make contacts 3 of relays 16–PLK, break contacts 2 of the PA– relays on FIG. 16 including break contacts 15–PA1–2, break contacts 2 of the MP– relays on FIG. 16 to the winding of relay aDCK to operate it. In this connection, it will be recalled that relay 15–PA1 released when relay 16–PS1 operated and opened its break contacts 10 on FIG. 15 to remove the terminal 1504 operating ground for relay PA1. Relay 16–PLK releases upon the operation of relay 16–DCK as break contacts 9 of this relay open and isolate relay PLK from the terminal 1606 ground. The release of relay PLK opens its make contacts 3 to release relay 16–DCK and closes its break contacts 3 to permit the operation of a PA– relay on FIG. 15, in the manner similar to that priorly described, to indicate the availability of another position to receive a subsequent TSPS call for observation.

Call Accepted—Signal Timing

The observing trunk circuits, particularly during periods of heavy traffic, compete with observing trunk circuits from other offices to gain access to idle service observing positions. Since the distribution circuit can handle only one call request at a time, an appreciable delay may occur between the time the observing trunk circuit applies a ground through the T+ and T− relays of FIG. 7 to the tip lead to signify a service-request signal and the receipt of a call-accepted signal from the distribution circuit when it removes the +130-volt resistance potential from the T and R leads back to the observing trunk circuit as break contact 17–MPD1 on FIG. 18 opens as hold magnet 17–MPD1 operates. Since a call selected for observation is also delayed in its connection to a TSPS assistance operator position until information concerning the call has been transmitted to the service observing position ultimately selected, it is undesirable to delay the call too long while waiting for the connection of the observing trunk circuit to an idle observing position. For this reason, two stages of timing are provided to time the interval between the application of a service-request signal and the receipt of a call-accepted signal back from the distribution circuit.

The operation of relay 8–SD, as priorly described, starts the SDT timer within the observing trunk control circuit shown on FIG. 9. This timer is started when the operation of relay 8–SD completes the following circuit: negative 48 volts on terminal 902, break contacts 8–CA–8, make contacts 8–SD–8, 9–SOS–5, to terminal 904, which is the start terminal for the SDT timer. This timer, when energized, times for 150 milliseconds from the application of the service request signal, i.e., operation of relay 8–SD. If the timer times out by operating relay 9–SDT, the service-request signal is removed, as subsequently described. However, since it is possible that the distribution circuit was, at the tmie, functioning to connect the observing trunk circuit to an observing position, a call-accepted signal may be received from the distribution circuit after timer SDT times out. Therefore, the SPC will delay 300 milliseconds after seizing the observing trunk circuit to return to see if the call has been accepted and connected to an observing position. This 300-millisecond time interval is sufficient to cover the maximum delay in having the call accepted. If the call has not been accepted within this interval, the SPC will release the observing trunk circuit and proceed to serve the call on an unobserved basis.

Call accepted in less than 150 milliseconds

When the service observing position is connected through the distribution circuit to the observing trunk circuit, the positive 130-volt resistance battery is removed from the T and R conductors by the operation of hold magnet 17–MPD1, as already described, and a negative 48-volt battery is applied to these conductors by the signal translation circuit for the observing position to which the call is connected. This causes the release of relays T+ and R+ on FIG. 7 and the operation of relays T− and R− on the same figure. With relay 8–SD operated, the operation of these relays causes the operation of relay 8–CA over the following path: ground on terminal 801, break contacts 7–CAA–4, 7–RLS–4, break contacts 4 of relay 7–T+, make contacts 4 of relay 7–R−, make contacts 2 of relay 7–T−, break contacts 8–CA–12, make contacts 8–SD–2 to the winding of relay CA to operate it. Relay CA in operating opens its break contacts 8 on FIG. 9 to stop the SDT timer. Relay CA operated also closes its make contacts 11 on FIG. 10 to saturate the RLS ferrod from ground on terminal 1010 as an indication to the SPC that the call has been successfully connected to an observing position. The operation of relay 8–CA also operates its transfer contacts 1 and 3 on FIG. 7 to transfer terminals 710 and 711 extending to the T and R conductors from the T+ and T− and R+ and R− relays, to the circuit comprising the windings of relays RLS and CAA. Relay CAA operates under this condition since its windings are connected in a parallel aiding arrangement. Relay RLS does not operate at this time since its windings are connected in a parallel opposing. Relays T− and R− release when they are disconnected from the T and R circuit by the operation of the transfer contacts 1 and 3 of relay 8–CA.

Call accepted in 150 to 300 milliseconds

In the event an observing position is not connected through the distribution circuit to an observing trunk circuit within 150 milliseconds, the SDT timer on FIG. 9 times out and operates its relay SDT. The operation of this relay opens its break contacts 2 within the rectangle representing the observing trunk control circuit on FIG. 7 and thereby removes the terminal 716 ground from the circuit extending to the T conductor. This constitutes a removal of the service-request signal to the distribution circuit. This causes the release of relay 7–T+ in the observing trunk circuit and relay 18–MS in the distribution circuit. Although the service-request signal has been removed by the operation of relay 9–SDT, the distribution circuit, which in the event it began to function before the removal of the service-request signal will continue its action and attach an observing position to the observing trunk circuit under certain conditions. This attachment causes the call-acceptance signal, i.e., −48 volts on both the T and R leads to be sent to the monitoring circuit, where it causes the operation of relays R− on FIG. 7. Relay T− does not operate at this time since its path to ground currently remains open at break contacts 2 of relay 9–SDT.

With relay 9–SDT operated, the operation of relay 7–R− causes the operation of relay 8–DCA over the following circuit: ground on terminal 801, break contact 7–CAA–4, 7–RLS–4, break contacts 4 of relay 7–T+, make contacts 4 of relay 7–R−, break contacts 2 of relay 7–T−, make contacts 9–SOS–9, make contacts 9–SDT–1, to the winding of relay DCA within the observing trunk control circuit to operate it. Since it is possible that the signal being received from the distribution circuit is a no-position-available signal, and not a call-acceptance signal, both of which use the −48 volt battery on the R lead but differ in the signal on the T lead, the ground through the T+ and T− relays to the T lead is closed through diode DCA on FIG. 7. This connects the terminal 713 ground to this circuit. Thus, only the −48 volt battery call-acceptance signal will cause a forward current flow through diode DCA and the operation of relay 7–T−. A no-position-available signal uses a positive 130 volts on the T lead. This potential would be in a reverse direction for current to flow through diode DCA and would prevent the operation of relay 18–MS1 which is in series with the source of the positive potential.

If the call-acceptance signal is received within 300 milliseconds, relay T− operates and relay CA also operates, as already described. With relay CA operated, the SDT timer on FIG. 9 and the SDT relay are released to reclose direct ground to relays T+ and T− and release relay 8–DCA, which opens the DCA diode ground from these relays. Relay CA also changes the RLS ferrod to a saturated condition and transfers the T and R leads from the T+ and T− and R+ and R− relays, respectively, to the RLS and CAA relays. Relay CAA operates, since windings are parallel aiding, while relay RLS does not operate since its windings are parallel opposing.

Call Connection Established to Observing Position

Three hundred milliseconds after sending the observing trunk circuit seizure signal via the central pulse distributor to operate relay 10–SRC, the SPC checks the AWT and RLS ferrods on FIG. 10 to determine whether the observing trunk circuit recognized the seizure signal and whether the call was accepted at an observing desk. Ferrod AWT changing to a "0," as already described, indicates that the monitoring circuit was seized, and ferrod RLS being a "0" indicates that the call was successfully connected to an observing position. With these two conditions met, the SPC then prepares to set up the linkage from the calling trunk circuit to the observing trunk circuit's position side network appearance and from the observing trunk circuit's trunk side network appearance to the TSPS assistance position. As subsequently described, the SPC, via the signal transmitter, transmits information regarding the call, such as the trunk number, call type, et cetera, to be sent to the attached observing position, where it is either displayed on lamps or printed. Upon completion of this information transmission, the TSPS position is then attached via the network. All signals subsequently required by the observing operator during the call are transmitted via the signal translator.

Call Not Accepted

If within the 300-milliseconds from the seizure of the observing trunk circuit to the SPC scan of the AWT and RLS ferrods, an observing position is not connected to the observing trunk circuit, the AWT ferrod will be a "0," indicating the observing trunk circuit seizure, and the RLS will be a "1," indicating that the call has not been connected to an observing desk by the time the scan is made. The SDT timer on FIG. 9 will have already timed out, removing the service-request signal from the T lead and, due to the unavailability of an observing position, a call-acceptance signal will not have been received. The SPC will then proceed with the call on an unobserved basis and will release the monitoring circuit by applying a pulse via the central pulse distributor to the R terminal of the SRC flip-flop on FIG. 10, thereby releasing the SRC relay.

SOAT Timer—FIG. 9

It has already been mentioned that circuitry is provided to ensure that a second observing trunk circuit will not be seized within a 4-second interval following the prior seizure of another observing trunk circuit. This is controlled by the SOAT timer on FIG. 9. As priorly described, relay 9–SOS operates shortly after the seizure of an observing trunk circuit and, in so doing, closes its make contacts 8 on FIG. 10 to saturate the SOA ferrod. This indicates to the SPC that another observing trunk circuit should not be seized, for the time being. The operation of relay 9–SOS also closes the following circuit to operate the SOAT timer: battery on terminal 906, make contacts 8–SD–9, 9–SOS–1, to terminal 907, which is the input of the SOAT timer, to cause it to commence its 4-second timing interval. This timer times out after four seconds and operates its relay 9–SOAT, which closes its make contacts 9 on FIG. 10 to provide another path for saturating SOA ferrod. The operation of relay SOAT also opens its break contacts 9 on FIG. 9 to isolate the terminal 908 ground and thereby release relay 9–SOS. This relay in releasing opens it make contacts 8 on FIG. 10. The release of relay 9–SOS also opens its make contacts 1 on FIG. 9 to initiate the release of the SOAT timer and the SOAT relay. However, the make contacts 9 of relay SOAT on FIG. 10 maintains the SOA ferrod saturated for the release time of the relay.

Data Transmission to Observing Position

It has been assumed in connection with the call currently being described that observing trunk circuit 1 has been seized by the SPC for use on this call and that, in response to the seizure signal, the distribution circuit has selected and connected observing position 1 to observing trunk circuit 1. This connection was made by closing the crosspoints on FIG. 17 defined by the conductors of the top level and leftmost vertical of the crossbar switch. It has also been described how the SPC has selected assistance operator position 209–1 for use on the call and has selected a network path to interconnect the calling TSPS trunk circuit with the position side appearance of observing trunk circuit 1 (path 292–1) and to connect the trunk side appearance of this observing trunk circuit (path 291–1) with the operator cut-through circuit 224–1 serving assistance position 209–1. This network path has only been preselected by the SPC and not established. This path is not established until the SPC has transmitted to observing position 1 the call data that is required by the operator printer thereat for serving the call. The network path interconnecting the TSPS trunk circuit, observing trunk circuit 1, and call assistance position 1, is completed immediately after the required call data has been transmitted to the observing position. The manner in which this call data is transmitted to observing position 1 is described in the subsequent paragraphs.

With reference to the circuit operations described so far, the observing trunk circuit 1 is shown on FIGS. 6 through 10, and its T and R conductors 796–1 in the upper righthand corner of FIG. 7 extend to FIG. 18 of the distribution switch; since the switch crosspoints common to the leftmost vertical and the upper level are now closed, conductors 796–1 are at this time extended via the switch to its T and R conductors shown in the upper right-hand corner of FIG. 17, and from there to the T and R conductors of signal translator 1 on FIG. 26. Signal translator 1 is shown in detail on FIGS. 26 through 32, when arranged as shown on FIG. 25. This signal translator is associated with service observing position 1 and corresponds to signal translator 227–1 shown on FIG. 2D. The details of the signal translators for the other observing positions are not shown in detail since they are identical to the circuit of FIGS. 26 through 32.

The T conductor on FIG. 26 extends through A winding of transformer 2602, the 1 break contact of relay 26–RLS, and through resistor TSB to negative 48 volts on terminal 2606. The R conductor extends through the B winding of transformer 2602 and through resistor RSB to negative 48 volts on terminal 2601. These negative 48-volt potentials maintain relay 7–CAA operated at this time in observing trunk circuit 1, as already described. Relay 15–TSPS has already operated as described. Therefore, the T and R conductors on FIG. 26 may be further extended on an A-C basis through transformer 2602, amplifier 2603, make contacts 1 and 2 of relay 15–TSPS, to the speech circuit of observing position 1, which is shown within the double-lined rectangle 2604. This double-lined rectangle on FIG. 26, together with double-lined rectangle 1516–1 on FIG. 15, as well as that shown on FIG. 32, disclose all of the facilities within observing position 1 that are needed for an understanding of our invention. These facilities are shown within double-lined rectangles, rather than on an individual drawing figure, in order to minimize the complexity of the drawing figures by positioning the apparatus of the observing position as close as possible to the circuits of our invention with which it is connected.

The transmission of call data to observing position 1 requires the application of the data by the SPC to the binary address bus via the CBT, the registration of this data by the signal transmitter as its input circuitry is unlocked under SPC control by an enable pulse from the CPD, the translation of the registered data from binary to three 1-out-of-4 data bits, the application of the three 1-out-of-4 data bits from the signal transmitter to the distribution circuit, and the transmission of this data to signal translator 1. The signal transmitter, upon reception of this data, either effects a change in the lamp display or the operation of the printer for observing position 1, depending upon the information represented by the received signals.

The operation of the signal transmitter, while performing its function in the transmission of the call data to an observing position has already been described in detail. It will be recalled that its output data is transmitted over the A–, B–, and C– conductors from FIG. 23 to the corresponding designated conductors on FIGS. 20 and 21 of the distribution circuit. The T and R conductors on FIG. 23 extend from the winding of relay LR to the corresponding conductors on FIG. 21. The distribution circuit controls the polarity of the potentials that are applied to the T and R conductors from terminals 2121 and 2122. This enables the distribution circuit to control the operation and release of relay 23–LR, which, in turn, performs certain control functions already described in connection with the operation of the signal transmitter.

Call data signal coding

The information that is generated by the SPC and transmitted via the signal transmitter to the distribution circuit to effect a change in a lamp display or effect a printer operation at a specified observing position is typically referred to as a "command." Each command must contain information specifying the identity of the position to which it is directed, as well as information specifying the nature of the task at the observing position that is to be performed, i.e., change a lamp display or initiate a printer operation. Because of the capacity of the data system, the information comprising a command is transmitted via the signal transmitter to the distribution circuit in two operations, or steps. The information transmitted in the first step indirectly identifies the observing trunk circuit by specifying the identity of the observing trunk circuit selected to serve the call. The information in the first step also contains some of the information required to specify the nature of the task to be performed at the identified position. The identity of the observing trunk circuit is transmitted, rather than that of the position, since this information enables the distribution circuit to determine the identity of the observing position to which the command is directed. As already mentioned, the SPC does not know the identity of the observing position serving any particular call. Therefore, by transmitting to the distribution circuit the identity of the observing trunk circuit involved on each command, the distribution circuit is able to derive the identity of the observing position to which the command is directed by noting which observing position is currently connected to the specified observing trunk circuit.

The signal coding used provides a capacity for up to 128 different observing signals for up to 8 observing trunks. These include the characters that may be printed by the printer. These 128 signals are divided into four signal groups (SG0 through SG3) each of which has 32 signals. The information transmitted in the first half for a command includes the identity of the observing trunk circuit (1-out-of-8) and the signal group number (1-out-of-4). The information transmitted in the second half specifies the signal number (1-out-of-32) of the signal group specified by the first half of the command. The coding used also provides an indication of whether the second or first half of the command is being received.

The coding of the signals produced at the output of the signal transmitter and applied to the input of the distribution circuit on FIGS. 20 and 21 is shown on drawing FIG. 11. The signal registration relays specified in the first column of this chart comprise the A–, B–, and C– input relays on FIGS. 20 and 21 of the distribution circuit. The next two columns together illustrate the various combinations in which the registration relays may be operated when the first half of the command is transmitted. The second column, by itself, illustrates the manner in which the A– relays are operated on a 1-out-of-4 basis to specify the signal group number. The third column illustrates the manner in which one of the B– and one of the C1 or C2 relays are operated to specify the observing trunk circuit number. The last column illustrates the manner in which the A–, the B–, and the C3 and C4 relays may be operated on a 1-out-of-4, 1-out-of-4, and 1-out-of-2 basis to specify 1-out-of-32 signal numbers in the signal group specified by the operation of the A– relays in the second column for the first signal.

The signal transmitter may, for example, operate relays A1, B1, and C1 on FIGS. 20 and 21 during the transmission of the first half of a command. From FIG. 11 it may be seen that the operation of relay A1 specifies signal group 0, the operation of relay B1 narrows the identity of the observing trunk circuit number to "1" or "5," while the operation of relay C1, in view of the operation of relay B1 uniquely identifies the observing trunk circuit number as "1."

It is subsequently described how the signal registration relays of FIGS. 20 and 21 are released following the registration of the information for the first half of a command, and are subsequently reoperated upon the reception of the second half of the command. With reference to column 4 of FIG. 11, it may be seen that the operation of relay C3 or C4 delimits the signal number to one of sixteen. Thus, if relay C3 operates, the signal number may be of any of "00" through "15"; and if relay C4 operates, the signal number may be anywhere from "16" through "31." The operation of one of relays A1 through A4 further delimits the choice and determines the signal number to be any one of four within the group of sixteen specified by relays C3 or C4. Thus, for example, if relay C3 is operated together with relay A1, the signal number is narrowed to a choice of four, i.e., "00" through "03." The B1 through B4 relays determine the exact number within the group of four specified by the operation of relays C3 and A1 for the present example. Thus, the operation of relay B1 would at this time uniquely specify the signal number as being "00," the operation of relay B2 would specify the signal number as "01," etc.

Signal registration in distribution circuit

The signal transmitter normally applies a ground over an obvious circuit on FIG. 23 to its DR conductor which extends to the DR conductor and relay on FIG. 20. This circuit maintains the DR relay operated during the idle state of the signal transmitter. Relay 23–CK operates whenever informtion is registered by the signal transmitter in the proper combinational coded form, i.e., three 1-out-of-4 information bits. The operation of this relay opens its break contacts 6 to open the circuit for relay 20–DR and cause it to release. The release of this relay functionally signifies the initiation of a signal registration operation by the distribution circuit. The informaton registered in the signal transmitter is now applied to the A–, B–, and C– conductors on FIGS. 20 and 21 to operate the correspondingly designated relays in the coded form shown on FIG. 11. Relay 20–DOK comprises a data check relay and is operated whenever the A–, B–, and C– relay groups are each operated on a 1-out-of-4 basis. The ground to operate the DOK relay is supplied by terminal 2001. The relay contacts intermediate terminals 2001 and 2002 comprise a 1-out-of-4 check circuit for the A– relays. Similarly, the contacts between terminals 2002 and 2003 provide a 1-out-of-4 check for the B– relays; the contacts between terminals 2003 and 2004 provide, among other things, a 1-out-of-4 check for the C– relays. Thus, in the event that one relay in each of the three groups is operated at this time, a path may be closed from ground at terminal 2001 to terminal 2004, and from there through resistance DOK to the winding of relay DOK to operate it. As is subsequently described, relay 19–POP is in a released state during the transmission of the half of a command, and is in an operated state during the transmission of the second half. Thus, in order to check that this relay is operated at only the proper times, its contacts are included within the circuitry intermediate terminals 2003 and 2004. Relay DOK may thus operate only if relay 19–POP is in the proper state. The operation of relay 20–DOK closes the following path to extend ground to terminal 2008: ground on terminal 2007, break contacts 19–DTM–4, 19–DRT–5, make contacts 20–DOK–8, to terminal 2008. The ground on this terminal locks operated all of the A–, B–, and C– registration relays that are currently in an operated state.

If relay 20–A1 were operated, its locking path would comprise the A1 resistance, its make contacts 8, to ground on terminal 2008. An analogous path is also provided for every other registration relay currently operated.

Figure 19:
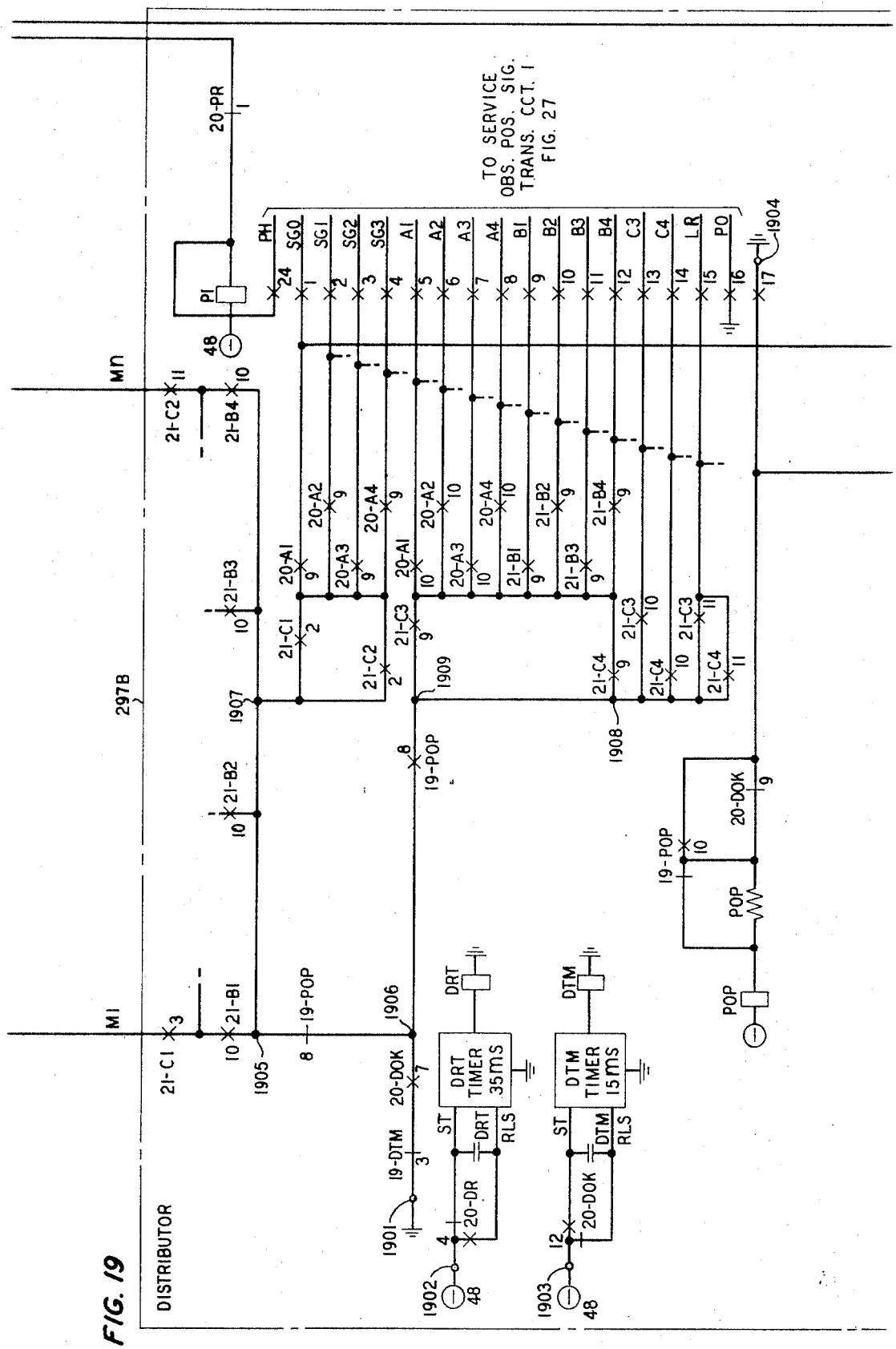

Relay 20–DOK operated closes its make contacts 12 on FIG. 19 to start the 15-millisecond timer DTM. The operation of relay DOK also operates its transfer contacts 1 and 3 on FIG. 21 to reverse the polarity of the potentials applied by this circuit over the T and R conductors to the corresponding conductors of the signal transmitter on FIG. 23. This causes the operation of relay 23–LR to indicate to the signal transmitter that the information sent by it to the registration circuit has been successfully registered in the proper combinational coded form.

Relay 19–DTM operates at the end of its 15-millisecond timing period. This completes the following path to lock operated relay 20–DOK: ground on terminal 2006, make contacts 19–DTM–3, break contacts 20–DR–3, 19–DRT–4, make contacts 20–DOK–10, resistance DOK, to the winding of relay DOK to maintain it operated. Relay 19–DTM in operating also opens its break contacts 4 immediately above terminal 2007 to remove the holding ground for the registration relays and cause them to release.

The operation of relay 23–LR opens AND gate 2305 and releases the A–, B–, and C– relays on FIG. 23. The release of these relays, in turn, releases relay 23–CK, which in releasing closes its break contacts 6 to reapply ground to conductor DR extending to the relay DR on FIG. 20. This ground reoperates the relay, opens its break contacts 3 to open the holding circuit for relay 20–DOK and causes its release. The release of this relay reverses the polarity of the potentials applied on FIG. 21 to the T and R conductor as a signal back to the signal transmitter that this circuit has released its register relays and is ready for the transmission of the second half of the command. The signal transmitter receives this signal when its relay 23–LR relay releases. The foregoing described operations are repeated for the transmission of the second half of the command.

Signal distribution

Each distributor per FIGS. 19, 20, and 21 is associated with a different TSPS and is provided to register and distribute signals for all of the observing trunk circuits associated with its TSPS. The observing trunk circuit number is received with the first half of a command and operates one of the P1 to PX relays on FIGS. 19 and 20. This cuts through a plurality of signal leads between the distributor and the signal translator for the observing position to which the identified observing trunk circuit is connected via the crossbar switch on FIG. 17. The P1 through PX relays are individual to the signal translator for positions 1 through X, respectively. The transmission of call data to a particular observing position via its signal translator requires the operation of its associated P– relay on FIG. 19 or 20.

It has been assumed that the currently described call is being served by observing position 1 via observing trunk 1. This being the case, it may be seen with reference to FIG. 11 that relays B1 and C1 must be operated with the first half of the command in order to specify observing trunk circuit 1. Thus, when the first half of the command is received and relay 20–DOK operates, the following path is closed to operate relay 19–P1: ground on terminal 1901, break contacts 19–DTM–3, make contacts 20–DOK–7, terminal 1906, break contacts 19–POP–8, terminal 1905, make contacts 21–B1–10, 21–C1–3, conductor M1, contacts 3 of the upper left-hand closed crosspoint of the switch on FIG. 17, conductor P1 extending from FIG. 17 to FIG. 19, break contacts 20–PR–1, to the winding of relay P1 to operate it. This relay in operating closes an obvious path through its make contacts 17 to extend the terminal 1904 ground to the winding of relay 19–POP to operate it when relay 20–DOK releases at the end of the transmission of the first half of the information for the command.

Let it be assumed that the currently described command specifies signal group number "0." This operates relay A1, as may be seen on FIG. 11. With the operation of relay 19–P1, the following path is now closed to transmit the group signal number of "0" to the signal translator for position 1 to operate its 27–SG0 relay: ground on terminal 1901, break contacts 19–DTM–3, make contacts 20–DOK–7, terminal 1906, break contacts 19–POP–8, terminal 1905 to terminal 1907, make contacts 21–C1–2, 20–A1–9, make contacts 1 of relay P1, conductor SG0 extending from FIG. 19 to FIG. 27, to the winding of relay 27–SG0 to operate it. The operation of relay 19–P1 closes its make contacts 16 to apply ground to conductor P0, which is extended to FIG. 27 to operate relay P0 in the signal translator.

Relay 15–TSPS operated as described when observing position 1 was seized by the preference circuit on FIGS. 15 and 16. The operated state of this relay completes the following locking path for relay P1 on FIG. 19, as well as relay 27–SG0: ground on terminal 2701, break contacts 27–LK–4, make contacts 15–TSPS–3, to terminal 2702. From there, the ground may be extended through resistor LK2 to the PH conductor to hold relay 19–P1 operated. The ground on terminal 2702 may also be extended through resistance LK1 to hold relay 27–SG0 operated through its make contacts 12.

When the second half of the command is received by the distributor, the 19–P1 and 19–POP relays are in an operated state. Therefore, when relay 20–DOK operates for the second half of the command, the ground on terminal 1906 is extended through make contacts 8 of relay 19–POP to terminal 1909. This terminal may be said to comprise the input of a translator for contacts of the A–, B–, and C– relays, since each such relay that is operated at this time closes its make contacts to extend a ground from terminal 1909 to the corresponding A–, B–, or C– output conductor of operated relay P1. Thus, if relay 20–A1 is currently operated, a path is completed to extend the terminal 1909 ground through make contacts 9 of either relay C3 or C4 and from there through make contacts 20–A1–10, make contacts 5 of relay P1, to output conductor A1. A similar circuit may be traced at this time to apply ground to any one of the B– output conductors if its associated relay is currently operated. The make contacts of relays C3 and C4 are included in the circuits for the A– and B– relays since from FIG. 11 it may be seen that one of relays C3 or C4 must be operated at this time. In a similar manner, the ground on terminal 1909 may be extended to terminal 1908, and from there through the make contacts of either relay C3 or C4 to apply an output signal to one of conductors C3 or C4, respectively. The grounds on the A–, B–, and C– output conductors of relay P1 operate the corresponding relays on FIG. 27. The operation of either of relays C3 or C4 also causes a ground to be extended from terminal 1908 to the LR output conductor. This ground ultimately operates relay 27–LR as subsequently described.

Upon the operation of the 19–DTM relay for the second half of the command, the ground supplied by terminal 1901 is opened at break contacts 3 of this relay to release the A–, B–, and C– translation relays on FIG. 27, as subsequently described, as well as to release relay 27–LR. The release of relay LR opens the locking ground for its relay 27–SG0 and removes ground from the PH lead to release relay 19–P1. The release of this relay releases relay 19–POP.

Rest signal failure

Whenever a signal pulse is not being received, the 20–DR relay is held operated by the signal transmitter. If the rest signal is interrupted, either as a result of the reception of a signal or of a trouble condition, the DR relay releases. With this relay released, the DRT timer on FIG. 19 starts a 35-millisecond timing interval. If a signal pulse has caused the removal of the rest signal, the DRT timer does not time out since the signal pulse is always present for less than the 35-millisecond timer interval. However, a trouble condition will permit the DRT timer to time out and operate the DRT relay. The DRT timer is initially released by the operated make contacts 4 of relay 20–DR. When relay 19–DRT operates, it closes its make contacts 5 to operate relay 20–PR over an obvious circuit to ground on terminal 2007. The operation of relay PR opens its make contacts in series with the winding of the operated P– relay, such as for example, P1, to release it. The operated DRT relay also opens the battery and ground signal from the T and R leads on FIG. 21 to the signal transmitter as a failure signal to that circuit.

Following the restoration of the rest signal, relay 20–DR operates to release the DRT timer and relay. Relay DRT, released, releases the PR relay and recloses the battery and ground potentials to the T and R conductors to the signal transmitter.

Signal Translator—FIGS. 25 through 32

The operation of the signal translator has already been described to some extent in connection with the preceding description of the distributor of FIGS. 19 through 21. Therefore, the following relates to only those circuit operations which have not been previously described.

Figure 27:
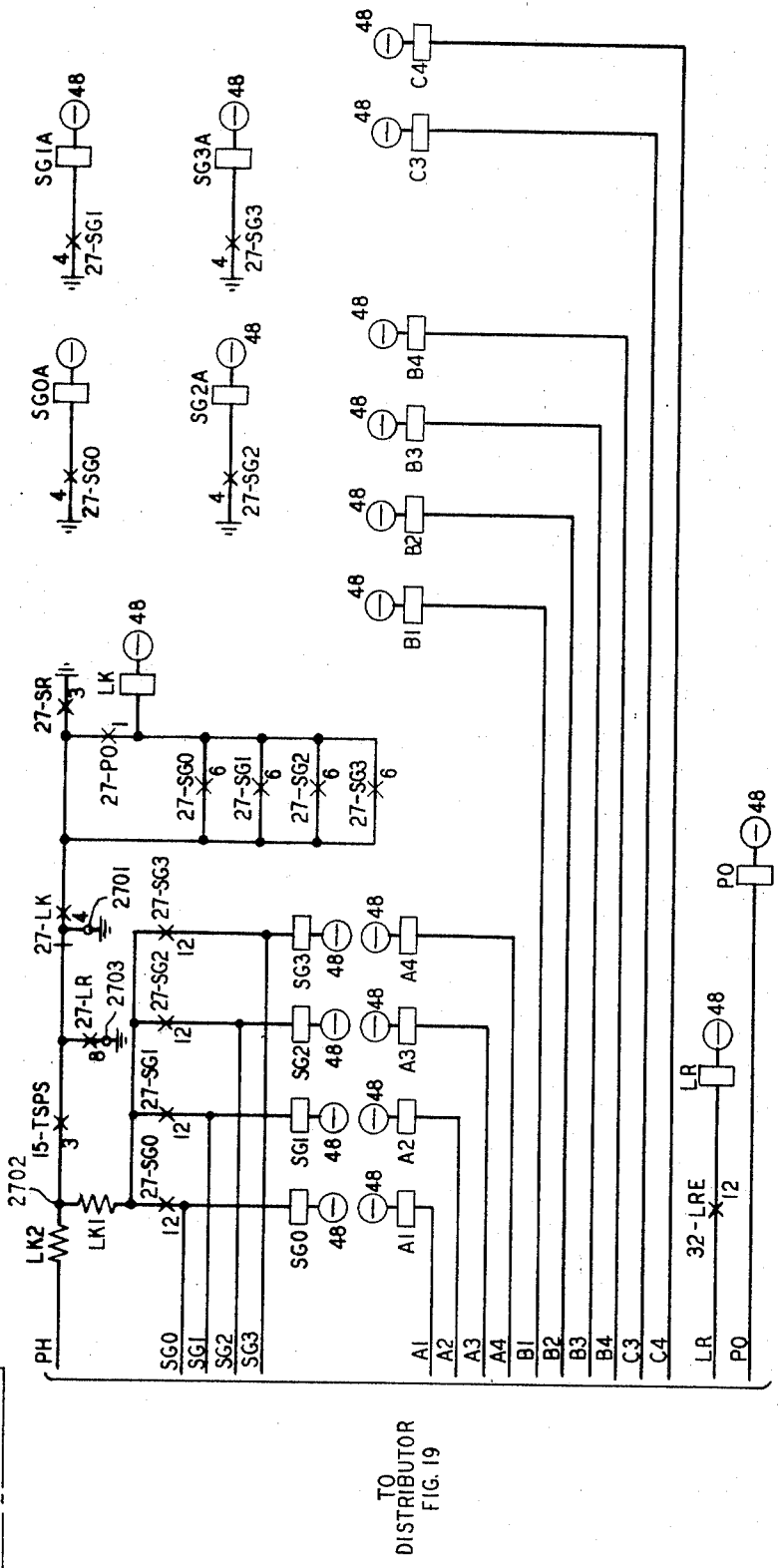

When the first half of the described command signal was received by the distributor circuit, the 19–P1 relay operated to connect its SG–, A–, B–, and C– signal leads to the SG–, A–, B–, and C– translation relays of this circuit on FIG. 27. In addition to operating relay P1, the information encoded into the first half of the command causes the distributor to ground its output conductor SG0 to operate relay 27–SG0. It is subsequently described how the reception of the information encoded into the second half of the command causes grounds to be applied to one of the A–, one of the B–, and one of the C– conductors to operate the corresponding relays on FIG. 27. These operated relays together specify one of the 32 signals of group 0 and effect a transmission of the signal to the observing operator or to the printer.

The P1 relay in the distribution circuit and relay 27–SG0 are currently held operated by ground from terminal 2701, which is applied to the PH lead on FIG. 27 extending back to FIG. 19. Ground on the P0 conductor on FIG. 19 operates relay 27–P0 in this circuit. The operation of relay SG0 operates its auxiliary relay 27–SG0A over an obvious circuit. These relays remain operated until the information comprising the second half of the signal is received and utilized.

At the beginning of an observation, a number of items of call information must be transmitted to the observing position selected to serve the call. Some of this information may be displayed; the remainder of it is printed. This information includes the customer-dialed number, the calling number, the observed trunk number, etc. All of this initial information is deliberately arranged into one signal group, i.e., signal group 0. This permits the information to be sent to the observing position sequentially by transmitting the full command for the first information bit and by omitting the first half of each command subsequent to the first until the entirety of the required initial call information has been received at the observing position. Finally, when all the required information has been transmitted, a final command is transmitted, which presents a "position-called" signal to the observing operator to indicate that the SPC is in the process of attempting to complete a connection to the preselected assistance position. The receipt of the "position-called" signal also signifies the end of the initial call information and effects circuit operations within the signal transmitter to release it from the distributor. From then on for the duration of the call, each subsequently received command must be transmitted in its entirety, with the first half specifying the observing trunk circuit number and the signal group number and with the second half specifying the identity of the signal within the priorly specified signal group.

With reference to FIG. 27, relay LR effectively controls the time at which the signal translator is disconnected from the distributor circuit of FIGS. 19 and 20 following the reception of command information from the SPC. Relay LR operates from ground on conductor LR and releases when the distributor circuit removes ground from the conductor as the DTM timer operates. Relay LR in operating operates relay 27–LK through the operated 27–P0–1 contacts. The operated LR relay also supplies a holding ground for the 19–P1 relay and the 27–SG0 relay from terminal 2703, since when the 27–LK relay operates, the original holding ground for these relays from terminal 2701 is removed. Thus when relay LR releases, it opens the holding ground for the 19–P1 relay and the 27–SG0 relay to release them and disconnect the distribution circuit from signal translator 1. The 27–LK relay which locked operated through the operated 27–P0 relay and 27–SG0 relay contacts, will release when these relays are both released to release the original holding ground from terminal 2701.

Relay 32–LRE is in a released state when the signal translator is initially seized for the reception of call information at the beginning of an observation. This prevents relay 27–LR from operating and, in turn, operating relay 27–LK, so long as relay 32–LRE does not operate. Prior to the time relay LR operates, the holding grounds for the 19–P1 and 27–SG0 relays are supplied from terminal 2701 via break contacts 4 of relay 27–LK. However, once relay LR operates following the operation of relay LRE, it operates relay LK and, from then on, the holding ground for the SG0 and P1 relays is supplied from terminal 2703 via make contacts 27–LR–8.

The reception of the first command at the beginning of an observation specifies the observing trunk circuit number to cause relay 19–P1 to operate and lock, specifies the signal group number to cause relay 27–SG0 to to operate and lock, and specifies one of the 32 command signals within signal group 0 to operate one of the relays or control the printer 2803, on FIGS. 28 through 32. The signal translator and the distributor circuit remain connected at the end of the reception of this command since relay P1 remains held from the terminal 2701 ground. Relay 27–SG0 also remains held to the same ground and thus maintains the signal translator in condition to receive further signal group 0 commands. When the subsequent commands are received for the initial call information (all of which is in signal group 0), only the second half of each command need be transmitted since relays P1 and SG0 remain operated and thus maintain the signal translator in its group 0 condition. Thus, the reception of the second half of each command operates the A–, B–, C– relays on FIG. 27 to decode the command information into a 1-out-of-32 indication for signal group 0.

At the end of the transmission of the initial call information, the position-called signal is transmitted. This operates relay 29–PC, which causes relay 32–LRE to operate and lock for the remainder of the observation. The operation of relay LRE closes its make contacts 12 on FIG. 27 to operate relay 27–LR. This operates relay 27–LK and transfers the holding ground for the P1 and SG0 relays from ground on terminal 2701 to ground on terminal 2703 via the make contacts 8 of relay LR. Relay 27–LR now controls the maintenance of the connection between the distributor circuit and the signal translator; thus, when ground is subsequently removed by the distributor circuit from conductor LR, relay 27–LR releases and, in turn, releases relay P1 and SG0 to disconnect the two circuits. Relay 32–LRE remains operated for the duration of the observation. When signal translator 1 subsequently receives other commands during the course of the same observation, relay 27–LR operates immediately upon the receipt of the second half of the command releases when ground is removed from the LR conductor to disconnect the two circuits.

Thus, with respect to the currently described call, immediately upon the attachment of observing position 1 to the monitoring trunk circuit, a first command is transmitted by the SPC to the translation circuit for the attached observing position. The reception of this command operates relays 19–P1 and 27–SG0. Relay P1 operates since it has been assumed that observing position 1 is to serve the currently described call. Relay SG0 operates since the call information initially transmitted to an observing position is in signal group 0. The reception of the second half of the first command specifies one of the 32 possible signals within signal group 0, and its reception effects either a printer operation or a lamp display in accordance with the information represented by the signal. Subsequent to the reception of the first command and prior to the reception of the position-called signal, as many items of call setup information may be transmitted to the position via its signal translator as may be required by the operator and/or the printer. Each item of call data subsequent to the first command is transmitted in abbreviated form by omitting the transmission of the first half of the command. Since all call setup information is in the same signal group, i.e., signal group 0, and is obviously to be sent to the same position, it is not necessary to repeat this information for all call setup items subsequent to the first, and therefore these items may be sent by transmitting only the signal number of the information within signal group 0. The reception of each such signal in this manner operates its associated A–, B–, and C– relay to effect the desired printer operation and/or lamp display at the position. Finally, when all of the call setup information is transmitted, the position-called signal is transmitted to the observing position to cause the operation of relays 32–LRE and, in turn, 27–LR, so that relays 27–SG0 and 19–P1 may release when ground is removed from conductor LR by the distribution circuit to disconnect the distribution circuit and the signal translator. Relay SG0, released, releases relay 27–LK.

Signal translation

The information signals comprising the second half of each received command operate a unique combination of its relays A–, B–, and C– relays. One of relays SG– is operated when the first half of the command is received. This combination of relays together provides a maximum of 128 different output signals, each of which is specified by a unique combination of operated relays. The rectangle 2801 entitled "Translation Network" contains the contacts of the SG–, A–, B–, and C– translation relays, and a unique one of its output conductors is energized in response to the reception of each command signal. The translation network is shown only diagrammatically, rather than in detail. The reason for this is that the network comprises a conventional translator which operates in the manner shown on FIG. 33 to produce the various output signals. The output conductors of the network extend from the perimeter of rectangle 2801 into the cables leading to the printer and to the registration relays of FIGS. 29 through 32, which control the lamp display at the observing position. Thus, on the top left side of network 2821, its output conductors 0 through 9, together with conductors I, D, A, O, M, H, P, and # extend into cable 2802 which, in turn, extends to printer 2803. The remaining output conductors on the top and bottom of the network extend, via cables 2804 and 2805, to the various registration relays on FIGS. 29 through 32. Each output conductor extending into cables 2804 or 2805 is designated alphabetically or alphanumerically, and it connects from the output of network 2801 to a correspondingly designated conductor on one of FIGS. 29 through 32 to control the operation of a correspondingly desginated relay. For example, the bottom left output conductor is designated HD0, it extends into cable 2805, and from there to conductor HD0 in the upper left-hand corner of FIG. 29. As subsequently described, a ground on conductor HD0 effects the operation of relay 29–HD0.

Since the circuit details of the translation network 2801 are not shown, FIG. 33 indicates the output conductor of network 2801 that is energized in response to each possible combination of operated translation relays. The rightmost four columns of FIG. 33 list the output conductors of the network, indicating the drawing figure disclosing the registration relay connected to each conductor. Thus, the designation 30–CR in the upper right portion of the chart on FIG. 33 indicates that output conductor CR is connected to relay CR on FIG. 30. A ground potential appears on any out conductor in these four columns when its indicated SG– relay specified at the top of its column is operated together with the indicated A–, B–, and C– relays specified in the same line of the chart in the second, third, and fourth columns. For example, the output conductor CR is set forth in the top line and right-hand holumn of the chart. This conductor is enerfiized whenever relay SG3 is operated together with relays A1, B1, and C3. Similarly, the operation of relay SG0 together with relays A1, B1, and C3 would produce an output on conductor 0.

Signal registration

The output signals of translation network 2801 are applied to the printer and the signal registration relays of FIGS. 29 through 32, as already mentioned. The output signals applied to the printer cause it to print a character for each signal received. The output signals applied to the registration relays operate them to control the lamp display at the observing position. Each registration relay on FIG. 29 through 32, when it operates, closes a set of its make contacts to energize a corresponding lamp at the observing position. These lamps are shown diagrammatically, for the most part, on FIG. 28 within the rectangle 2806 designated "S.O. position lamps." The display lamps for the CC, CCL, and NO+ signals are shown in detail. The circuit for each remaining lamp is not shown in order to minimize the complexity of the drawing. However, it may be understood that the operation of any signal registration relay whose contacts are shown on FIG. 28 connected to rectangle 2806, effects the display of its corresponding lamp within the rectangle. In other words, each signal registration relay having contacts on FIG. 28 extending from ground to the perimeter of the rectangle is to be understood to be connected within the rectangle to a corresponding lamp which is illuminated whenever the contacts of the signal registration relay are closed. All of the lamp signals may be considered to be of six basic types which may be classified as; printed, ground, momentary, supervisory, keying, and locked-in. The type classified as "printed" are those signals which cause an alphabetic or numeric character to be printed. The "grouped" type are those signals which may change during the course of a call due to the lighting of a subsequent signal within a defined group of signals. "Momentary" signals are those which are only presented before the observing operator for a short period, i.e., approximately two seconds. "Supervisory" type signals are those signals which must be lighted and extinguished independent of the lighting of another signal. "Keying" signals are those which cause the printer operation as well as the lighting of a signal lamp. Those signals which cannot change or be extinguished as a result of some subsequent signal but will instead remain lighted until the release of the observation are classified as "locked-in signals."

Printed signals

All numerical information regarding the observed call is registered on a printed tape by the printer. Preceding the digits to be printed is an alphabetical character which identifies the nature of the numerical information in accordance with typical telephone terminology. The meaning of the alphabetical characters is shown on Table A.

TABLE A

| Character: | Meaning |
|---|---|
| A | ANI. |
| B | Key Pulse Back. |
| C | Charge. |
| D | Customer Dialed. |
| F | Key Pulse Forward. |
| H | Hotel. |
| I | Trunk Identification. |
| M | Minutes. |
| N | Key Pulse Notify. |
| P | Position. |
| R | Key Pulse Rate. |
| S | Key Pulse Special. |
| T | Key Pulse Trouble. |

Following each group of numericals, a dash (—) is printed via contacts 31–ST–3 to separate the data groups. If a keying error is detected, a slash (/) is printed following the numericals. If a digit cannot be determined, a # is printed for that digit. Upon the disconnect of the observing position, a □ is printed.

Grouped signals

Since the signals for the kind of call, position indication, recall class, AMA timing, and billing may change during the course of the call, the signals for each of these categories are grouped. This grouping permits the receipt of any signal within a group to cause the lamp for any previously received signals in the same group to be released. In other words, the reception of a new signal within a group supersedes that for a previously received signal. This is accomplished by providing a locking relay for each group, which is momentarily operated when any signal within its group is received. The signals within each group and the locking relay for the group are shown on Table B.

TABLE B.—SIGNAL GROUP

| Kind of call | Position indications | Recall class | AMA timing | Billing class |
|---|---|---|---|---|
| LOCK RELAY ||||| 
| KCL | PIL | RCL | ATL | BCL |
| SIGNAL WITHIN GROUP ||||| 
| NST | PC | T & C | CTM | SPD |
| NO+ | PA | NFY | CCL | SCOL |
| NDO | PR | CHG | REC | SSCG |
| CST | | | STM | SSCD |
| CO+ | | | STMF | SACL |
| CDO | | | | PPD |
| HST | | | | PCOL |
| HO+ | | | | PSCG |
| HDO | | | | PSCD |
| | | | | NOA* |
| | | | | NOAF* |

*The NOAF signal will not release any other signal within the group. The NOA signal will release the NOAF signal only. The other signals within the group will release each other as well as the NOA and NOAF signals.

The reception of one of the signals listed in Table B operates its associated registration relay and momentarily operates its associated lock relay for the group in which the signal is classified. The lock relay operates only momentarily and then releases to provide a holding path for the operated registration relay. If a signal in the same group is susbequently received, its registration relay will operate at the same time its lock relay momentarily operates. At this time, the momentary operation of the lock relay releases the priorly operated registration relay and, upon the release of the lock relay, provides a holding path for the registration relay associated with the newly received signal. Thus for example, with reference to relay NST in the upper right-hand corner of FIG. 29, relay 29–SR1 is released at the time the signal is received. The ground on conductor NST is therefore extended through break contacts 29–SR1–1 to the winding of the lock relay KCL of the same figure. Relay KCL operates from this ground signal and completes a momentary holding path for itself through its own make contacts 3 on FIG. 29, through break contacts 29–SR1–6, to terminal 2901. From the table on FIG. 33, it may be seen that the NST signal is transmitted with the operation of relays A4, B2, and C4 and SG2. Thus, since relay C4 is operated at this time, terminal 2901 is grounded to terminal 2902 at this time via make contacts 27–C4–2c. As will be subsequently seen, for the reception of each signal of the type now being described, one of relays 27–C3 or 27–C4 will always be operated. Thus terminal 2901 will be grounded through the make contacts 2c of one of these two relays.

The operation of relay 29–KCL completes the following path to operate relay 29–SR1: ground on terminal 2904, break contacts 26–RLS–3e, make contacts 29–KCL–4, to the winding of relay SR1 to operate it. This relay in operating operates its make transfer contact 6 to complete a locking path for itself to the 2902 terminal ground and opens the holding path for relay 29–KCL to release it. During the period of time relay KCL was operated, it opened its break contacts 4 on FIG. 29. These contacts comprise the locking circuit for each of the registration relays HD0 through NST on the top of FIG. 29, and thus any of these relays that may have been priorly operated would have released during the brief period of time relay KCL was in an operated state. The SR1 relay remains operated for the duration of time contacts 27–C4–2c remain closed. This period of time is approximately 10 milliseconds. During this time, the ground potential on conductor NST is extended through make contacts 29–SR1–1 to the winding of registration relay NST to operate it. This relay in operating closes a locking path for itself through its make contacts 14, break contacts 29–KCL–4 and 26–RLS–3e, to ground on terminal 2904. This locking path permits the registration relay to remain operated following the end of the transmission of the NST signal, at which time ground is removed by the translation network from conductor NST.

With respect to the foregoing, it may be seen that the reception of each signal within a group, as shown on Table B, effects the operation of the registration relay for the signal and, at the same time, effects the release of any priorly operated registration relay within the same signal group.

Figure 32:
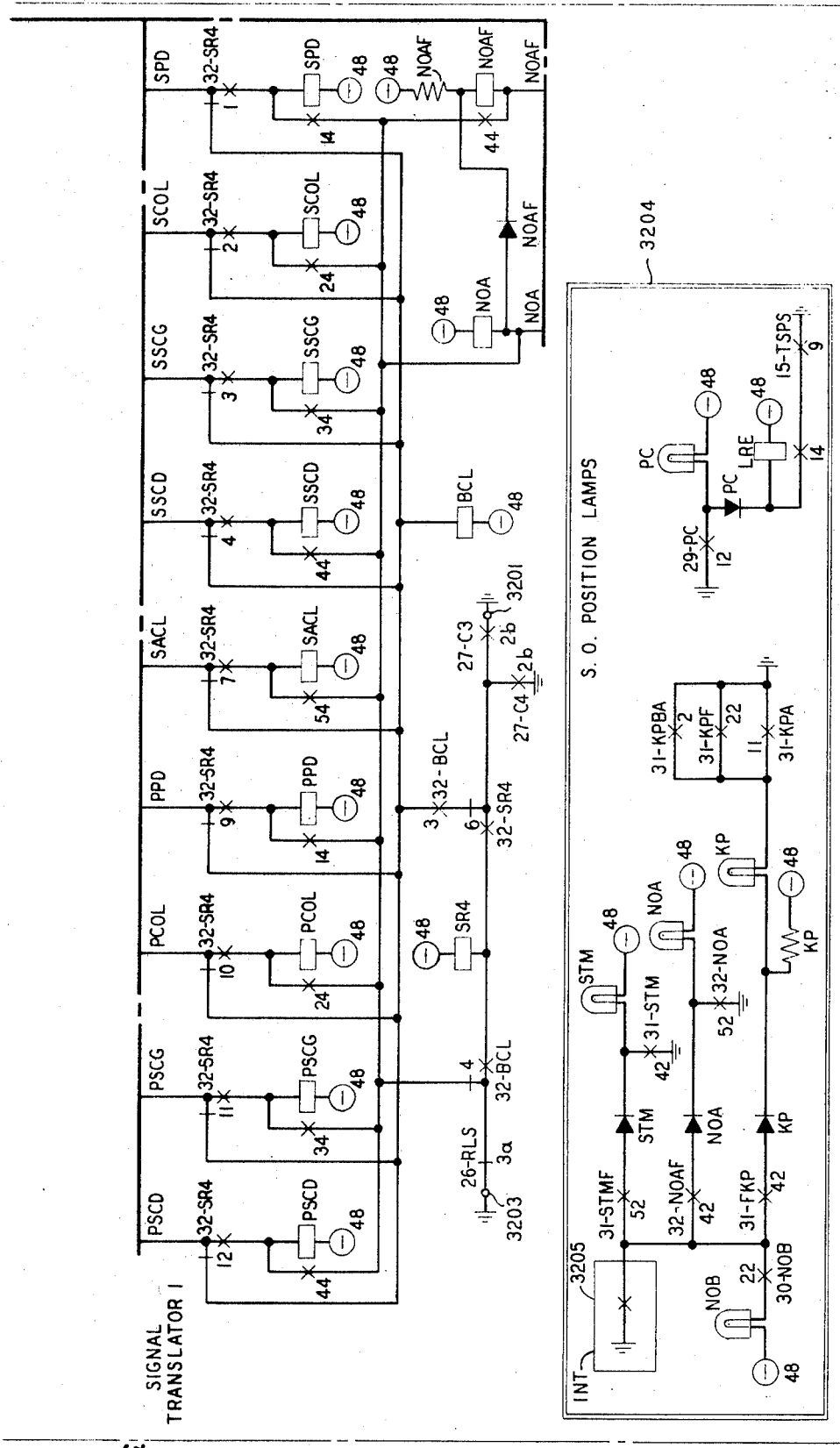

The NOA and NOAF relays on FIG. 32 comprise an exception to this statement, in that the reception of the NOAF signal operates its relay but does not effect the release of any other signal relay within the group shown in the right-hand column of Table B. The reception of the NOA signal operates its relay and is effective to release only the NOAF relay by short circuiting the NOAF resistance battery via diode NOAF in the event that that signal has been priorly received.

Momentary signals

Figure 30:
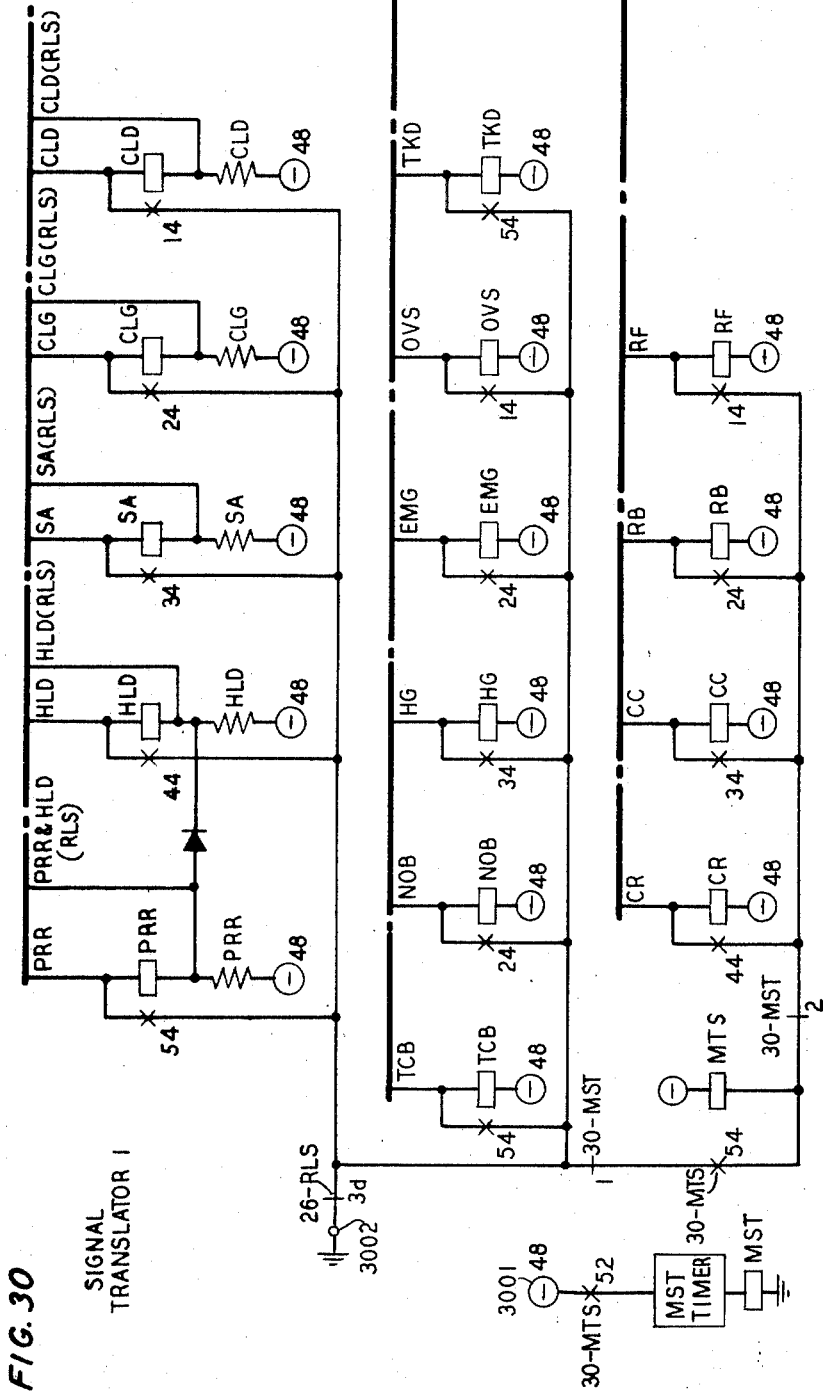

In addition to the grouped signals already described, the observing position is presented with four momentary signals which persist for approximately 2 seconds. These signals are RF, RB, CC, and CR. They functionally represent ringforward, ringback, coin-collect, and coin-return. The relays associated with these signals are shown on the lower row of FIG. 30. These signals are transmitted by the SPC to an observing position to indicate the operation of one of the ringing or coin-control keys at the assistance position serving the call. When the signal for one of these key operations is received, the corresponding signal registration relay on FIG. 30 operates and lights its associated lamp on FIG. 28. Through the locking contact for the operated registration relay, the MTS relay on FIG. 30 is also operated by the incoming signal. Relay MTS in operating provides a locking circuit for the operated registration relay through its make contacts 54, through break contacts 1 of relay 30–MST, through break contacts 29–RLS–3D, to the terminal 3002 ground. This path also provides a locking path for relay MTS, as well. The operation of relay MTS also closes its make contacts 52 to extend the terminal 3001 negative battery to the MST timer to energize it. This timer then initiates a 2-second timing interval, which is terminated by the operation of its relay MST. Since the incoming signal will be terminated before the operation of the MST relay, the operated MST relay releases the MTS relay by opening break contacts 30–MST–1 and releases the operated registration relay by opening break contacts 30–MST–2. The release of relay MTS opens the energizing circuit for the MST timer and causes relay MST to release and the timer to recycle.

Supervisory signals

The registration relays associated with the supervisory signals that may be received at the observing position are shown on the top of FIG. 30 and are designated PRR, HLD, SA, CLG, and CLD. The CLD relay and its associated lamp indicates the state of the called end of the connection; the CLG indicates the state of the calling end of the connection; the SA indicates the state of the outpulser; the HLD indicates whether the assistance position has placed the call on HOLD; the PRR indicates the depression of the position release key at the assistance position when an observed call is on hold. The register relays for these signals operate in a different manner from those priorly described, in that a separate signal is required for the release, as well as for the operation, of these relays. For example, relay CLD operates in response to the receipt of the similarly entitled signal and releases in response to the receipt of the CLD (RLS) signal. Each such relay, when operated, locks to the ground on terminal 3002. Each such relay is released when its associated release signal is received, which shunts down the battery supply for the relay and effects its release. Each of these relays is also associated with a lamp in rectangle 2806 and, when operated, maintains its lamp illuminated. With the exception of the PRR signal, each release signal for these relays releases only its associated registration relay. Since the PRR signal is released only when the HLD signal is also released, the release signal for the PRR relay also releases the HLD relay.

Keying signals

Figure 31:
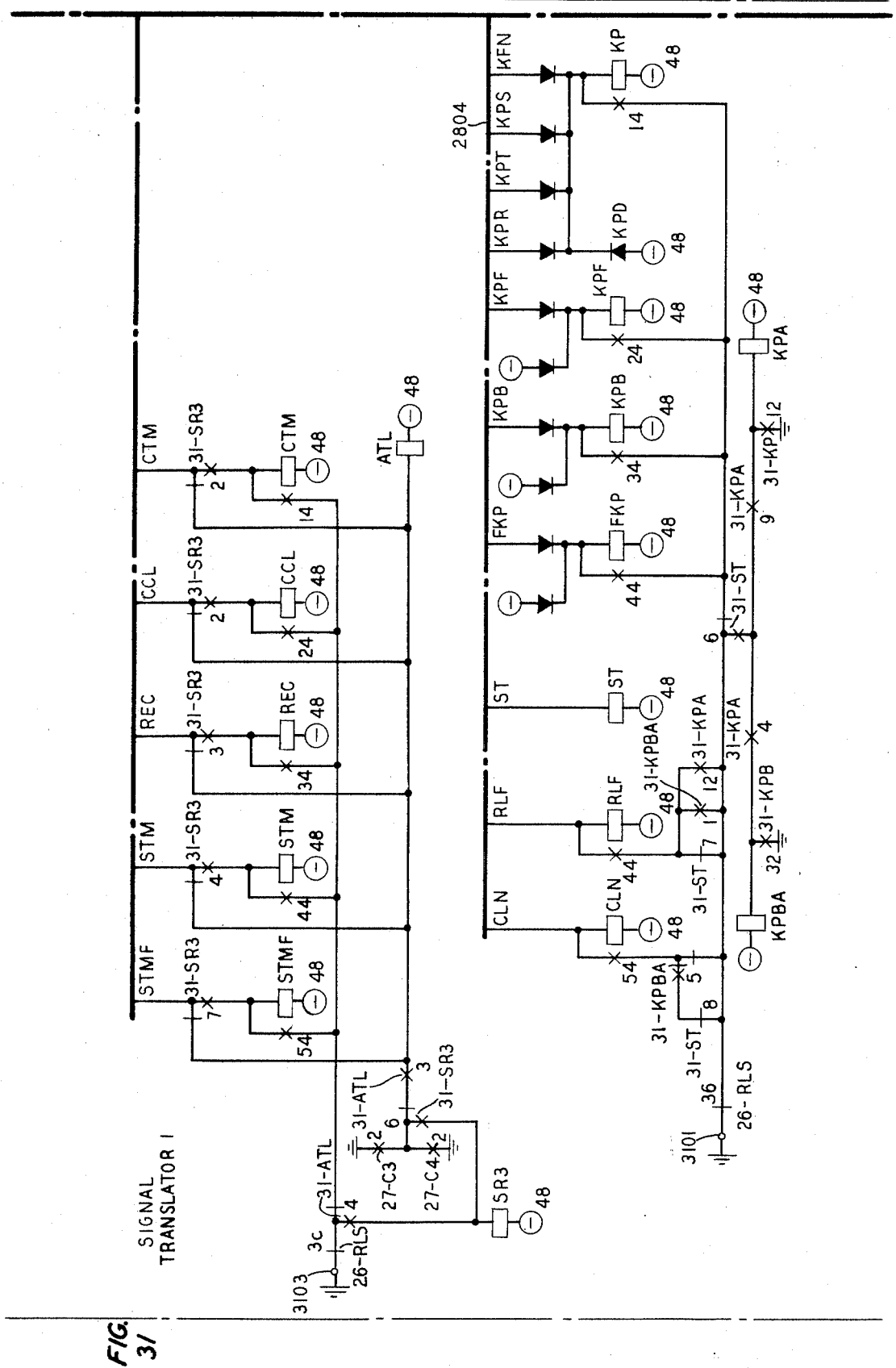

The relays on the lower half of FIG. 31 register the keying signals received from the SPC to provide the observing operator with a lamp display indicating the keying action taken by the operator at the attached assistance position. These relays are CLN, RLF, ST, FKP, KPB, KPF, and KP. With the exception of relay KP, each relay operates in response to the reception of its associated signal. Relay KP operates for the reception of signals KPR, KPT, KPS, and KPN. The key calling (CLN), release forward (RLF), and the various KP-relays control the illumination of lamps CLN and RLF within the rectangle 2806 or lamp KP within rectangle 3204 to provide indications regarding the calling and called numbers and the operator keying. The CLN lamp indicates the need for the assistance operator to key the number of the calling customer. The RLF lamp indicates the operator release of the forward connection. The KP lamp indicates the operation of one of the KPB, KPF, KPS, KPR, KPT, or KPN keys by the assistance operator in preparation for keying a calling or called number, a special billing number, billing rate information, a trouble code, or notification information. Only one lamp (KP) is provided for these key operations since a distinctive character for each of these signals is printed by the observing position printer circuit. The KP lamp acts to alert the observer to the fact that keying information is being received by the printer circuit. At the completion of keying, a signal indicating the operation of the ST key at the assistance position will cause the operation of relay 31–ST which will release the KP relays to extinguish the KP lamp. The ST relay operation will also cause a dash (—) to be printed to act as a separator for the various printed indications. If incorrect keying is detected by SPC, the FKP signal will be received. This signal will cause the operation of relay FKP which will cause the KP lamp to flash. A slash (/) will be printed by the printer circuit as a distinctive separator which indicates an error being present in the information preceding it. The CLN and RLF signals are each received and registered on an individual registration relay which lights the corresponding signal lamp within rectangle 2802. The release of these two signals is controlled by the START (ST) signal following the calling number keying (KPB) and the called number keying (KPF), respectively. Receipt of the START signal operates relay 31–ST, which opens its break contacts in the holding circuit for these relays extending to the ground on terminal 3101 to release them. The RLF signal is also released by an ST signal without a KP signal when a new forward connection to a previously received called number is attempted.

When one of the KP type keys is operated at the assistance position, a distinctive signal for the depressed KP key operated is received at the observing position. The output of the translation circuit is connected both to the printer to print a distinctive character for the depressed key and to the signal registration relay on FIG. 31 to operate it and control the lighting of the KP signal lamp shown within rectangle 3204. The KPF and KPB signals each operate a correspondingly designated relay while the KPN, KPS, KPT and KPR signals all operate the KP relay. These relays lock operated through the break contact 6 of relay 31–ST and break contacts 26–RLS–36 to the terminal 3101 ground. The operated KPF relay lights the KP lamp on FIG. 32, whereas the KPB or KP relay operates its associated relay KPBA or KPA. These auxiliary relays light the KP lamp on FIG. 31 and provide a locking path around break contacts 7 of the 31–ST relay for the RLF relay if it were previously operated. This prevents the release of the RLF signal, except following forward keying. Since the CLN signal must release following back keying, the operation of the KPBA relay places a locking circuit for a previously operated 31–CLN relay under control of a break contact of the ST relay.

The reception of each of the various KP type signals operates the various KP type relays on FIG. 31, as already described. Also, the reception of each signal causes the printer to print a distinctive character for ecah key operated. The circuit by means of which this is accomplished is shown on FIG. 28. Conductors KPN, KPS, KPT, KPR, KPF, and KPB, extend into cable 2804 to the indicated leads on FIG. 31 to operate various KP relays. These conductors also extend as conductors N, S, T, R, F, and B, into cable 2802, which extends back on FIG. 28 to the printer. The reception of any one of these signals operates its KP relay in the manner described, and, in addition, causes the printer to print the character specified by the identification of the conductor on FIG. 31 extending into cable 2802. For example, the reception of the KPN signal operates relay KP and, in addition, extends a ground over the conductor represented by a "N" to cause the printer to print that character. Similarly, the reception of a KPB signal operates relay KPB and causes the printer to print a B.

Following the keying of the various digits, the assistance operator typically operates the ST key at her position. The signal for this key operation operates the 31–ST relay. This relay operated provides a "—" signal from the terminal 3102 ground to the printer to cause that circuit to print a "—" character whenever the ST signal is received. The locking ground for the KP, KPF, and KPB relays is also opened by the operation of relay ST to cause the release of any one of these operated relays. If the KPA or KPBA relay is operated, the operated ST relay signify the call exclusion information to the SPC, so that at any time it may determine the types of calls that can and cannot be service observed. The exclusion circuitry on FIGS. 6, 7, and 8 is physically connected to the observing trunk circuit 1, and it is by means of this trunk circuit that the signals are received to saturate the exclusion circuit ferrods. However, functionally speaking, the exclusion circuit is associated with all observing trunk circuits since the setting of its ferrods determines the types of calls that may be offered by the SPC to all observing trunk circuits for the TSPS center.

Figure 12:
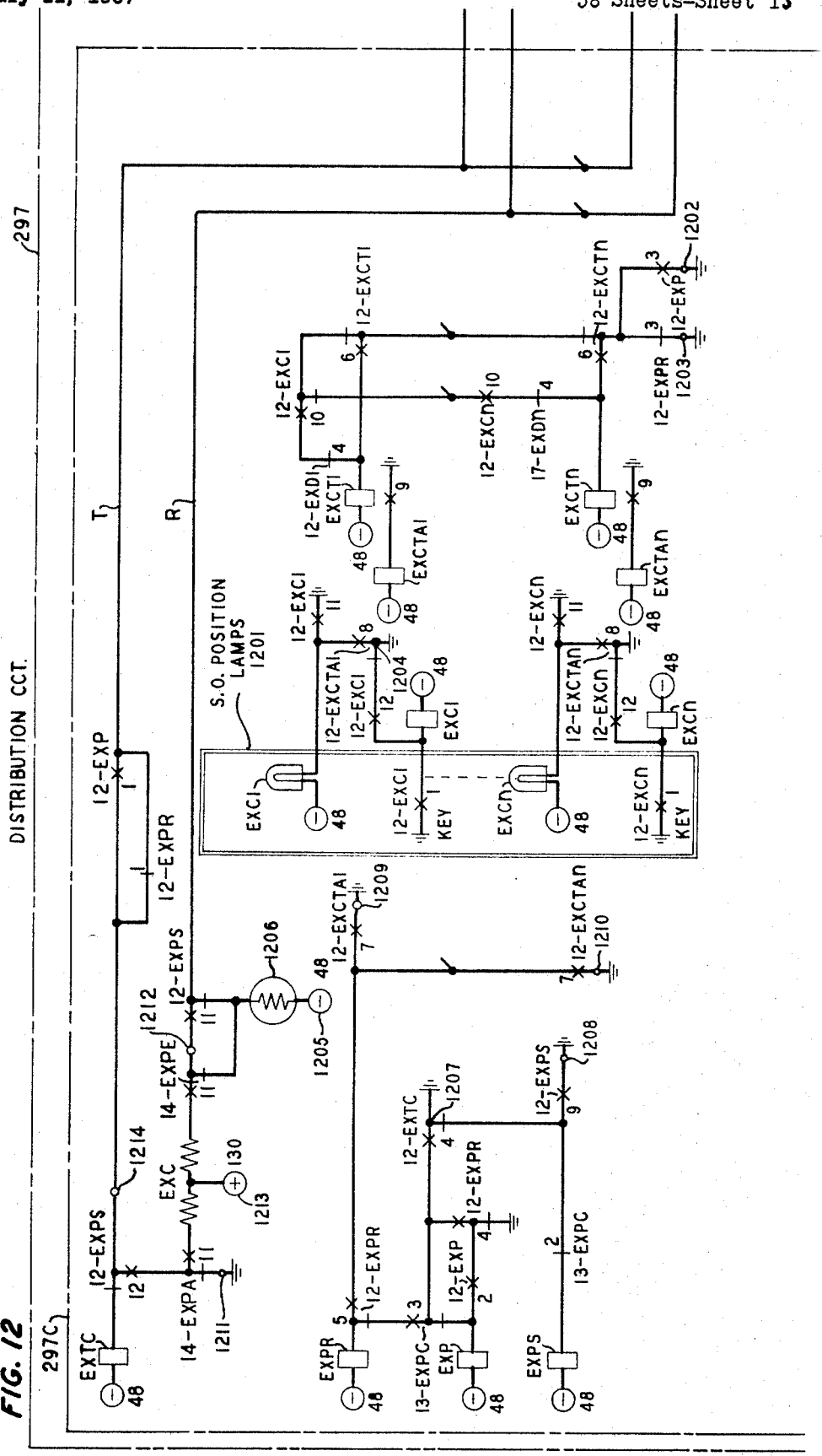
Figure 13:
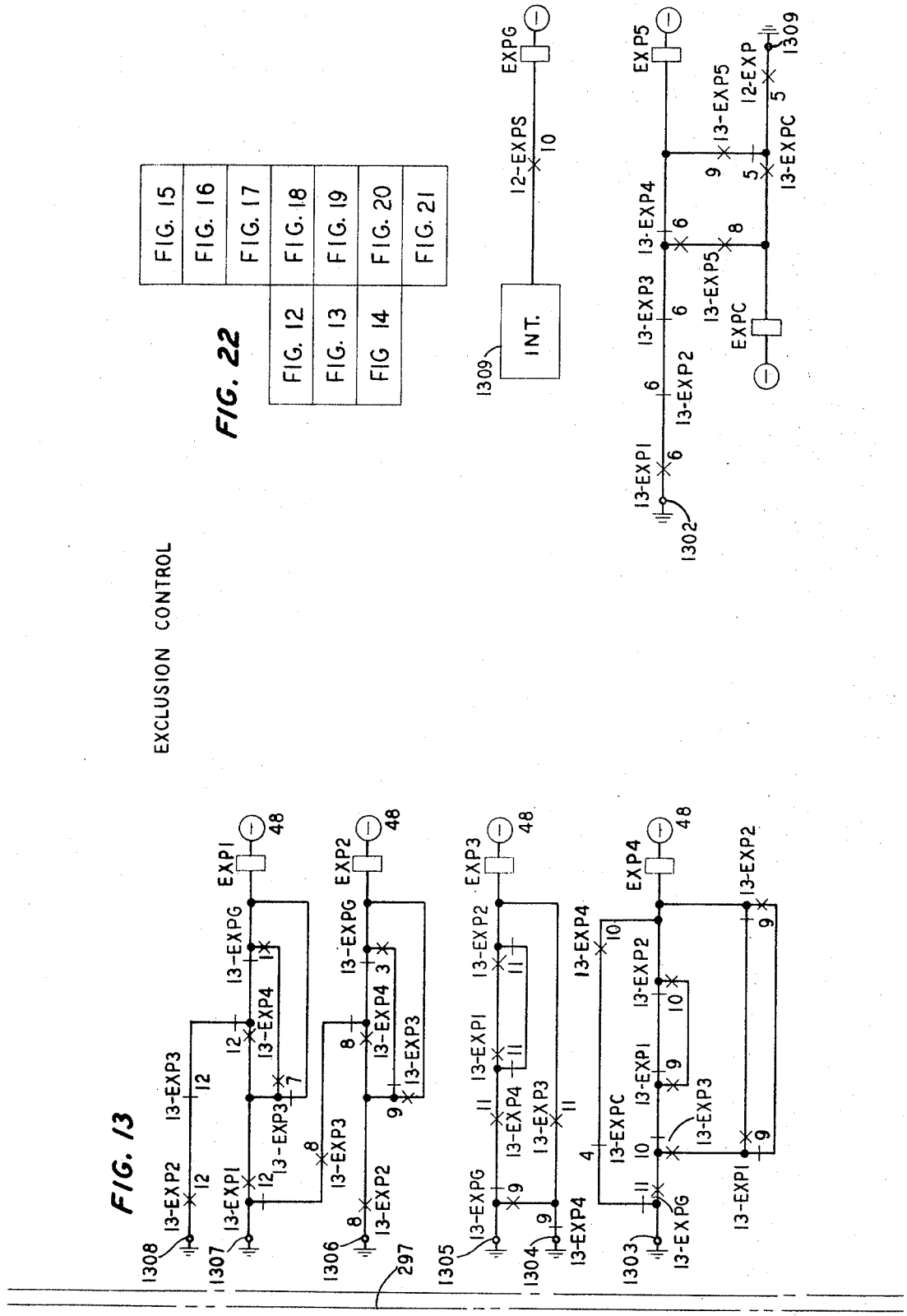

The observing circuitry shown on FIGS. 12 through 14 is functionally associated with the distribution circuit and it operates to send signals to the exclusion circuitry of FIGS. 6, 7, and 8 regarding the types of calls that may and may not be service observed. The circuitry of FIGS. 12 through 14 can send exclusion signals to all TSPS centers served by the observing equipment.

The exclusion circuits are provided in order to permit the observing operator to restrict observations to particular classes of calls, as well as to particular groups of assistance operator positions. The assistance operator positions in a TSPS center are typically subdivided into a plurality of groups, and it is desirable at certain times to permit the supervisory operator at the service observing positions to exclude the calls served by certain of the assistance operator groups from being service observed. FIG. 6 discloses scanner ferrods CC0 through CC4 in detail and ferrods OG0 through OG8, diagrammatically. Each ferrod is associated with one of the relays CC0 through CC4, shown in detail on the same figure, or one of relays OG0 through OG8, shown diagrammatically. The relays and scanners designated CC0 through CC4 are each associated with one of the five classes of calls that may be excluded, while the relays and ferrods designated OG0 through OG8 are each associated with one of the nine assistance operator groups that may be excluded. A particular type of call or a particular operator group is excluded when its associated relay is operated on FIG. 6. The operation of its relay saturates its scanner as a signal to the SPC that the type of call or operator group associated with the ferrod is to be excluded. Thus for example, the operated state of relay 6–CC0 closes an obvious circuit to saturate ferrod CC0 as an indication to the SPC that the class of call represented thereby is to be excluded.

The operated and nonoperated states of the CC– and OG– relays on FIG. 6 are established during a sequence of operation that is hereinafter termed an "exclusion operation." Any CC– or OG– relay that is operated during an exclusion operation remains held in an operated state until the initiation of a subsequent exclusion operation. At this time, the operated CC and OG– relays all release and a new combination of these relays are then operated.

An exclusion operation is initiated by the exclusion circuitry shown on FIGS. 12, 13, and 14. As subsequently described, during the exclusion operation, this circuitry transmits over the T and R conductors to observing trunk circuit 1 for the disclosed TSPS center, a series of control pulses comprising different combinations of polarities on the T and R conductors interconnecting observing trunk circuit 1 and distribution circuit. This series of pulses, first of all, release the CC– and OG– relays on FIG. 6 that were operated during the previous exclusion operation. The pulses also advance the steering circuit comprising relay 7–EXSA through 7–EXSP. As each pulse is received, it causes the operation of relay 8–EXPE if the exclusion relay (CC– or OG–) then connected to the steering circuit is to be energized, or alternatively, operates relay 8–EXPA if the exclusion relay currently connected by the steering circuit is not to be operated. The steering circuit advances in response to the receipt of successive control pulses from the distribution circuit. It signals the distribution circuit that the exclusion operation may be terminated when the last relay in the steering circuit has operated.

As has already been mentioned, the distribution circuit and the observing positions may be arranged to serve a plurality of TSPS centers or other types of offices. The exclusion circuitry within the distribution circuit permits an exclusion operation to be limited to one TSPS center at a time. Thus, a first combination of calls may be excluded at a first TSPS center, a second combination of calls excluded at a second TSPS center, etc. FIG. 12 discloses a series of relays and keys designated EXC1 through EXC*n*. Each of these combinations of keys and relays is associated with one of the TSPS centers to which the distribution circuit is connected. The operation of a key, such as for example, EXC1, initiates the circuit operations required to effect an exclusion operation at a first TSPS center.

Upon the initiation of an exclusion operation, as subsequently described, the counting relays EXP1 through EXP5 on FIG. 13 sequentially advance and apply control potentials to the series of exclusion keys on FIG. 14, designated CC0 through CC4 and OG0 through OG8, within rectangle 1429. Each of these keys is functionally associated with the correspondingly designated relay and ferrod on FIG. 6. The keys are depressed by the supervisory observing operation prior to the initiation of an exclusion operation. Then, as the counting relays EXP1 through EXP5 advance, they apply potentials to operate either relay EXPE or EXPA on FIG. 14, depending upon whether each of keys CC0 through OG8 is operated or released when it is energized by the counting circuit. The relays EXPE and EXPA, in turn, control circuitry on FIG. 12, which transmits the control pulses over the tip-and-ring conductors back to observing trunk circuit to advance the steering circuit on FIG. 6 and to operate the exclusion relays for the types of calls and operator positions that are to be excluded.

In order to describe the operation of the exclusion circuits in further detail, let it be assumed that a new exclusion operation is required for which calls in classes 0 and 4 and operator group 8 are to be excluded. All other classes of calls and operator groups are to be permitted service observing. The supervisory service observing operator initiates this exclusion operation by depressing keys CC0, CC4, and OG8 on FIG. 14 within the rectangle 1429. These keys correspond to the exclusion keys shown as element 229 on FIG. 2D. The supervisory service observing operator next operates the exclusion control key EXC1 on FIG. 12 within the rectangle 1201. Each of keys EXC1 through EXC*n* is individual to one of the TSPS centers or offices served by the distribution circuit and the service observing facilities. The operation of key EXC1 initiates the remainder of the exclusion operations for observing trunk circuit 1, as described in the subsequent paragraphs.

The operation of key EXC1 on FIG. 12 closes an obvious path to operate relay 12–EXC1 and, in turn, to energize lamp EXC1 which lights as an indication that an exclusion operation is in progress. This lamp remains lit unitl the exclusion operation has been completed. Since the T and R leads of the observing trunk circuit 1 are used for the transmission of the exclusion information, that trunk circuit must be idle before its T and R leads may be cut through to the exclusion circuit of FIGS. 12 through 14. Furthermore, since only one exclusion pulsing circuit is provided for the distribution circuit, which in turn may serve a plurality of TSPS centers, the cut-through to the observing trunk circuit T and R leads from the exclusion circuit may not occur if the exclusion pulse circuit is currently cut through to some other trunk circuit and is in the process of an exclusion operation.

When an observing trunk circuit becomes idle at the end of serving an observed call, its HOLD magnet on FIG. 17, MPD1 for observing trunk circuit 1, releases together with its associated relay 17–EXD1. If at this time no holds it operated until the ST relay releases. This permits the release of the RLF relay if the ST relay operation is for an automatic retry of a previously received called number or it prevents the release of the RLF relay except for an automatic retry or following keying forward. It also prevents the release of the CLN relay following other than keying the calling number (KPB).

If the ST key operation follows digit keying in which an error is detected by SPC, a lamp at the assistance position flashes. In this case, a distinctive signal to the observing position causes an operation of the FKP signal registration relay on FIG. 31. The printer also prints a distinctive character to denote the error. The character is a "/," as shown on FIG. 28, for the conductor extending into cable 2802 immediately above the FKP conductor. Relay FKP, operated, locks through the break contact of relay ST and connects the 3205 interrupter ground through diode KP to shunt the KP lamp on FIG. 32 to cause it to flash. A START signal following errorless keying causes the release of the FKP relay when the ST relay operates.

Locked-in signals

The observing position receives certain signals which remain locked in for the duration of time the position remains attached to the call. The registration relays for these signals are shown on the middle row of relays on FIG. 30. These relays are, reading from left to right: transfer to cordboard (TCB), nonobserve (NOB), hotel guest (HG), emergency (EMG), overseas (OVS), and trunk disconnected (TKD). The receipt of any of these signals causes the operation of its signal registration relay on FIG. 30. The signal registration relay locks operated directly to the break contacts 3d of relay 26–RLS and the 3002 terminal ground for the duration of the call. Each relay in operating lights its associated signal lamp in rectangle 2806.

Release of Observing Position

At the conclusion of an observation, the observing operator momentarily operates her RLS key, shown on FIG. 26. This closes an obvious path to operate the R relay in the S.O. position circuit. This relay locks operated through the operated 15–PB1 relay and closes a path through its 2 make contact to operate relay RLS, provided no signal is in the process of being received, i.e., relay 27–P0 is released at this time. With relay RLS operated, the signal registration relays are released and the signal lamps are extinguished. Relay RLS in operating opens its break contacts 1 to remove the terminal 2606 battery from the T lead and connects positive 130-volt battery through the RLSA relay, via its make contacts 1, to the T lead. This 130-volt signal is a release signal to the observing trunk circuit. Relay RLSA operates in series with relay 7–RLS in the observing trunk circuit. Relay 26–RLSR operates through make contacts 26–RLSA–5 and break contacts 26–RLSR–8 to the ground provided by the position release key. Relay RLSR in operating closes a locking path for itself over its make contacts 8 to the same ground. Through the operation of the transfer contacts 9 of relay RLSR, the locking ground for the 15–TSPS relay is placed under control at the operated 26–RLS relay 5 contact. The operated 7–RLS relay in the observing trunk circuit operates the ORL relay in FIG. 8 through the 4 make contact of relay 7–RLS the 7–CAA–4 break contact to the terminal 801 ground. The 8–ORL relay locks operated and opens the terminal 1010 ground from the RLS ferrod at the master scanner circuit. This changes the RLS ferrod from a saturated to an unsaturated state as a release signal to SPC. Upon recognition of this signal, SPC will cause the SRC flip-flop of FIG. 10 to be reset and effect the release of the SRC relay. With relay ORL operated, the release of relay SRC will cause the operation of relay CRL in FIG. 9. Relay CRL operated opens its 9 break contact to open the locking path for relay SD in FIG. 8. The release of relay SD releases the 8–CA relay. Release of the CA relay opens the RLS and CAA relay windings from the T and R leads of FIG. 7 to the Distribution Circuit and closes these leads to the T— and T+ relays and the R— and R+ relays. The released CA relay also releases the 8–ORL relay which in turn releases the 9–CRL relay. Relay CRL released closes its 3 break contacts to again saturate the RLS ferrod as an indication to SPC that the circuit has released.

Figure 28:
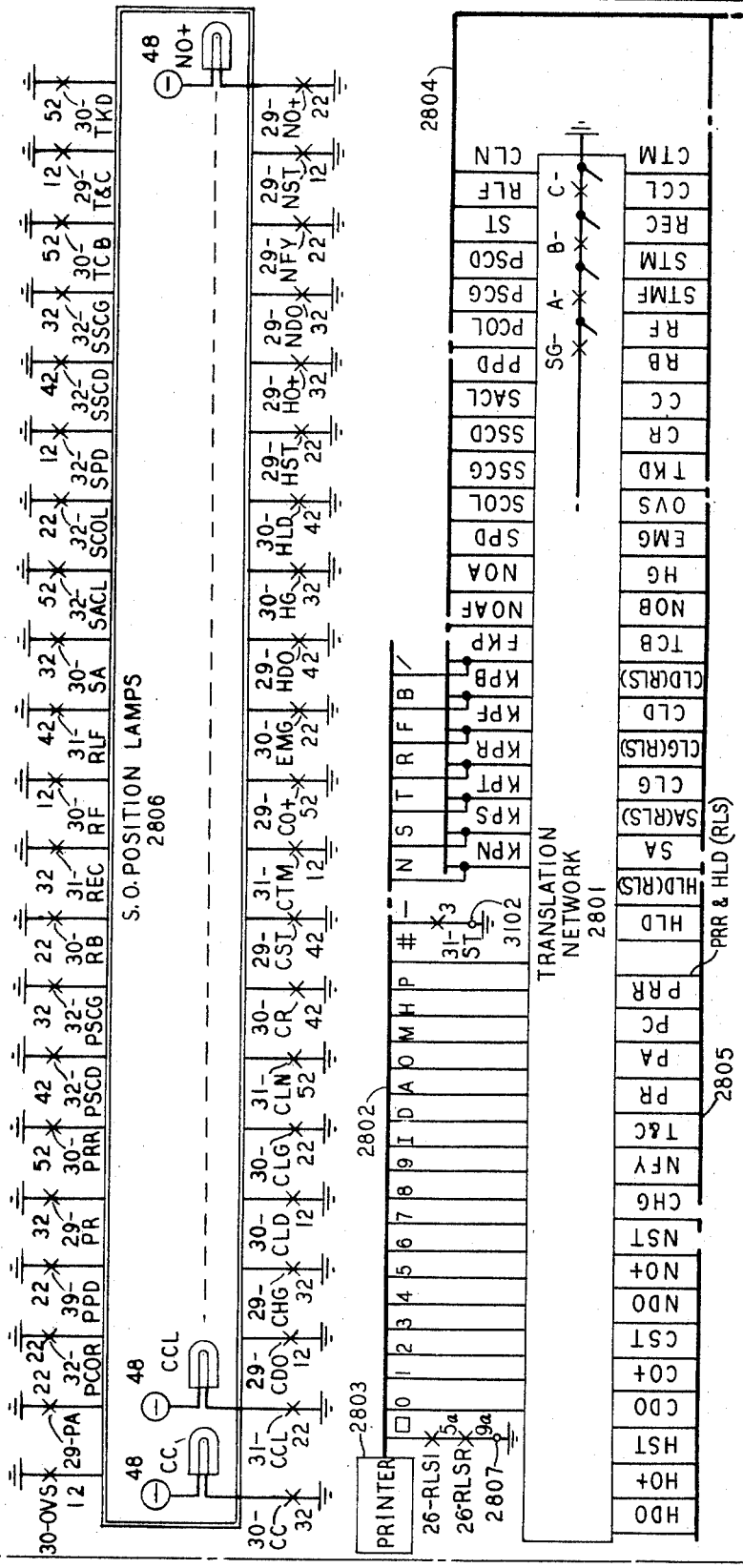
Figure 29:
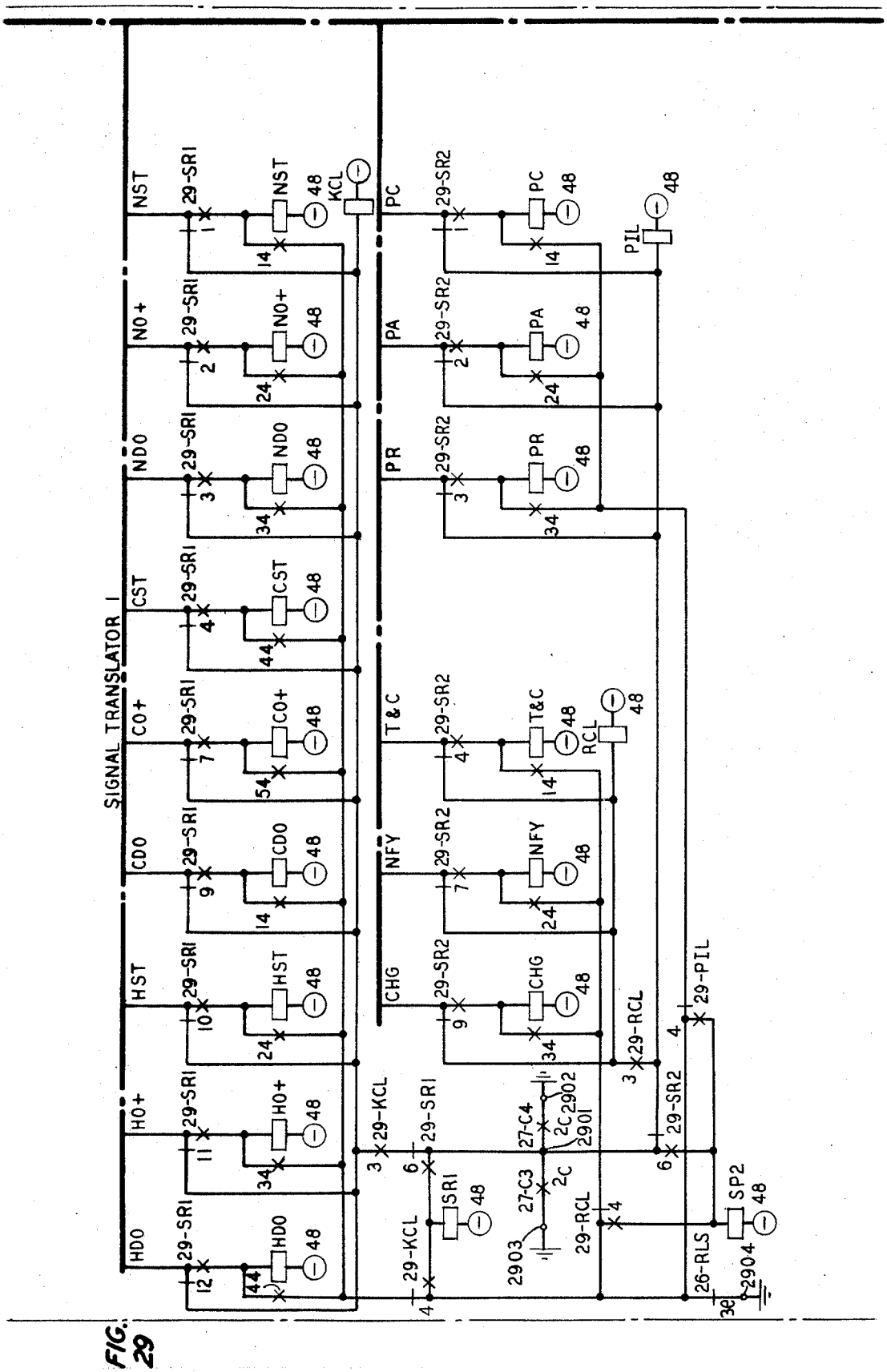

When the CA relay transferred the T and R leads to terminals 711 and 710, the T lead is effectively open to the +130 volt potential through the 26–RLSA relay. This causes the release of relay 26–RLSA. With this relay released, relay 26–RLS releases. Through relay RLSR operated and RLS released, the disconnect signal is sent to the printer, which prints a distinctive character (a rectangle) to signify the end of printed information for the call. This circuit is shown in FIG. 28 and extends from ground on terminal 2807 adjacent the printer. Relay 15–TSPS in the position translator circuit is released by the release of relay RLS by opening of the terminal 1514 locking ground which is now through the generated RLSR relay. Release of relay TSPS releases the 15–PL1 relay by opening the terminal 1515 ground from the PL lead to the position preference circuit of FIG. 15. This also releases the 17–MPD1 hold magnet in the distribution circuit to release the crosspoints interconnecting the observing trunk circuit with observing position 1. The relay 15–PB1 is released at this time in observing position circuit upon the release of relay TSPS. The PB1 relay, in releasing, releases the R relay in the position. This releases the RLSR relay on FIG. 26. The position circuit PB relay released removes the position-busy indication for the position and operates relay PN to permit it to accept new calls for observation.

It has already been mentioned that the observing operator is disconnected from the speech circuit of an observed call when the assistance operator position is released. The circuit that accomplishes this function is shown on FIG. 26. Relay 29–PR is operated as a position release signal when the assistance position is released from a call. The PR lamp on FIG. 28 is illuminated at this time as a signal to the observing operator. Relay 30–HLD is operated when the assistance operator places a call on hold. The HLD lamp on FIG. 20 is then illuminated as a signal to the observing operator. Make contacts of relays 29–PR and 30–HLD are connected between ground and one side of the winding of relay 26–RFC. Thus, relay RFC is operated whenever relay 29–PR or 30–HLD is operated. Break contacts 1 and 2 of relay RFC are in series with the TA and TB leads of the observing operator's speech circuit on FIG. 26. These contacts effectively disconnect the observing operator from the speech circuit of a call whenever relay 29–PR or relay 30–HLD operates and in turn operates relay 26–RFC.

Call Exclusion

The SPC checks the state of certain ferrods in the scanner upon the receipt of each call to determine whether the call is of the type for which observing is permitted. If observing is permitted, the SPC attempts to connect the call to an observing position. If the required observing facilities are not available, the SPC serves the call within the TSPS center on an unobserved basis in the same manner as for a call of the type for which observing is not permitted.

The circuit of our invention which controls the types of calls for which observing is permitted is the exclusion circuit and is shown on FIG. 6, the top half of FIG. 7, on part of FIG. 8, and on FIGS. 12, 13, and 14. The exclusion circuits on FIGS. 6 and 7 receive signals specifying the types of calls for which observing is not to be permitted and, in response thereto, alter the state of the master scanner ferrods on the top of FIG. 6. The various combinations in which these ferrods may be saturated other observing trunk circuit is currently in the process of receiving exclusion information, relay 12-EXCT1 operates over the following path: ground on terminal 1203, break contacts 12-EXPR-3, break contacts 6 of relays 12-EXCT$n$ through 12-EXCT1, make contacts 12-EXC1-10, break contacts 12-EXD1-4, to the winding of relay EXCT1 to operate it. This relay in operating closes its transfer make contacts 6 to provide a locking path for itself to the same ground that operates the relay. The transfer contacts 6 of the EXCT– relays and the contacts 10 of the EXC– relays, together with break contacts 4 of relay 17-EXD$n$, provide a preference circuit to ensure an orderly sequence of circuit operations in the event that two or more exclusion operations are simultaneously attempted or that one exclusion operation is attempted while another is currently in progress.

Relay 12-EXCT1, in operating, closes an obvious path to operate its slave relay 12-EXCTA1. Relay 16-MOS1 operates at this time from the ground supplied by make contacts 12-EXCT1-10. The operation of this relay causes the observing trunk circuit 1 to appear busy, as priorly described, in connection with the establishment of a connection from observing trunk circuit 1 to observing position 1. Relay 12-EXCT1 in operating operates its transfer contacts 4 and 8 on FIG. 18 to transfer the T and R conductors extending to observing trunk circuit 1 from the circuitry associated with the distribution switch to the exclusion control circuitry of FIG. 12. The operation of relay 12-EXCTA1 opens its break contacts 8 to open the holding path for relay 12-EXC1 to release it.

The connection of the T and R conductors from the observing trunk circuit to the exclusion control circuitry on FIG. 12 operates relays 12-EXTC and 7-T– in series over the following circuit path: negative 48-volt battery on one side of the winding of relay 12-EXTC, break contacts 12-EXPS-12, 12-EXPR-1, the T conductor extending from FIG. 12 to FIG. 18, make contacts 12-EXCT1-4 the T conductor extending from FIG. 18 to the T conductor on the right side of FIG. 7, winding 705, resistance 709, break contacts 8-CA-1, through the windings of relays T– and T+ in series, break contacts 8-PA-2, to terminal 719, through diode T– within the exclusion circuitry shown within the rectangle 720, make contacts 8-EXPL-4, break contacts 16-EXPC-4, 8-EXPA-5, 8-EXPE-8, to ground on terminal 717. The following path is also closed at this time to operate relay R–: negative potential on terminal 1205, resistance 1206, break contacts 12-EXPS-11, the R conductor extending through make contacts 12-EXCT1-8 on FIG. 18 to the T conductor of FIG. 7, through winding 706, resistor 708, break contacts 8-CA-3, and through the windings of relays R– and R+ in series to ground on terminal 714. Relay R+ does not operate because the polarity applied to it is opposite that required for its operation.

Relay 12-EXTC in operating closes the following path to operate relay 12-EXP: ground on terminal 1207, make contacts 12-EXTC-4, break contacts 13-EXPC-3, to the winding of relay EXP to operate it.

The operation of relays T– and R– on FIG. 7 completes the following path on FIG. 8 to operate relay EXP: ground on terminal 801, break contacts 7-CAA-4, 7-RLS-4, break contacts 4 of relay 7-T+, to terminal 809. From that terminal, the ground may be further extended through make contacts 4 of relay 7-R–, make contacts 2 of relay 7-T–, break contacts 8-CA-12, 8-SD-2, to terminal 810. From there, the path may be further extended through break contacts 9-CRL-7, 9-SOS-7, to terminal 811 within the rectangle 805, which discloses a portion of the exclusion circuitry. From terminal 811, the ground may be further extended through break contacts 7-EXPC-8 to the winding of relay EXP to operate it. This relay in operating closes its make contacts 1 to extend the terminal 806 ground to terminal 811, and from there through the break contacts of relay EXPC to the winding of relay EXP. The 8-EXPL relay has been, prior to this time, operated and locked as a consequence of a prior exclusion operation. However, the operation of relay 8-EXP at this time opens its break contacts 2 to open the holding circuit for relay EXPL, which now begins a slow-release operation. The operation of relay 8-EXP opens its break contacts 1 on FIG. 6 to isolate the terminal 606 ground from the rest of the circuitry on the figure. As is subsequently described, this terminal 606 ground comprises a portion of the holding path for the exclusion register relays (CC0 through OG8), and therefore the operation of break contacts 1 of relay EXP at this time opens the locking circuit for these relays and causes them to release. Subsequently, following the end of its slow-release interval, relay 8-EXPL releases, closes its break contacts 8 on FIG. 6 to provide a terminal 607 holding ground for the exclusion register relays that will be operated during the course of this exclusion operation.

The release of relay 8-EXPL closes its break contacts 7 on FIG. 7 to extend the terminal 712 ground to the left on FIG. 7 and through the indicated break contacts of the EXPC and EXSP relays to terminal 722, through the break contacts of corresponding relays shown only diagrammatically within rectangle 605, to terminal 723, and through the corresponding break contacts of relays EXSC and EXSB to the winding of relay EXSA. This relay is the first relay of the exclusion steering circuit, and its operation prepares the first stage of the exclusion circuit, relay 6-CC0, for the receipt of the exclusion information supplied by the exclusion circuitry of FIG. 12.

The release of relay 8-EXPL opens its make contacts 4 within the rectangle 720 to isolate the T– diode from the terminal 717 ground. This removes ground from the T lead through relays T+ and T–, releases relay T–, and constitutes a signal to the circuit on FIG. 12 that the exclusion pulsing operation may begin.

The removal of the T– diode ground on FIG. 7 from the T lead opens the circuit for relay 12-EXTC of the exclusion control circuit as a signal that the observing trunk circuit is prepared to receive the exclusion information. The release of relay 12-EXTC closes the following path to operate relay 12-EXPC: ground on terminal 1207, break contacts 12-EXTC-4, 13-EXPC-2, to the winding of relay EXPS to operate it. This relay in operating closes its make contacts 9 on FIG. 12 to complete a holding path for itself to the terminal 1208 ground. The operation of this relay starts the exclusion pulsing operation, as described in the subsequent paragraphs.

A series of 14 pulses is used to send the exclusion information to the observing trunk circuit. These pulses are generated by the interrupter 1301 ground. Relay 13-EXPG follows the pulses whenever relay 12-EXPS is in an operated state, as it is at the current time. The contacts of the EXPG relay on FIG. 13 drive the EXP1 through EXP5 counting relays, which count the pulses generated by relay EXPG. The contacts of relay EXPG on FIG. 14, together with the contacts of the counting relays EXP1 through EXP5 on the same figure, direct an operating ground to either relay 14-EXPE or 14-EXPA on each pulse, in accordance with the setting of the exclusion key associated with the pulse. One blank pulse is transmitted before the transmission of the first exclusion pulse, i.e., the pulse associated with key CC0, to prevent possible incorrect signaling due to a short pulse if the first operation of relay EXPG should occur during the middle of a pulse provided by the 1301 interrupter.

The operation of relay 12-EXPS transfers control of the potential applied to the T and R leads in FIG. 12 to the contacts of the 14-EXPE and 14-EXPA contacts 11. Upon its operation, relay 12-EXPS closes the following path to apply ground on FIG. 12 to the T conductor: ground on terminal 1211, break contacts 14-EXPA-11, make contacts 12-EXPS-12, break contacts 12-EXP-1, to the T conductor, where the ground potential is extended to the T conductor on FIG. 7. No circuit operation within FIG. 7 takes place at this time as a consequence of the application of this potential. The operation of relay 12–EXPS opens its break contacts 11 on FIG. 12. However, the terminal 1205 negative 48-volt battery remains connected to the R conductor at this time via break contacts 11 of relay 14–EXPE. This potential on the R conductor maintains relay 7–R— operated. Following the transfer of the T and R leads to the 14–EXPE and 14–EXPA control, the blank pulse and 14 exclusion pulses are transmitted from FIG. 12 to FIG. 7. The setting of the exclusion keys on FIG. 14 determines the nature of the exclusion pulse transmitted to FIG. 7. If the exclusion key is operated on FIG. 14, an exclusion pulse is transmitted to FIG. 7 to cause the operation of the exclusion relay on FIG. 6 associated with the exclusion key. If the exclusion key is not operated, an exclusion pulse of a different type is transmitted, which merely advances the steering circuit on FIGS. 6 and 7, but which does not affect the operation of its associated exclusion relay on FIG. 6.

The first operation of relay 13–EXPG closes its make contacts 11 on FIG. 13 to extend the terminal 1303 ground to the right through break contacts of relays EXP3, EXP1, and EXP2 to the winding of relay EXP4 to operate it. This relay in operating closes its make contacts 10 to prepare a holding path for itself through break contacts of relay EXPC when relay EXPG subsequently releases. Each operation or release of relay EXP4 occurs following the operation of relay EXPG. Subsequent to the first operation of the EXP4 relay, each release or operation of relay EXP4 closes the operate ground for the EXPE and EXPA relays from terminal 1401 through the EXPG relay operated and the combination of the EXP– relays to the CCD–OG8 keys. The EXPE or EXPA relay will therefore operate upon the operation or release of EXP4 and will release upon the release of relay EXPG. The operation of the EXPE or EXPA relay effects the transmission of an exclusion or advance pulse to the observing trunk circuit. Upon this first operation of the EXPA relay no circuit is available to operate either the EXPE or EXPA relay to effect the transmission of an exclusion pulse back to the observing trunk circuit. Subsequently, relay EXPG releases, closes the holding path for relay EXP4, as already described, and closes the following circuit on FIG. 13 to operate relay EXP3: terminal 1305, break contacts of relay EXPG, make contacts of relay 13–EXP4, and the break contacts of relays EXP1 and EXP2 to the winding of relay EXP3 through its contacts 9 of that relay and opens the holding path for relay EXP4 to release it. The release of relay EXP4, closes a holding ground through its break contacts 9 for relay EXP3. Immediately subsequent to the release of relay EXP4, the following path on FIG. 14 is completed to apply ground to the contacts of key CC0: ground on terminal 1401, make contacts 13–EXPG–7, through break contacts at EXP1 and EXP2, through make contacts of EXP3, through break contacts EXP4 and EXP5, make contacts EXCT1, to the contacts of key CC0. If the key is operated, this ground may be further extended to the winding of relay 14–EXPE to operate it. If key CC0 is not operated, the ground on its contact is extended to operate relay 14–EXPA. It has been assumed that key CC0 is operated to exclude call class 0, and therefore relay EXPE operates at this time.

On FIG. 12, the operation of relay 14–EXPE operates its make contacts 11 to transfer the R conductor, i.e., terminal 1212, from the negative 48-volt battery on terminal 1205 to a +130-volt battery at terminal 1213. The tip conductor at terminal 1214 remains connected at this time to ground at termial 1211 via the make contacts of relay EXPS and break contacts of relay EXPA.

On FIG. 7, the removal of the negative potential from the R conductor and the application to it of the positive 130-volt potential releases relay R— and operates relay R+. This, in turn, extends the ground on terminal 809 through break contacts 4 of relay R— and through make contacts 4 of relay R+ to terminal 803, and from there, through make contacts 8–EXP–5, to the winding of relay EXPE to operate it. The operation of this relay closes the following path on FIG. 6 to operate exclusion register relay CC0: ground on terminal 608, make contacts 8–EXPE–11, 7–EXSA–2, to the winding of relay CC0 to operate it. This relay in operating closes a locking path for itself, over its make contacts 1, and through break contacts 8–EXPL–8 to the terminal 607 ground.

In addition to operating relay 6–CC0, the operation of relay 8–EXPE closes the following path to operate relay 7–EXPB: ground on terminal 724, make contacts 8–EXPE–10, 7–EXSA–3, break contacts 7–EXSB–8, to the winding of relay EXSB to operate it. This relay in operating closes its make transfer contacts 8 to complete a locking path for itself to the right on FIG. 7 to the ground on terminal 723.

The CC0 exclusion pulse is terminated when relay 13–EXPG subsequently releases. The release of this relay opens its make contacts 7 on FIG. 14 to isolate the terminal 1401 ground from the CC0 key and thereby effect the release of relay 14–EXPE. The release of relay EXPE releases its transfer contacts 11 on FIG. 12 to remove the +130-volt battery and reapply the negative 48-volt battery to the R conductor. This releases relay R+ and operates R— on FIG. 7. The release of relay R+ releases its transfer contacts 4 on FIG. 8 to release relay EXPE by isolating it from the ground on terminal 812. Relay EXPE in releasing opens its make contacts 10 on FIG. 7 to remove the terminal 724 ground from the circuit holding relay EXSA operated, to cause its release. This relay remained operated following the operation of relay EXSB by the circuit comprising make contacts 9 of relay EXSB and make contacts 3 of relay EXSA to the ground on make contacts 10 of relay EXPE. Thus, with the release of relay EXPE at this time, relay EXSA releases.

In partial summary of the foregoing, it may be seen that it is desired to exclude call class 0; that key CC0 on FIG. 14 was operated prior to this exclusion operation; and that, during the transmission of the first exclusion pulse, relay EXPE was operated to effect the operation of exclusion relay CC0 on FIG. 6.

The release of the EXPG relay at the termination of the first exclusion pulse closes its break contacts 9 on FIG. 13 to extend the terminal 1305 ground to the winding of relay EXP3 to hold it. Also, the release of relay EXPG closes its break contacts 3 on FIG. 13 to complete a path to operate relay EXP2 from the terminal 1307 ground.

The period during which the second exclusion pulse may be transmitted is initiated when relay 13–EXPG subsequently operates. The operation of the relay at this time closes its make contacts 9 to provide a locking path for relay 13–EXP3, closes its make transfer contacts 3 to provide a locking path for relay 13–EXP2, and closes its make transfer contacts 11 to provide a circuit to operate relay 13–EXP4 via make contacts EXP3, break contacts EXP1, and make contacts EXP2 to the winding of relay EXP4. At this time, the following path is closed on FIG. 14 to apply the terminal 1401 ground to the contacts of exclusion key CC1: ground on terminal 1401, make contacts 13–EXPG–7, break contacts 13–EXP1–1, make contacts 13–EXP2–1, 13–EXP3–2, 13–EXP4–3, break contacts 13–EXP5–2, make contacts 12–EXCT1–2, to the contacts of key CC1. It has been assumed that observing is to be permitted for call class 1, i.e., observing not to be excluded, and therefore the ground on the contacts of this key is extended through the key in its released state to the winding of relay 14–EXPA to operate it.

The operation of relay 14–EXPA at this time operates its transfer contacts 11 on FIG. 12 to disconnect the T conductor, i.e., terminal 1214, from the terminal 1211 ground, and to connect the conductor to the terminal 1213 130-volt positive battery. The R conductor at this time remains connected to the terminal 1205 negative 48-volt battery. The removal of ground from the T conductor and the application of the positive 130-volt potential thereto operates relay T+ on FIG. 7 since the right side of the winding of this relay may be extended through the T+ diode, break contacts 5 of relay 8–EXPL, and break contacts 7–EXPC–10 to the terminal 718 ground. The operation of relay T+ closes the following path at this time to operate relay 8–EXPA: ground on terminal 801, break contacts 7–CAA–4, 7–RLS–4 terminal 813, make contacts 4 of relay 7–T+, terminal 814, make contacts 2 of relay 7–R—, terminal 815, make contacts 8–EXP–4, to the winding of relay EXPA to operate it.

The operation of relay 8–EXPA functionally indicates that the steering circuit is to be advanced at this time and that the exclusion registration relay (CC1) associated with the second exclusion pulse is not to be operated, and hence the type of call represented thereby is not to be excluded. With reference to FIG. 6, it may be seen that relay CC1 does not operate at this time since the 8–EXPE relay is not operated to close its make contacts 11 to furnish the operating ground over which the exclusion registration relays can be operated. The operation of relay EXPA closes the following circuit at this time to operate the third steering relay (7–EXSC): ground on terminal 723, make contacts 8–EXPA–3, break contacts 7–EXSA–3, make contacts 7–EXSB–10, break contacts 7–EXSC–5, to the winding of relay EXSC to operate it. The operation of relay EXSC closes its make transfer contacts 5 to close a locking path for itself via terminal 723 and the priorly described holding circuit for the other steering relays to the terminal 712 ground. This relay in operating also closes its make transfer contacts 4 to hold relay EXSB operated temporarily via the same ground that operated relay EXSC.

The time during which the second exclusion pulse (CC1) is transmitted terminates when relay 13–EXPG is subsequently released by the interrupter. The release of this relay maintains relay 13–EXP2 operated, releases relay 13–EXP3, and maintains relay 13–EXP4 operated. The release of relay 13–EXPG opens its make contacts 7 on FIG. 14 to isolate the terminal 1401 ground from the contacts of key CC1 to release relay 14–EXPA. The release of this relay constitutes the termination of the transmission of the exclusion pulse by restoring its transfer contacts 11 on FIG. 12 to normal. This removes the 130-volt battery from the tip lead and restores a ground potential to it from terminal 1211. The removal of the positive 130-volt potential from the tip lead releases relay 7–T+, which opens the circuit for relay 8–EXPA to cause it to release. The release of this relay opens the holding circuit for steering relay 7–EXSB to release it.

The circuit operations for the transmission of the subsequent exclusion pulses for call classes CC2 through CC4 and operator groups OG0 through OG8 continue in the same manner as already described for the transmission of the first two exclusion pulses, namely, relay 13–EXPG continues to follow the pulses provided by the interrupter; the counting relays EXP1 through EXP5 on FIG. 13 are driven to various operational combinations in response to the pulses provided by relay EXPG; the contacts of relay EXPG, together with those of the counting relays on FIG. 14, apply the terminal 1401 to the contacts of the remainder of the exclusion keys sequentially; each exclusion key, as it receives the terminal 1401 ground, either operates relay EXPE if the key is depressed, or operates relay EXPA if the key is not depressed. The operation of relay EXPE transmits an exclusion pulse back to the observing trunk circuit to advance its steering circuitry and to operate the exclusion registration relay associated with the current state of the steering circuit; the operation of relay EXPA transmits back to the observing trunk circuit a steering advance pulse, which only advances the state of the steering circuit but does not operate the exclusion registration relay associated with the current state of the steering circuit.

The circuitry within rectangle 605 is shown only diagrammatically since it is identical, except for component designations, to the steering circuitry for the first three stages shown in detail to the left of rectangle 605.

The operation of relay EXPG and the counting relays EXP1 through EXP5, all on FIG. 13, is summarized in the following paragraph for the transmission of exclusion pulses CC2 through CC4 and OG0 through OG8. As described for the first two exclusion pulses, during the time in which an exclusion pulse is generated by the distribution circuit, the exclusion circuitry may either transmit an exclusion registration pulse back to the observing trunk circuit or an exclusion-advance-only pulse, depending upon whether the associated exclusion key is operated or released. Exclusion pulse CC2 begins when relay EXPG operates. This releases relay EXP4 and holds relay EXP2. The pulse time for call class 2 ends when relay EXPG releases. This operates relay EXP1 and holds relay EXP2.

The operation of relay EXPG for pulse CC3 holds relays EXP1 and EXP2 and operates relay EXP4. Pulse CC3 terminates when relay EXPG releases. This holds relays EXP1, EXP2, operates EXP3, and holds EXP4. The next operation of relay EXPG signifies the beginning of pulse CC4. This holds relays EXP1, EXP2, EXP3, and releases relay EXP4. Pulse time CC4 ends when EXPG releases. This holds EXP1, releases EXP2, and holds EXP3.

The operation of relay EXPG for pulse time OG0 holds EXP1, EXP3, and operates EXP4. The next release of relay EXPG terminates pulse time OG0. This holds EXP1, releases EXP3, and holds EXP4. The operation of relay EXPG for pulse time OG1 holds EXP1, releases EXP4, and operates EXP5. The release of relay EXPG terminates pulse time OG1. This releases EXP1 and holds EXP5. The next operation of EXPG defines the beginning of pulse time OG2. This operates EXP4 and holds EXP5. Pulse time OG2 terminates with the release of relay EXPG. This operates relay EXP3 and holds relays EXP4 and EXP5.

Pulse time OG3 begins with the next operation of relay EXPG. This holds relay EXP3, releases EXP4, and holds EXP5. Pulse time OG3 ends with the release of relay EXPG. This operates EXP2 and holds EXP3 and EXP5. Pulse time OG4 begins with the operation of relay EXPG. This holds relay EXP2, EXP3, operates EXP4, and holds EXP5. Pulse time OG4 ends with the next release of relay EXPG. This holds EXP2, releases EXP3, and holds EXP4 and EXP5. The pulse time OG5 begins with the operation of relay EXPG. This holds EXP2, releases EXP4, and holds EXP5. Pulse time OG5 terminates with the next release of EXPG. This operates EXP1 and holds EXP2 and EXP5. Pulse time OG6 begins with the next operation of EXPG. This holds EXP1, EXP2, operates EXP4, and holds EXP5. Pulse time OG6 ends with the next release of relay EXPG. This holds EXP1, EXP2, operates EXP3, holds EXP4 and EXP5. Pulse time OG7 begins with the next operation of relay EXPG. This holds EXP1, EXP2, EXP3, releases EXP4, and holds EXP5. Pulse time OG7 ends with the next release of relay EXG. This holds EXP1, releases EXP2, and holds EXP3 and EXP5. Pulse time OG8 begins with the operation of relay EXPG. This holds EXP1, EXP3, operates EXP4, and holds EXP5. Pulse time OG8 ends with the next release of relay EXPG. This holds EXP1, releases EXP3, and holds EXP4 and EXP5.

Steering relays 7–EXSD through EXSP operate as the third through the thirteenth exclusion pulses are received from the exclusion control.

On the reception of the fourteenth pulse, relay 7–EXPC operates via make contacts 7–EXSP–10. Since it has been assumed that calls for operator groups 0 and 8 are to be excluded, relays 6–OG0 and 6–OG8 operated during the reception of exclusion pulses 6 and 14, respectively. The operation of relay 6–EXPC opens its break contacts 10 within rectangle 720 to isolate the T+ diode from the terminal 718 ground and close its make contacts 4 within the same rectangle to connect the T— diode to the terminal 717 ground. This transmits a signal back to the observing control circuit that the exclusion circuit has received all the pulses required for this exclusion operation. The operation of relay 7–EXPC also opens its break contacts 8 within rectangle 805 to open the locking circuit for relay 8–EXP to cause it to release at the completion of the last pulse when relay 8–EXPE releases.

At the conclusion of the last pulse, relay 14–EXPE releases and restores the T and R conductors to their interpulse state, namely, —48 on the ring from terminal 1205 and ground on the tip from terminal 1211. This operates relay 7–R— and releases relay 7–R+. The releases of relay R+ releases relay 8–EXPE, which in turn releases relay 8–EXP. The release of relay EXPE disconnects the T+ diode and reconnects the T— diode to ground for the tip lead, as already described. The release of relay EXPE also opens its make contacts 10 on FIG. 7 to release steering relay 7–EXSP.

Immediately subsequent to the termination of the time for puse OG8, relay 13–EXPC operates to the terminal 1302 ground via the make contacts of relays EXP1, EXP4, and EXP5, and via break contacts EXP2 and EXP3. The operation of relay EXPC releases relay EXP4, which in turn releases EXP1. The operation of relay EXPC also releases relay 12–EXPS. The operation of relay EXPC also opens its break transfer contacts 5 to release relay EXP5 by isolating it from terminal 1309 ground.

The reclosure of the T— diode ground on FIG. 7 to the T lead reoperates relay 12–EXTC as soon as relay 12–EXPS releases and recloses its break transfer contacts 12 on FIG. 12. Relay EXTC, operated, operates relay 12–EXPR over the following circuit: ground on terminal 1207, make contacts 12–EXTC–4, make contacts 13–EXPC–3, break contacts 12–EXPR–5, to the winding of relay EXPR to operate it. This relay in operating closes a holding circuit for itself over its make contacts 5 and 12–EXCTA1–7 to the terminal 1209 ground.

Relay 7–T+ in the observing trunk circuit operated in series with relay 12–EXTC.

It has been mentioned how relay 12–EXTC operated when the observing trunk circuit disconnected the T+ diode on FIG. 7 and reconnected the tip lead to ground through the T— diode. At the same time relay 12–EXTC operated, relay T— also operated from the negative battery supplied via the winding of relay 12–EXTC. Relay 7–R— is also operated at this time since the R conductor of the observing trunk circuit is supplied with negative battery from terminal 1205. The reoperation of relays T— and R— closes the following path to reoperate relay 8–EXPL: ground on terminal 801, through the indicated relay contacts to terminal 813, and then to terminal 809, downwards on FIG. 8 from terminal 809 to terminal 810, and then left, through the indicated relay contacts, to the winding of relay EXPL to operate it. This relay in operating opens its break contacts 7 on FIG. 7 to isolate the terminal 712 ground from the winding of relay 7–EXPC to cause it to begin a slow-release operation. It also transfers the locking ground for the CC0–4 and OG0–8 relays from terminal 607 to terminal 606 through the released 8–EXP–1 contact. The operation of relay 8–EXPL also opens its break contacts 4 within the 720 rectangle to isolate the T— diode from ground for the release time of relay 6–EXPC. The removal of this T— diode ground opens the circuit for relay 12–EXTC to release it. The release of this relay in turn releases relay 12–EXP by isolating it from the terminal 1207 ground as make contacts 12–EXTC–4 open. The release of relay EXP opens its make contacts 5 on FIG. 13 to release relay EXPC by isolating it from the terminal 1309 ground. The release of relay EXP opens its make contacts 3 on FIG. 12 to release relay EXCT1 by isolating it from the terminal 1202 holding ground. The release of this relay opens its make contacts 10 on FIG. 16 to release relay MOS1. The release of relay 12–EXCT1 also releases its slave relay 12–EXCTA1. The release of this slave relay releases relay 12–EXPR by isolating it from the terminal 1209 holding ground. The release of relay EXP recloses its break contacts 1 in the tip lead on FIG. 12 to reconnect the winding of EXTC to the tip lead and prepare it for operation on subsequent exclusion operations.

The release of relay 7–EXPC at the end of its slow-release interval reclose the T— diode to ground via its break contact 4 within the 720 rectangle. This constitutes the end of the exclusion operation, and at this time both observing trunk circuit 1 and the distribution circuit, including its exclusion control circuits, are in a state to service observe other calls and to perform exclusion operations for other TSPS centers or offices served by the service observing equipment. Also, the exclusion registration relays on FIG. 6 corresponding to the exclusion keys that were depressed on the described exclusion operation are now in an operated state and remain in this state until altered by a subsequent exclusion operation directed to observing trunk circuit 1. The operated state of these exclusion relays precludes calls of the classes represented thereby, as well as calls directed to the operator groups represented thereby from being service observed.

MF Trunk Circuit—FIG. 4

The function of each TSPS trunk circuit, such as trunk circuit 203 on FIG. 2A, is to extend a call from its local office appearance to its toll office appearance and, in so doing, temporarily bridge service circuits within the TSPS center onto the calling connection in order that certain call service may be more efficiently provided at the TSPS center than it may be at either the local or toll offices. Once this service is provided, the TSPS service circuits are disconnected and the called and calling stations remain connected for the call duration via the TSPS trunk circuit. The TSPS center monitors the call and restores the trunk circuit to its idle state upon the call termination.

FIG. 4 discloses the circuit details of a TSPS trunk circuit arranged for MF signaling from the local office. This trunk circuit is connected by means of its IT and IR conductors on its left side to the outgoing end of originating office 401. On its right side, the trunk circuit is connected via its OT and OR conductors to toll office 402. Its T, R, T1, and R1 conductors in the conductor group 404 extend to the trunk side of link 204A on FIG. 2A. Conductors T and R extending to the link permit the position side circuits (the right side) of the link to be connected to the incoming end of a calling connection. The T1 and R1 conductors permit the position side circuits to be connected to the outgoing end. Conductor group 405 connects the trunk scanner ferrods L and R to the appropriate points within the trunk circuit of FIG. 4 so that the scanner may monitor the potential state of the incoming and outgoing loops. The conductor group 406 comprises the circuit paths by means of which the signal distributor may apply signals to the magnetic latching relays A, B, and C to selectively operate and release them.

The following paragraphs describe the detailed operations of this trunk circuit during the serving of a call that is to be service observed and which requires operator assistance at the TSPS center for its completion.

The trunk is in an idle state prior to its seizure by the originating office. All of its relays are in a released condition. The originating office applies a seizure signal to the IT and IR conductors when it attempts to extend a call forward to the toll office. This seizure signal comprises a D-C short across the IT and IR conductors. This energizes ferrod L, and transmits a seizure signal to the SPC, which, in turn, commands the signal distributor to operate relay C over conductor SD2. The operation of relay C operates its transfer contacts connected to thermianl 423 and 424 to reverse the polarity of the supervisory potentials applied by the windings of the L ferrod to the IT and IR conductors. This reversal is detected by the originating office as a signal that its service request has been recognized.

The SPC next commands the switching network to connect the T and R conductors of this trunk circuit to the corresponding conductors of a digit receiver of the MF type. The signal distributor operates relay B of the trunk circuit when the connection to the MF receiver is established. The operation of relay B operates its break contacts 1 and 2 to disconnect the path by means of which the supervisory potentials are applied by the L ferrod to the IT and IR conductors. The MF receiver at this time applies the required supervisory potentials to these conductors, as described in the Jaeger-Joel specification. The called and calling station information is subsequently outpulsed by the originating office to the MF receiver. This information is passed on by the receiver via the scanners to the SPC. When the outpulsing operation is terminated, the connection to the receiver via the link is released, relay B of the trunk circuit is released, and relay C is left in an operated state.

Let it be assumed that the SPC has, by this time, determined that the call is to be service observed and that operator assistance is required at the TSPS center. Let it also be assumed that the circuit operations within the TSPS center have proceeded to the point where the SPC (1) has selected and reserved an idle assistance operator position for serving the call, (2) has seized an idle observing trunk circuit and has requested that the trunk circuit connect itself to an idle service observing position, (3) has been advised by the observing trunk circuit ferrods that an adle observing position is available and has been connected by the distribution switch, and (4) has transmitted, via the signal transmitter and the distribution switch, to the observing position the information it initially requires on the call.

With the completion of the above functions, the SPC now effects the following connections via the switching network: (1) connects the T and R conductors of the trunk circuit of FIG. 4 through the network to conductors 292–1 extending to the observing trunk circuit 1 from the right side of the network, and (2) connects conductors 291–1 of trunk circuit 1 to the position network appearance of operator cut-through circuit 224–1. This circuit further extends the connection via conductors 225–1 to operator position 1 in the upper right-hand corner of FIG. 2C.

The establishment of the above connections enables the calling party and the assistance operator at position 1 to converse and, at the same time, enables the operator at the selected observing position to monitor the conversation. The assistance operator converses with the calling party, determines the service he requires on the call, furnishes this service, and then depresses a key at her position to release her position from the connection. During the performance of her call duties prior to her release, the assistance operator normally depresses a plurality of keys sequentially to perform various circuit functions, including the advising of the SPC, as to the nature of the call service provided. These key signals, along with others, are transmitted by the SPC to the observing operator to keep her advised as to the status of the call and the nature of the service provided by the assistance operator.

The TSPS center is required to transmit to the toll office the called information it requires to control the completion of the connection requested by the calling party. This information is transmitted to the toll office by an outpulsing operation at the TSPS center, the precise time at which this outpulsing operation occurs depends upon the nature of the call. On some calls, it occurs prior to the connection to an operator; on others, it occurs while the assistance operator is connected. When the SPC determinees that outpulsing is to take place, it connects the T1 and R1 conductors within the conductor group 404 to an outpulser via the switching network. Once this connection is established, the SPC controls the outpulser so that the required information is transmitted to the toll office. Following the conclusion of the outpulsing operation, the network connection to the outpulser is disconnected and relay A of the trunk circuit is operated. This puts the trunk circuit in its cut-through state, in which its incoming end, i.e., conductors IT and IR, are connected speechwise with its outgoing end, i.e., conductors OT and OR. If the assistance operator is currently connected on the call, via the T and R conductors of conductor group 404, she may now converse with the called party, if such is required in the performance of her duties, i.e., a person-to-person or collect call.

When the assistance position is disconnected from the call, the observing position may or may not be disconnected at the same time, depending upon the requirements of the observation. For most observations, the observing position will be disconnected concurrently with the assistance position; however, as already mentioned, it is sometimes desired to leave the observing position attached to the call, either for an extended period or for the call's duration. Whenever this is the case, the observing position remains connected via the switching network to the call connection via the T and R conductors of the trunk circuit of FIG. 4. However, at this time, as already mentioned, the circuitry within the signal translator opens the break contacts within the T and R conductors on FIG. 26 to disconnect the speech circuit of the observing operator from the call connection so that the privacy of the calling party's conversation may be maintained. The observing position is kept advised of the status of the call by means of lamp signals transmitted by the SPC. Finally, at the end of the call, the observing position is disconnected and relays A and C of the trunk circuit are released to restor the circuit to its idle state.

Stored Program Controller (SPC)—
FIGS. 34, 35, 36A–36C

The SPC, shown as element 230 on FIG. 2B, comprises a stored program machine having a processor 230A and a memory 230B. The memory stores both program instructions and data. All instructions, and some data, are stored on a relatively permanent basis and are changed only infrequently from time to time. Other of the data is relatively temporary in nature, and it may be entered into memory, modified, and erased during the serving of a call. The program instructions form the entirety of the vocabulary of the processor, and they provide the intelligence necessary to instruct the processor in the many functions required of it under any and all of the many call situations the SPC may encounter. The processor monitors and controls peripheral equipment by performing logic and/or arithmetic operations on data temporarily stored in registers within it under control of the programmed instructions, and by transmitting to the peripheral equipment output information or commands generated as a consequence of performing these operations. Although the processor may perform many different functions, it is capable of executing only one instruction at a time under control of the programmed memory.

The SPC, in performing its functions, either directly or indirectly, controls the operation of most of the circuits in our system. All commands specifying an operation in another circuit originate within the SPC, and all answers signifying the current operational state of many circuit points of the system are returned to the SPC. Certain instructions result in actions which are entirely confined to the SPC. For example, an instruction or series of instructions may command the SPC to perform logic and/or arithmetic operations on the data currently contained within it. Other instructions may cause the SPC to command a peripheral circuit to perform an operation which results in an answer being transmitted back to the SPC by the scanner. An instruction, for example, may result in a command being sent to the scanner to read or interrogate a specified row of ferrods. The result of the interrogation is transmitted over the scanner answer bus back to the SPC, where the information is stored temporarily either in memory or in index registers within the processor until it can be later utilized.

The SPC communicates primarily with the CBT (communications bus translator), the CPD (central pulse distributor), and the scanners. The output signals of the SPC are commonly referred to as "commands" since they cause the circuit receiving them to perform the operation specified by the command. The commands transmitted to the CBT are applied over circuit paths 247 and 248, and they instruct the CBT to apply its own commands to the address buses, which in turn transmit them to the peripheral circuits to which they are connected. The SPC output commands are received by the CPD over circuit paths 210 and 212, and they instruct the CPD to unlock the receiving portion of a specified peripheral circuit in order that it, and only it, may receive and register the command currently on the address bus to which the specified peripheral circuit is connected.

The scanner answer signals are transmitted over the scanner answer bus 240 back to the SPC. The information represented by these signals signifies the current state of many circuit points within the system. Each such circuit point is associated with an individual ferrod in the scanner, and the plurality of ferrods within a scanner are divided into rows. When the SPC desires to obtain information regarding the state of a specified circuit point, it causes commands to be transmitted to the scanner, which instructs it to interrogate the ferrod row containing the ferrod individual to the specified circuit point. The scanner answer transmitted to the SPC as a result of this interrogation represents the existing state of the specified circuit point, as well as all of the other circuit points individual to the remainder of ferrods in the interrogated ferrod row.

FIG. 34 discloses in greater detail the relationship between an SPC 3400 and the circuits with which it communicates. The SPC comprises processor 3408 and memory 3407. The processor retrieves either data or instructions from memory by a read operation, and it enters information into memory by means of a write operation. The input bus for memory 3407 is element 3401; the output bus is element 3402. The lower portion of FIG. 34 discloses CBT 3419, CPD 3420, and a plurality of scanners which are represented generally as element 3421. The processor transmits commands to the CBT over bus 3410 and to the CPD over bus 3411. It receives information from the scanners over bus 3425, and from the CBT and CPD over bus 3426.

Additional details of the SPC are shown on FIG. 35. This figure discloses the processor as element 3501, the memory as element 3502, the circuit paths interconnecting these two elements, as well as the circuit paths interconnecting the processor with the circuits external to the SPC. Memory 3502 is functionally divided into a plurality of portions designated A, B . . . through n, each of which stores the program and/or data required to enable the SPC to perform the many separate functions required for the operation of our system. The memory read and write control circuit 3505 within the processor controls the operations required to read data and instructions out of and enter data into memory. The information to be written into memory is applied to bus 3504 from the output of circuit 3505. Similarly, the information that is read from memory is applied by bus 3503 to circuit 3505. Each portion of memory is represented by an address, as is typical in stored program machines, and therefore, in performing each read and write function, circuit 3505 obtains the address of the pertinent portion of memory from address generators 3507 over path 3506. The memory access register MAR, element 3510, transmits to circuit 3505 the information that is to be entered into memory on write operations; and on read operations, circuit 3505 reecives from the MAR the information extracted from memory. The information the MAR receives from memory on a read operation is transmitted to other elements (not shown) within the processor over path 3511. Similarly, the MAR receives from the other elements the data that is to be entered into memory on a write operation over path 3512.

Since the details of the processor comprise no part of our invention, many of the elements with which the MAR communicates are shown only functionally. Included in the processor is the circuitry required to operate upon and manipulate the data stored within it so that both logic and arithmetic operations may be performed. This circuit is represented generally by the rectangle 3517 entitled "Arithmetic and Logic Circuit."

The index registers 3514 cooperate with the Arithmetic and Logic Circuit to perform arithmetic and logic operations upon the data received by the processor, both from memory and from circuits external to the SPC. The index registers are also used to receive and register temporarily the scanner answer information. This information is received over path 3518 and stored within the index registers until it may be acted upon. It is then either entered into memory, utilized for other purposes, or discarded. Clock 3515 generates the control and timing pulses required by other circuits of the SPC. Checking circuit 3516 receives the various check signals, parity signals, and other signals which must be received by the SPC in response to the various commands it transmits to other circuits before it proceeds with another command. The output commands generated by the SPC are applied to external circuits by the circuit 3520 entitled "SPC Output Steering and Control Circuit." Cable 3521 transmits commands from the SPC to the CBT and cable 3522 transmits commands from the SPC to the CPD.

The SPC is shown primarily in diagrammatic form on the present drawing figures, including FIGS. 2B, 34, and 35, since its details comprise no portion of the present invention and since stored program controllers available for use in our invention are disclosed elsewhere. For example, the Doblmaier et al. application, Ser. No. 334,875, filed Dec. 31, 1963, discloses a stored program controller which may be utilized to generate the control signals required to operate the circuits of our invention. The Doblmaier et al. stored program controller is further described in detail in the aforementioned Bell System Technical Journal of September 1964, which issue is devoted in its entirety to an electronic switching system, and with approximately 50 percent or more of this issue being devoted to the stored program controller. Also, if desired, a stored program controller whose processor is shown in the Kettley et al. application, Ser. No. 422,313, filed Dec. 30, 1964, may be used instead of the one shown in Doblmaier et al. Since the details of stored program controllers suitable for use to generate the signals required by our system are shown in detail in the prior art, the disclosure of the present specification has been simplified by disclosing only those details of an SPC as are required for an understanding of our invention.

On FIG. 35, the SPC memory is divided into a plurality of elements designated A, B . . . through n, each of which stores the data or information pertaining to a different operation the SPC may perform. Each memory element is connected by a separate path to a write bus 3504 positioned atop the memory and to a read bus 3503 positioned underneath the memory. The processor effects a write operation by simultaneously gating onto the write bus the address of the portion of memory that is to be written into, together with the information that is to be written. Similarly, the processor effects a read operation by gating onto the read bus a read command together with the address of a portion of memory that is to be read.

Figure 36A:
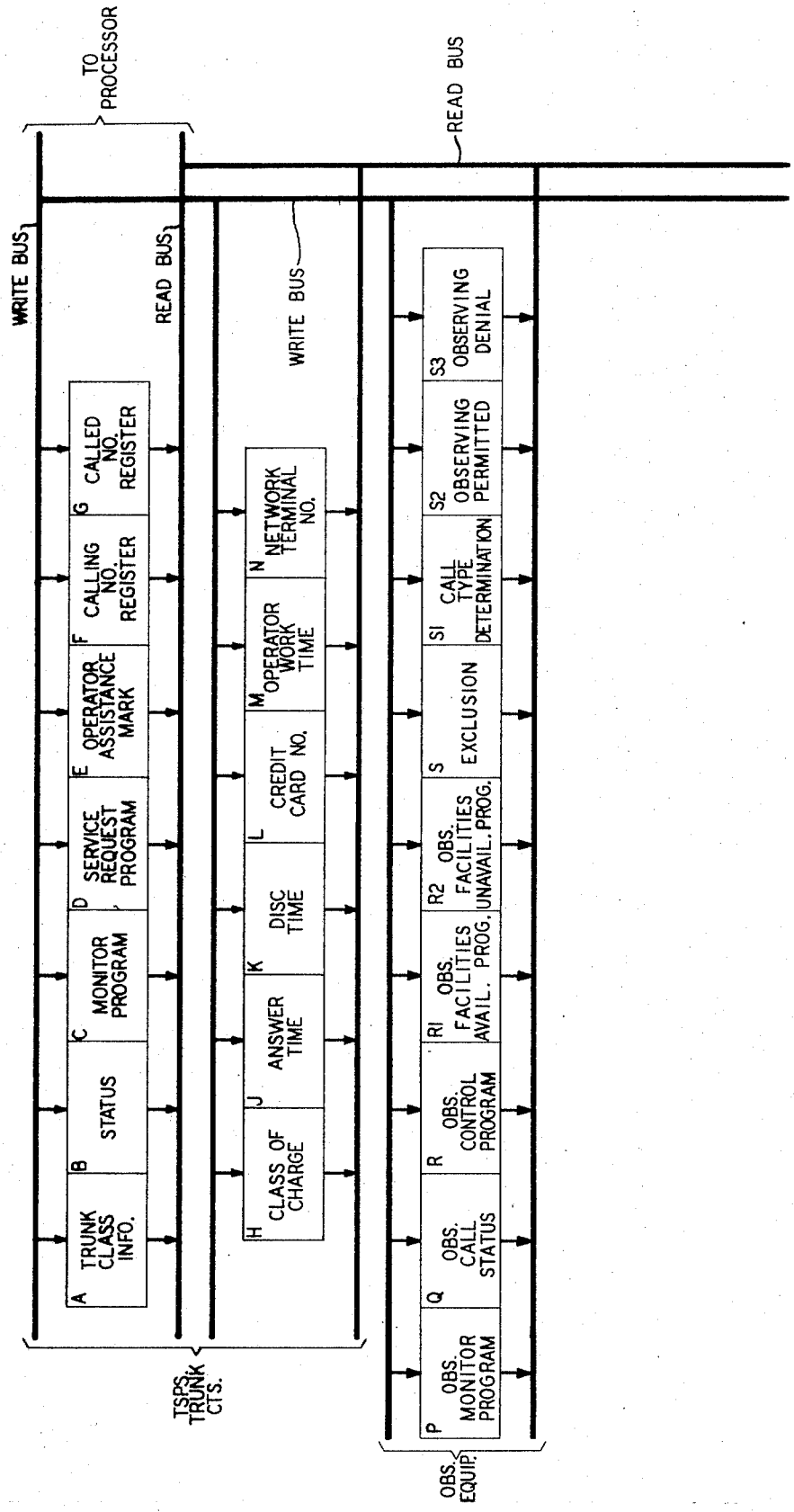
Figure 36B:
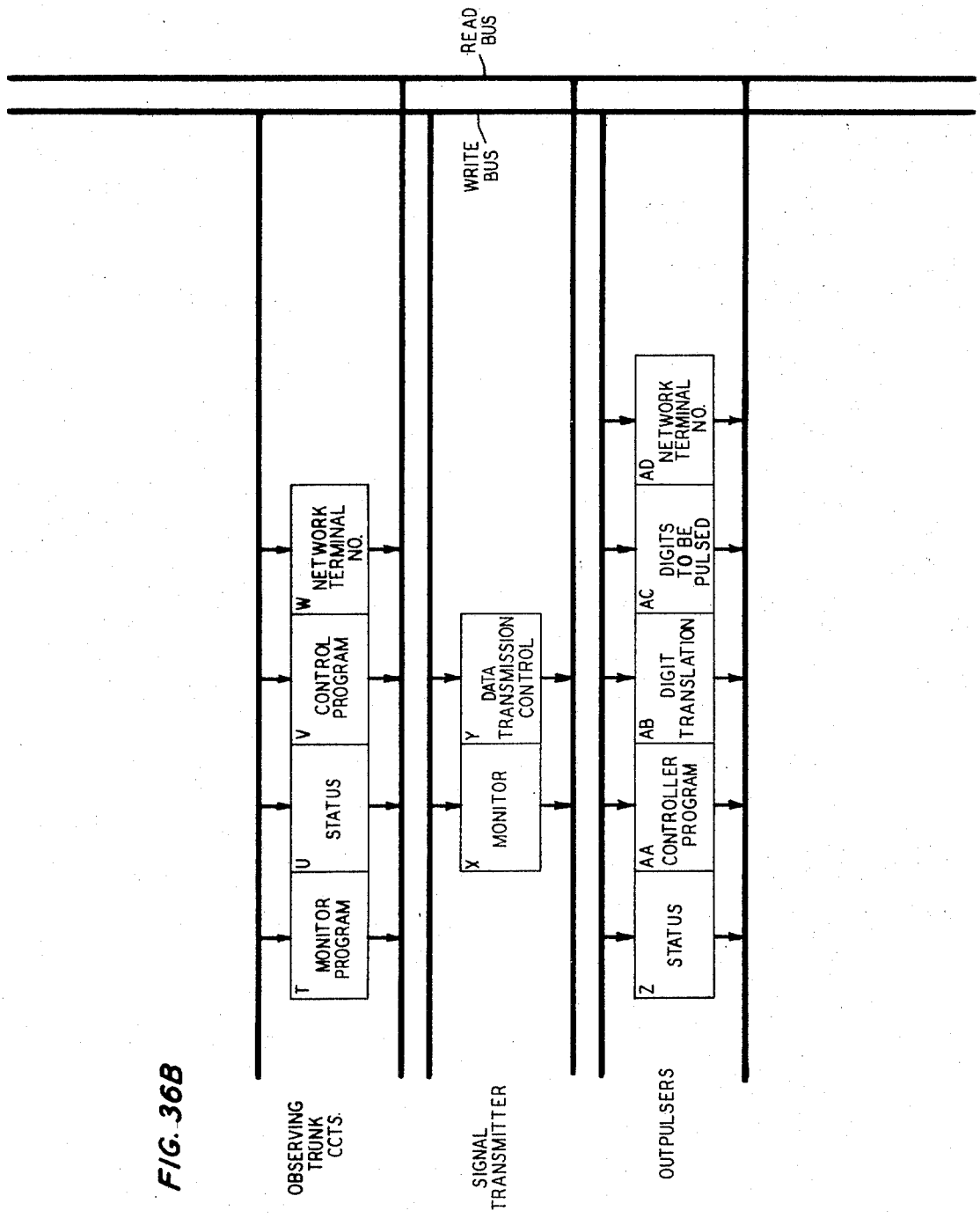
Figure 36C:
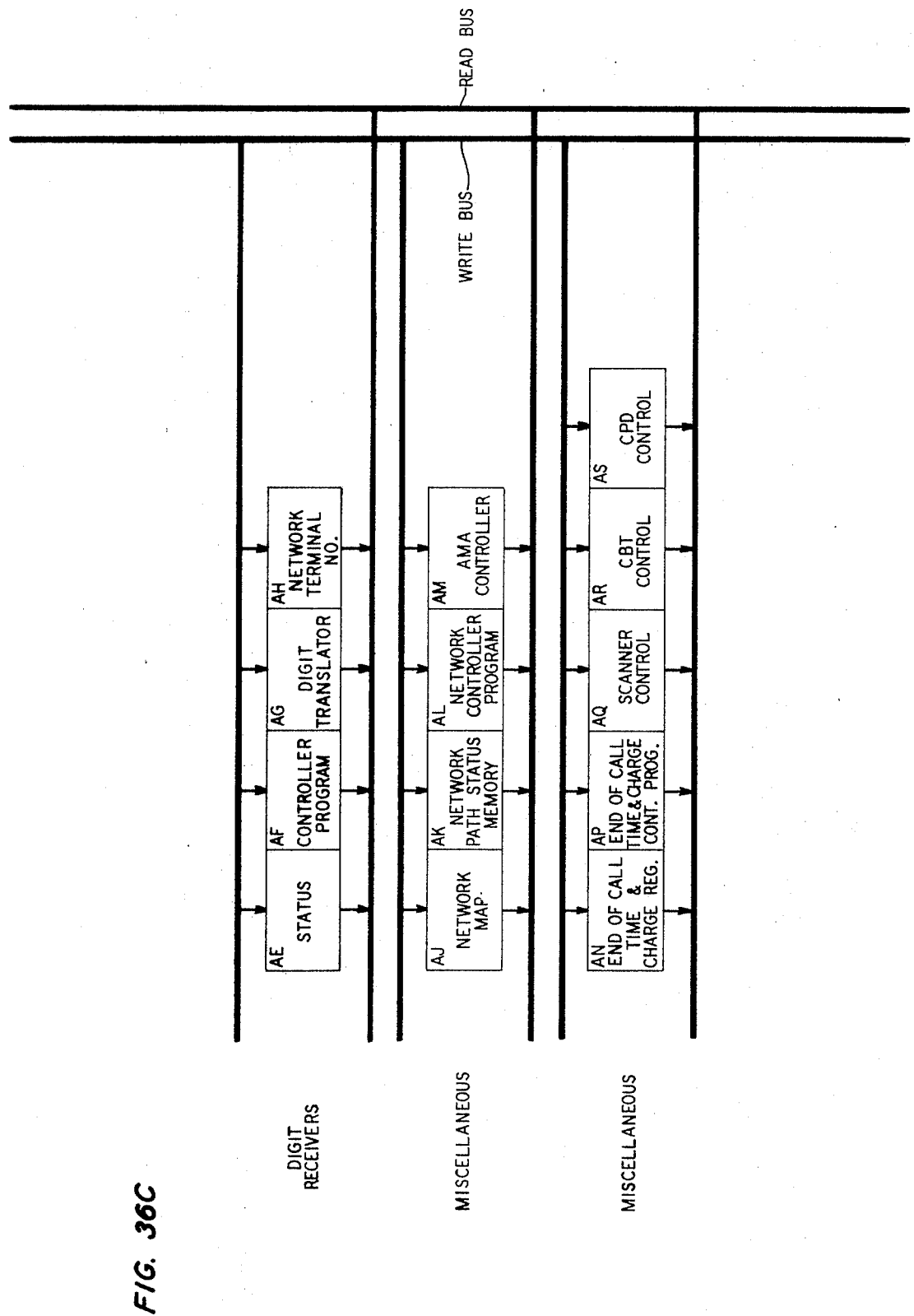

FIGS. 36A through 36C, when arranged as shown on FIG. 37, disclose additional details regarding the manner in which the memory may be subdivided by its call serving functions. The memory elements are arranged into a plurality of rows on FIGS. 36. Write bus 3504 and read bus 3503 extend vertically on the right side of these figures. A branch of the write bus extends horizontally atop each memory row, and each branch is connected by the indicated arrowed paths to each section of memory in its row. Similarly, a branch of the read bus extends horizontally beneath each row and each branch is connected by the indicated arrowed paths to each memory section in its row. These interconnections permit the processor to read and write into any portion of memory in the same manner as described in connection with FIG. 35. The connections to the processor are shown in the upper right-hand corner of FIG. 36A.

The top two rows on FIG. 36A represent the memory elements associated with the TSPS trunk circuits and their control. Element A is entitled "Trunk Class Information," and it stores in the many parameters pertaining to each TSPS trunk circuit, including the class of calls served thereby, the type of impulsing received from a preceding office, etc. Element B is entitled "Status," and it registers information signifying the idle or busy state of each trunk circuit. Element C comprises the trunk monitor program and governs the operation of the SPC in controlling the TSPS trunk circuit. The service request program D enables the SPC to determine the initiation and termination of trunk circuit service requests. Memory E stores a mark indicating whether or not operator assistance is required on calls served by each trunk circuit. Element F comprises the calling number register for each trunk circuit, while element G comprises the called number registers. Memory element H stores the class of charge information, element J stores the answer time, element K stores the disconnect time for each trunk circuit, element L stores the credit card number for credit card calls, and element M stores the operator work time. The operator work time is subtracted from the total time of the call in order to derive the chargeable time. Element N stores a number indicating a network appearance of each TSPS trunk circuit on the switching network.

Element P is the first of the memory elements pertaining to the observing equipment. It is entitled "Observing Monitor Program" and assists the SPC in controlling the operation of the observing equipment. Element Q, entitled "Observing Call Status," enables the SPC to store information concerning the status of every call under observation. Element R controls the operation of the SPC when circuit operations are required for calls under observation. Element R1 controls the operation of the SPC in determining the availability of observing facilities. This information is used in determining whether a call should be served on an observed or unobserved basis. Element R2 controls the operation upon a determination that observing facilities are not currently available.

Element S stores the exclusion information and allows the SPC to ascertain the types of calls that can and cannot be observed. Element S1 controls the SPC operation during a call type determination to ascertain each received call of the excluded or non-excluded type. Element S2 controls the SPC upon a determination that observing is permitted. Element S3 controls the operation upon a determination that observing is denied. Element T is the monitor program for the observing trunk circuits. Element U enables the SPC to be kept advised concerning the status of each observing trunk circuit. Element V comprises the program required to govern the SPC in seizing and releasing each observing trunk circuit. Element W stores a number for each observing trunk circuit indicating its appearances on the switching network. Element X controls the operation of the SPC in monitoring the status of the signal transmitter. Element Y controls the operation of the SPC when it is engaged in sending information and data via the signal transmitter to the observing positions.

Element Z is the beginning of the portion of memory pertaining to the outpulsers, and it stores outpulser status information. Element AA comprises the controller program for the outpulsers, while element AB comprises the digit translation program. Element AC determines the digits to be outpulsed, while the element AD stores the network appearance for each outpulser. Element AE stores status information for the digit receivers, while element AF comprises the controller program. Element AG comprises a program which translates the digits received into binary form suitable for storing in memory, and element AH stores information signifying the network appearance of each digit receiver.

Element AJ is the first portion of memory pertaining to the switching network, and it stores the network map. Element AK stores the network path memory information, i.e., information pertaining to the established connections in the network. Element AL comprises the controller program for the network, while element AM comprises the control program for the AMA equipment. Element AN comprises the end-of-call time and charge registers, and element AP comprises the end-of-call time and charge controller program. Element AQ comprises the scanner control program, element AR the CBT control program, element AS the CPD control program, element AT the signal distributor control program, while element AU comprises the scanner response program. Element AV enables the SPC to perform the necessary checks on the input information it receives from the various circuits, element AW comprises a clock which generates the necessary timing signals required by the SPC and the various circuits of our system.

Element AX comprises the first section of memory pertaining to the operation of the assistance position circuits, and it stores status information for each assistance position. Element AY controls the manner in which information is transmitted to each assistance position via the group gate. Element AZ controls the operation of the group gate circuit. Element BA controls the operation of the position signal distributor, element BB stores information signifying the keys that have been depressed at the assistance positions, element BC assists the SPC in determining what action should be taken by the system as a consequence of each key depression at an assistance position, and element BD stores information pertaining to the network appearance of each assistance operator's cut-through circuit, while element BE assists the SPC in monitoring the state of the position scanner.

The indicated subdivided portions of memory discussed represent only a few of the many thousands of items of information and instructions that must be entered into memory in order for the SPC to perform its required functions. The nature of these functions and their specific detail comprises no portion of the present invention, and, further, they are described in detail in the aforementioned Jaeger et al. application, as well as in the aforementioned issue of the Bell System Technical Journal pertaining exclusively to electronically controlled switching systems.

It is to be understood that the above described arrangements are merely illustrative of the numerous and varied other arrangements which may constitute applications of the principles of our invention. Such other arrangements may readily be devised by those skilled in the art without departing from the spirit or scope of this invention.

For example, our invention is disclosed herein in conjunction with TSPS equipment which, in providing call service, performs no route establishing switching operations. However, it is to be understood that our invention is not limited to use with TSPS equipment. If desired, it may also be used in conjunction with any office or call switching center at which it may be desired to service observe conversations between subscribers and call assistance operators. The only requirement imposed by the use of our system is that the observing trunk circuits be provided with appearances on the switching network of any such office and that the system controller be adapted to transmit call data via the distribution switch to the observing positions.

What is claimed is:

1. In a switching system equipped for service observing, cell serving circuits, assistance positions, service observing positions, a single switching network having an appearance thereon individual to each of said call serving circuits, means connecting each of said appearances to the call serving circuit to which it is individual, said network being effective upon the receipt of a call by any one of said circuits for automatically interconnecting said one circuit via the appearance to which it is individual with any one of said observing positions and any one of said assistance positions.

2. The invention of claim 1 in combination with means responsive to the receipt of said call for transmitting call data to said observing position.

3. The invention of claim 1 in combination with means for registering information specifying types of calls that are to be excluded from service observation, and means responsive to said registration for controlling said network to connect said observing positions only to call serving circuits serving calls of the types not excluded from observation.

4. In a switching system equipped for service observing, trunk circuits, assistance positions, service observing positions, a switching network effective upon the receipt of a call by any one of said trunk circuits for automatically establishing a first path interconnecting said calling trunk circuit and one of said observing positions and for establishing a second path interconnecting said one observing position with one of said assistance positions, said interconnections being effective for providing speed signal paths between said trunk circuit and said assistance position and said observing position.

5. The invention of claim 4 in combination with means for registering data pertaining to said call, and means for transmitting said registered data from said registering means to said observing position over a path independent of said network.

6. The invention of claim 5 wherein said means for transmitting includes means for transmitting information to said one observing position indicating the call services provided by an operator at said assistance position.

7. The invention of claim 5 in combination with means subsequently effective for releasing said connection to said assistance position while maintaining said connection to said observing position.

8. The invention of claim 7 in combination with means effective upon the release of said connection to said assistance position for disabling the speech signal path between said observing position and said calling trunk circuit while maintaining intact said second network path extending to said observing position, said means for transmitting registered data remaining effective subsequent to the release of said assistance position to transmit call information to said observing position.

9. The invention of claim 4 in combination with means for registering information specifying the types of calls received by said system that are to be excluded from service observation, means responsive to the receipt of each call for determining its type, and means effective upon said determination for precluding the connection of an observing position to any trunk circuit serving a call of the types excluded from observation.

10. In a switching system equipped for service observing, incoming trunk circuits each of which can serve a plurality of types of calls, assistance positions, service observing positions, means for registering information indicating the type of calls that are to be excluded from service observation, means effective upon the receipt of a call by a calling one of said trunk circuits for determining its type, and means effective upon a determination that a call is of a type not excluded from observation for establishing a first path interconnecting said calling trunk circuit with one of said observing positions and for establishing a second path interconnecting said observing position with one of said assistance positions.

11. The invention of claim 10 in combination with means effective upon a determination that a call is of a type excluded from observation for effecting the establishment of only said first path.

12. In a switching system equipped for service observing, incoming trunk circuits, assistance positions, service observing positions, means effective upon the receipt of a call by one of said trunk circuits for determining whether it is to be served on an observed or an unobserved basis, and means effective upon a determination that a call is to be served on an observed basis for establishing a first path interconnecting said calling trunk circuit with an idle one of said observing positions and for establishing a second path interconnecting said observing position with an idle one of said assistance positions.

13. The invention of claim 12 in combination with means effective upon a determination that a call is to be served on an unobserved basis for precluding the establishment of said first and second paths and for interconnecting said calling trunk circuit with one of said assistance positions.

14. In a switching system equipped for service observing, a single switching network, incoming trunk circuits connected to said network, assistance positions connected to said network, observing positions connectable to said network, other circuits connected to said network, means including said network effective upon the receipt of a call by one of said trunk circuits for establishing paths connecting said calling trunk circuit to said other circuits and to one of said assistance positions, said connections to said other circuits being effective for controlling the establishment of a forward connection for said call, means additionally responsive to the receipt of said call for connecting one of said observing positions via said network to said calling trunk circuit, a system controller effective during the serving of said call for registering call information, and means for transmitting said information from said system controller to said observing position over a path independent of said network.

15. In a switching system equipped for service observing, a switching network, incoming trunk circuits connected to said network, assistance positions connected to said network, service-observing positions connectable to said network, means including a switching network effective upon the receipt of a call by one of said trunk circuits for establishing a path interconnecting said calling trunk circuit with an idle one of said observing positions as well as with an idle one of said assistance positions, a system controller effective during the serving of said call for registering call information including information signifying the call services provided by an operator at said assistance position, and means independent of said network for transmitting said information from said system controller to said observing position.

16. In a switching system equipped for service observing, incoming trunk circuits, assistance positions, service observing positions, observing trunk circuits, means effective upon the receipt of a call by one of said incoming trunk circuits for applying a selection signal to one of said observing trunk circuits, a distribution circuit including a distribution switch responsive to the application of said selection signal for interconnecting one of said observing positions with said selected observing trunk circuit, and means including a switching network effective upon said interconnection of said observing position for establishing a first path interconnecting said calling incoming trunk circuit with said selected observing trunk circuit and for establishing a second path interconnecting said selected observing trunk circuit with an idle assisatnce position, said first and second paths being effective for providing speech signal paths between said calling trunk circuit and said assistance position and said observing position.

17. The invention of claim 16 in combination with a system controller effective during the serving of said call for receiving call information including information signifying the call services provided by an operator at said assistance position, and means for transmitting said information from said system controller to said observing position.

18. The invention of claim 17 wherein said means for transmitting information comprises said distribution switch and is independent of said switching network.

19. The invention of claim 17 wherein said means for transmitting comprises means effective during each transmission for transmitting from said controller to said distribution circuit information identifying the observing trunk circuit currently interconnected with the observing position to which said transmission is directed, additional means effective during each transmission for transmitting from said controller to said distribution circuit information specifying any one of a plurality of call signals to be transmitted to said last named observing position, means in said distribution circuit responsive to the receipt of said observing trunk circuit identity information for establishing a data transmission path from said controller ot the observing position currently interconnected with said identified observing trunk circuit, and means responsive to the establishment of said data path for transmitting said one call signal to said observing position.

20. The invention of claim 19 in combination with means effective when a data signal is first transmitted to an observing position following its connection to an observing trunk circuit for maintaining the data path that is first established to said observing position within said distribution circuit, said controller being subsequently effective for transmitting information respresenting only data signals to said distribution circuit and in turn to said observing position via said established path, means at said observing position responsive to the subsequent receipt of a release signal from said controller for releasing said established data path within said distribution circuit, said distribution circuit then being effective for the remainder of said call to transmit data signals to said position only when each transmission includes information indicating the identity of the connected observing trunk circuit.

21. The invention of claim 17 in combination with means subsequently effective for releasing said connection via said network to said assistance position while maintaining said connection to said observing position via said network and said distribution switch.

22. The invention of claim 21 in combination with means effective upon the release of said connection to said assistance position for disabling the speech path between said observing position and said calling trunk circuit while maintaining intact said second network path extending to said observing position via said distribution switch, said means for transmitting registered information remaining effective to transmit call information to said observing position after the release of said connection to said assistance position.

23. The invention of claim 16 in combination with exclusion control means for specifying the types of calls that are to be excluded from observation, means responsive to the receipt of each call for determining its type, and means responsive to said determination for effecting the application of said selection signal to an observing trunk circuit and the establishment of said connection to said observing position only if the call is of the type not excluded from observation.

24. The invention of claim 23 in combination with means effective upon a determination that said call is of the type excluded from observation for precluding the application of said selection signal to an observing trunk circuit and for effecting the interconnection of said calling trunk circuit and an assistance position.

25. The invention of claim 23 in combination with means effective upon a determination that said call is not of the type excluded from observation for determining whether any of said observing positions are idle, and means responsive to a determination that none of said observing positions is currently idle for precluding the application of said selection signal to an observing trunk circuit and for effecting the interconnection of said calling trunk circuit with an assistance position.

26. The invention of claim 25 in combination with means responsive to a determination that one of said observing positions is currently idle for effecting said selection of said observing trunk circuit by transmitting a seizure signal thereto, means in selected trunk circuit responsive to said signal for transmitting a connection request to said distribution switch, and means in said switch responsive to the reception of said connection request for interconnecting said selected observing trunk circuit with an idle one of said observing positions.

27. The invention of claim 26 in combination with means for indicating the establishment of said interconnection between said observing trunk circuit and said observing position, said means for establishing said second path being effective in response to said indication to complete said interconnection with said assistance position.

28. The invention of claim 27 in combination with means for measuring a predetermined time following the application of said selection signal to said observing trunk circuit, and means for releasing said observing trunk circuit and for controlling the establishment of a network connection between said calling trunk circuit and an assistance position in the event that said indication signifying the completion of a connection to an observing position is not received within said predetermined time.

29. The invention of claim 26 wherein said distribution switch comprises a first group of circuits each of which is connected to a different one of said observing trunk circuits, a second group of circuits each of which is connected to a different one of said observing positions, a first preference circuit for arranging said first group of circuits and the observing trunk circuits unique thereto in an ordered preference, a second preference circuit for arranging said second group of circuits and the observing positions connected thereto in an ordered preference, and means responsive to a connection request signal from a plurality of said observing trunk circuits concurrently for interconnecting a preferred one of said requesting observing trunk circuits with a preferred one of said observing positions, said interconnection being effective to complete a communication path via said observing trunk circuit between said observing position and said assistance position and said calling trunk circuit.

30. The invention of claim 23 wherein said exclusion control means comprises, register means connected to a first one of said observing trunk circuits, means connected to said distribution switch for transmitting to said first observing trunk circuit and said register means information specifying the call types that are to be excluded from observation, and means controlled by said register means and responsive to the receipt of said information for enabling all of said observing trunk circuits to be connected to only incoming trunk circuits serving calls of the type not excluded from observation.

31. In combination, a plurality of call serving centers having trunk circuits each of which can serve a plurality of types of calls, service observing facilities including a plurality of observing positions, means for transmitting from said service observing facilities to each one of said centers, information specifying the types of calls served by each of said centers that are to be excluded from observation, means in each of said centers and responsive to the receipt of a call by any one of its trunk circuits for determining the call type, and means responsive to said determination for extending a connection from said one trunk circuit to one of said observing positions only if the call received by said trunk circuit is of a type that is not excluded from observation.

References Cited

UNITED STATES PATENTS 1,117,407  11/1914  Land.
2,709,722  5/1955  Rosene.

RALPH D. BLAKESLEE, Primary Examiner